US007018194B2

(12) United States Patent
Kitamura et al.

(10) Patent No.: US 7,018,194 B2

(45) Date of Patent: Mar. 28, 2006

(54) POWDER SUPPLYING APPARATUS AND POWDER MOLDING APPARATUS

(75) Inventors: Makoto Kitamura, Omihachiman (JP); Shigeki Takahashi, Omihachiman (JP); Tadanori Higaki, Kusatsu (JP); Yoshio Oda, Shiga-ken (JP); Kouki Sai, Shiga-ken (JP); Shigeyuki Takeuchi, Shiga-ken (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 174 days.

(21) Appl. No.: 10/000,067

(22) Filed: Dec. 4, 2001

(65) Prior Publication Data

US 2002/0090412 A1 Jul. 11, 2002

(30) Foreign Application Priority Data

| | | | |
|---|---|---|---|
| Dec. 4, 2000 | (JP) | ............................ | 2000-367968 |
| Dec. 4, 2000 | (JP) | ............................ | 2000-367969 |
| Dec. 4, 2000 | (JP) | ............................ | 2000-367970 |
| Dec. 4, 2000 | (JP) | ............................ | 2000-367971 |
| Dec. 4, 2000 | (JP) | ............................ | 2000-367972 |
| Dec. 15, 2000 | (JP) | ............................ | 2000-381990 |
| Oct. 22, 2001 | (JP) | ............................ | 2001-323744 |

(51) Int. Cl.
*B29C 43/02* (2006.01)

(52) U.S. Cl. ...................... 425/193; 425/216; 425/345; 425/453; 425/219; 425/260

(58) Field of Classification Search ................ 425/345, 425/405.1, 355, 451, 451.2, 451.57, 352, 425/453, 454, 422, 437, 444, 258, 260, 219, 425/259, 216, 215, 451.5, 451.7, 193
See application file for complete search history.

(56) References Cited

U.S. PATENT DOCUMENTS

| | | | | |
|---|---|---|---|---|
| 3,663,147 A * | 5/1972 | Maekawa et al. | ........... | 425/345 |
| 3,677,673 A * | 7/1972 | Shapiro | ....................... | 425/78 |
| 4,443,171 A * | 4/1984 | Dixon | ......................... | 425/78 |
| 4,789,323 A * | 12/1988 | Hudson | ...................... | 425/352 |
| 5,037,287 A * | 8/1991 | Hirai | .......................... | 425/352 |
| 5,049,054 A * | 9/1991 | Schaidl et al. | ................ | 425/78 |
| 5,350,548 A * | 9/1994 | Hinzpeter et al. | .......... | 425/345 |
| 5,653,926 A * | 8/1997 | Bogue et al. | ............... | 425/352 |
| 5,686,118 A * | 11/1997 | Kurata | ....................... | 425/345 |
| 6,004,120 A * | 12/1999 | Matsubara et al. | ........... | 425/78 |
| 6,881,048 B1 * | 4/2005 | Tokita | ........................ | 425/218 |

FOREIGN PATENT DOCUMENTS

| | | |
|---|---|---|
| CN | 1135082 | 11/1996 |
| EP | 1 302 304 A1 * | 4/2003 |
| JP | 5-57496 | 3/1993 |
| JP | 5-57496 A | 3/1993 |

(Continued)

*Primary Examiner*—Robert Davis
*Assistant Examiner*—Thu Khanh T. Nguyen
(74) *Attorney, Agent, or Firm*—Buchanan Ingersoll PC

(57) ABSTRACT

A powder molding apparatus comprises a mold comprising a die having a powder molding space and upper and lower punch units, and a compression driving mechanism for performing compression molding by driving the upper and lower punch units independently, wherein molded articles formed by the compression molding are held by engaging lower first and second punches serving as a formed article holding mechanism at the time of transporting the molded articles. Thus, the molded articles can be prevented from falling or shifting while being transported between stages, thereby providing a powder molding apparatus capable of high speeds.

33 Claims, 34 Drawing Sheets

FOREIGN PATENT DOCUMENTS

| | | | |
|---|---|---|---|
| JP | 6-349663 | | 12/1994 |
| JP | 07-299598 | | 11/1995 |
| JP | 2695757 | | 9/1997 |
| JP | 10-258397 | A | 9/1998 |

* cited by examiner

VIEW FROM DIRECTION OF ARROW A

POWDER SUPPLYING STAGE A

POWDER SUPPLYING APPARATUS AND POWDER MOLDING APPARATUS

BACKGROUND OF THE INVENTION

1. Field of the Invention

The present invention relates to a powder molding apparatus for performing compression molding of powder material such as ceramics, foods, medicines, etc., using a mold formed of a die and upper and lower punch units.

2. Description of the Related Art

An example of such a powder molding apparatus is proposed in Japanese Patent No. 2695757, for example. This powder molding apparatus is configured so as to transport a rotating base upon which multiple molds are disposed over a powder supplying unit, compression molding unit, and product extracting unit, in that order, by means of a cam follower and track rail. This apparatus enables consecutive production of molded articles, thereby improving productivity.

Also, such powder molding apparatuses have in some cases conventionally used a rotating clamp mechanism which rotates in the same direction as the direction of compression driving as a clamp mechanism for the mold, from the perspective of doing away any play in attachment portion, regardless of whether manual or automatic.

On the other hand, in the event of sequentially transporting the mold to the powder supplying unit, compression molding unit, and product extracting unit, the mold is generally transported in a state wherein the upper and lower molds are fixed onto the same base plate. Accordingly, the position of the upper and lower molds are not affected by feeding precision or the like, and just determined by assembly precision.

Now, in order to further improve productivity with the above-described powder molding apparatus, an arrangement can be conceived wherein the transporting speed between the stages of the above rotating base is increased. However, increasing the rotating speed of the rotating base could conceivably result in molded articles falling or shifting due to the force of inertia or the like acting thereupon, and accordingly it has been supposed that high-speed transporting might not be able to be realized.

Also, with the above conventional powder molding apparatus, the structure involves restricting the position of the mold by means of a cam follower and track rail, so the forming process is determined by the track rail, and the mold moves with exactly the same profile regardless of what sort of mold is attached. Accordingly, the mold must be designed according to the track rail, which has been a problem in that the degree of freedom in the molding process has been small.

Also, with the above-described conventional mold clamp mechanism, in the event that the clamping direction is the same direction as that of the compression driving, if the molded article and the mold do not readily separate in the process of extracting the article from the mold following compression for example, trouble may occur such as separation not occurring with the clamp unit of the mold, the formed article being damaged at the time of separating, and so forth.

Further, with the structure wherein the above-described upper and lower molds are transported in a state of being fixed on the same base plate, the structure tends to become a massive configuration for integrally transporting the upper and lower molds. Accordingly, an arrangement can be conceived wherein only one of the upper and lower molds is transported, but in this case, the upper and lower molds must be positioned with each transportation, so there is demand for measures with regard to this issue.

SUMMARY OF THE INVENTION

The present invention has been made in light of the above-described problems, and accordingly it is an object of the present invention to provide a powder molding apparatus capable of handling high transporting speeds while preventing molded articles from falling or shifting while transporting, improving the freedom in the molding processing, and resolving problems such as damage and the like to molded articles while separating from the mold.

To this end, according to a first aspect of the present invention, a powder molding apparatus comprises: a mold comprising a die having a powder molding space, and upper and lower punch units; a compression driving mechanism for performing compression molding by driving the upper and lower punch units independently; and molded article holding means for holding a molded article, formed by the compression molding, in a state separated from the die at a predetermined position.

The molded article holding means may be configured so as to hold by engaging the molded article with one of the upper and lower punch units, or may be configured so as to hold by engaging the molded article with a engaging piece provided on the die. Also, the molded article holding means may be configured so as to hold by engaging the molded article with a guide member formed so as to encompass at least a part of the molded article, may be configured so as to hold by pressing the molded article with a pressing mechanism, or may be configured so as to hold the molded article by pressure difference between fluid pressure and atmospheric pressure using a fluid pressure generating mechanism.

According to a second aspect of the present invention, a powder molding apparatus comprises: a mold comprising a die having a powder molding space, and upper and lower punch units; a compression driving mechanism for performing compression molding by driving the upper and lower punch units independently; and punch positioning means for positioning the upper and lower punch units at the die.

The punch positioning means may comprise: a tapered block disposed on at least one of the upper and lower punch units; and a tapered portion formed on the die; wherein the punch positioning means are configured such that positioning is effected by tapered fitting of the tapered block to the tapered portion. The tapered block may be configured so as to be driven independently from the upper and lower punch units.

The punch positioning means may comprise: a positioning hole formed in the die; and a guide pin having a point, formed on at least one of the upper and lower punch units; wherein the punch positioning means are configured such that positioning is effected by fitting the point to the positioning hole.

This powder molding apparatus may further comprise depressurizing means for depressurizing by suctioning out air within the powder molding space, at the die or tapered block.

The depressurizing means may comprise a depressurizing channel formed so as to connect the die or tapered block with the powder molding space, and a vacuum generating source connected to the depressurizing channel.

The tapered block may be formed so as to envelop the powder molding space of the die and the surroundings thereof in an airtight manner, with the depressurizing channel being formed at the tapered block.

The depressurizing means may be configured so as to start depressurizing at the point that powder is supplied to the powder molding space, and maintain the state of depressurization until at least compression molding is performed.

According to a third aspect of the present invention, a powder molding apparatus comprises: a mold comprising a die having a powder molding space, and upper and lower punch units; a mold transporting mechanism for transporting the mold between at least a powder supplying stage, a compressing molding stage, and a molded article extracting stage; a compression driving mechanism for performing compression molding by driving the upper and lower punch units independently in the compressing molding stage; and linking means for detachably linking at least one of the upper and lower punch units to the compression driving mechanism, by moving in a direction orthogonal to the compression driving direction of the upper and lower punch units.

The linking means may comprise: a clamp main unit positioned and fixed on the compression driving mechanism; a sliding claw movably supported on the clamp main unit in the orthogonal direction; and a sliding driving mechanism for driving the sliding claw between a linking position for linking the punch unit to the compression driving mechanism and a non-linking position wherein the linkage is disengaged.

The sliding claw may comprise a tapered portion for tapered fitting with the punch unit. The sliding driving mechanism may be configured so as to linearly drive the sliding claw, or the sliding driving mechanism may be configured so as to rotationally drive the sliding claw.

According to a fourth aspect of the present invention, a powder molding apparatus comprises: a mold comprising a die having a powder molding space, and upper and lower punch units; a mold transporting mechanism for transporting the mold between at least a powder supplying stage, a compressing molding stage, and a molded article extracting stage; a compression driving mechanism for performing compression molding by driving the upper and lower punch units independently in the compressing molding stage; and unit holding means for holding the lower punch unit to the die when transporting between the stages, and disengaging the holding when transported to one of the stages.

The unit holding means may comprise a guide mechanism for supporting the lower punch unit so as to be movable in the direction of compression, and a holding mechanism for either fixing and holding or disengaging holding of the lower punch unit to the guide mechanism. The holding mechanism may further comprise a fastening lever axially supported to the lower punch unit by a rotating shaft, and a pressing member for causing plane contact of the fastening lever against the guide mechanism by rotationally pressing the fastening lever with the rotating shaft as the center thereof, so as to fix and hold the lower punch unit, wherein the unit holding mechanism is configured such that the fixing holding is disengaged by rotating the fastening lever in a direction opposite to the direction of pressing.

A permanent magnet or an electromagnet may be provided to the fastening lever to strengthen the force of fixing with the guide mechanism.

The holding mechanism may further comprise: a fastening lever axially supported to the lower punch unit by a rotating shaft; a permanent magnet for causing plane contact of the fastening lever against the guide mechanism by magnetic force for adsorption holding of the lower punch unit; and an electromagnet wherein application of electricity thereto cancels the magnetism of the permanent magnet and weakens the adsorption force thereof. The holding mechanism may further comprise a cam member movably supported on the lower punch unit and a pressing member which fixes by pressing the lower punch unit by friction from linear contact of the cam member against the guide mechanism, wherein the holding mechanism is configured so as to disengage the pressing fixing by moving the cam member in a direction opposite to the direction of pressing.

The cam member may be configured of a rotating cam movably supported to the lower punch unit by a rotating pair, or may be configured of a linear cam rotationally supported to the lower punch unit by a linear motion pair.

According to a fifth aspect of the present invention, a powder molding apparatus comprises: a mold comprising a die having a powder molding space, and upper and lower punch units; a mold transporting mechanism for transporting the mold between at least a powder supplying stage, a compressing molding stage, and a molded article extracting stage; a compression driving mechanism for performing compression molding by driving the upper and lower punch units independently in the compressing molding stage; molded article holding means for holding a molded article, formed by the compression molding, in a state separated from the die at a predetermined position; punch positioning means for positioning the upper and lower punch units at the die; linking means for detachably linking at least one of the upper and lower punch units to the compression driving mechanism, by moving in a direction orthogonal to the compression moving direction of the upper and lower punch units; and unit holding means for holding the lower punch unit to the die when transporting between the stages, and disengaging the holding when transported to one of the stages.

The unit holding means may comprise: a guide mechanism for supporting the lower punch unit so as to be movable in the direction of compression; a brake member provided independently from the guide mechanism; and a holding mechanism for fixing and holding the lower punch unit to the brake member.

The holding mechanism may further comprise: a fastening lever axially supported to the lower punch unit by a rotating shaft; and a pressing member for causing plane contact of the fastening lever against the brake member by rotationally pressing the fastening lever with the rotating shaft as the center thereof, thereby fixing and holding the lower punch unit; wherein the holding mechanism is configured such that the fixing holding is disengaged by rotating the fastening lever in a direction opposite to the direction of pressing.

A permanent magnet or an electromagnet may be provided to the fastening lever to strengthen the force of fixing with the brake member.

The holding mechanism may further comprise: a fastening lever axially supported to the lower punch unit by a rotating shaft; a permanent magnet for causing plane contact of the fastening lever against the brake member by magnetic force for adsorption holding of the lower punch unit; and an electromagnet wherein application of electricity thereto cancels the magnetism of the permanent magnet and weakens the adsorption force thereof.

The holding mechanism may further comprise a cam member movably supported on the lower punch unit and a pressing member which fixes by pressing the lower punch unit by friction from linear contact of the cam member against the brake member, wherein the holding mechanism is configured so as to disengage the pressing fixing by moving the cam member in a direction opposite to the direction of pressing.

The cam member may be configured of a rotating cam rotationally supported to the lower punch unit by a rotating pair, or configured of a linear cam linearly movably supported to the lower punch unit by a linear motion pair.

With the powder molding apparatus according to the first aspect, the die may be installed on a die set, with the upper and lower punch units comprising at least first and second punches, and the independent driving being performed by driving the first and second punches by a driving shaft, and the powder molding apparatus may further comprise linking means for linking the first and second punches to the die so as to relatively move in the compression direction but so as not to fall, and fixing means for collectively mounting and fixing the die to the die set along with the first and second punches.

The linking means may comprise grooves formed on each of the first and second punch holders for the first and second punches, extending in the compression direction and engaging pins fixed up the die and the first punch holder, wherein the linking means are configured such that the engaging pin of the die is engaged with the groove on the first punch holder, and the engaging pin of the first punch holder is engaged with the groove on the second punch holder.

The fixing means may be introduced between the die and die set, and may be configured of a fixing bush for causing taper fitting of the die and die set. Also, the fixing means may be configured of an actuator which presses and fixes the die to the die set with a pressing member introduced therebetween. Further, the fixing means may be introduced between the die and die set, and may be configured of a fluid pressure fixing member which presses and fixes the die to the die set by pressurizing a pressure fluid filled therein.

The powder molding apparatus may further comprise fastening means for detachably collectively fastening the first and second punches to the driving shaft. The fastening means may comprise hook-shaped claw members erected on pressure rams of each of the driving shafts and engaging pins fixed on each punch holder of the first and second punches, wherein the fastening means are configured so as to fasten the punch holders by engaging the engaging pins with the claw members.

Actuators may be connected to each of the punch holders, configured such that the punch holders are collectively fastened to the pressure rams by the actuators.

The die set may be configured so as to transport the mold between a powder supplying stage, a compressing molding stage, and a molded article extracting stage.

The powder molding apparatus may further comprise: linking means for linking the first and second punches to the die so as to relatively move in the compression direction but so as not to fall; fixing means for collectively mounting and fixing the die to the die set along with the first and second punches; and fastening means for detachably collectively fastening the first and second punches to the driving shaft.

According to a sixth aspect of the present invention, a powder molding apparatus, forming a powder molding space with a die, and an upper punch unit and lower punch unit, has the upper and lower punch units disposed so as to face one another across the die, wherein compression molding is performed by driving each of the upper and lower punch units independently with driving shafts, and wherein upon one of the driving shafts is placed the other of the driving shafts, configured such that the other of the driving shafts moves synchronously with the movement of the one of the driving shafts.

The die may be fixed to the upper and lower punch units and the upper and lower punch units comprise first and second punches respectively, and the other of the driving shafts may be placed upon a driving base moved and driven by the one of the driving shafts, configured such that moving the driving base causes the upper first and second punches and the lower first and second punches to move synchronously.

The die may be disposed on a transporting table with the transporting table configured so as to move between a powder supplying stage, a powder compressing stage, and a molded article extracting stage, in a direction orthogonal to the moving direction of the upper and lower punch units.

With a powder molding apparatus according to the first aspect of the present invention, the powder molding apparatus may have a powder molding space formed with a die, and upper and lower punches disposed so as to face one another across the die, with driving shafts being connected to each of the upper and lower punches, and compression molding performed by driving each of the upper and lower punches independently with the driving shafts by driving sources, and the driving shafts may be supported by a single base, with each of the driving sources being centrally disposed on the base.

The base may be disposed below the die with the die disposed and fixed on a frame portion formed as an extension of the base. Also, the base may be disposed below the die with the die disposed and fixed on a transporting table provided separately from the base, and the transporting table may be configured so as to move between a powder supplying stage, a powder compressing stage, and a molded article extracting stage.

The upper end portion of the one driving shaft may be linked to a upper mold supporting plate attached to the upper punch, so that the upper mold supporting plate is lowered with the one driving shaft while raising a lower mold supporting plate with the other driving shaft, by the driving sources, thereby effecting compression molding.

The driving shafts may be ball screws which are axially supported by the base, and the driving sources may be servo motors which are linked to the ball screws by timing belts.

The powder molding apparatus according to the first aspect may form a powder molding space with a die, and an upper punch unit and lower punch unit, with the upper and lower punch units disposed so as to face one another across the die, compression molding may be performed by driving each of the upper and lower punch units independently with driving shafts, and at least one of the upper and lower punch units may be configured so as to allow insertion of at least first and second punches in a relatively movable manner, with first and second driving shafts linked to the first and second punches, and the first and second driving shafts inserted in a hollow outer cylinder with the inner cylinder relatively movable in the axial direction.

The inner cylinder may protrude out from the openings at both ends of the hollow outer cylinder, with the first punch being linked to one end of the hollow outer cylinder by a first mold supporting plate and the other end thereof linked to a first driving source, and the second punch being linked to one end of the inner cylinder by a second mold supporting plate and the other end thereof linked to a second driving source, the hollow outer cylinder and inner cylinder being independently driven by the first and second driving sources.

Respective ball screws may be linked to the hollow outer cylinder and the inner cylinder, and servo motors serving as driving sources may be linked to the ball screws by timing belts.

The hollow outer cylinder may be supported by a movable base, the inner cylinder supported by a fixed base, and the die disposed and fixed on a frame portion integrally extended from the fixed base. Also, the hollow outer cylinder and the inner cylinder may be supported by a common movable base, the die disposed and fixed on a transporting table provided separately from the movable base, and the transporting table configured so as to move between a powder supplying stage, a powder compressing stage, and a molded article extracting stage.

The powder molding apparatus according to the first aspect may form a powder molding space for supplying powder material to the die, and the powder molding apparatus may further comprise: a powder storing unit to which a powder supplying tube is connected; a powder injecting hole formed at a portion of the bottom wall of the powder storing unit facing the powder molding space; and a scraping blade for sliding along the die to scrape away excess powder material outside the powder molding space, and also to close off the powder injecting hole.

The blade tip of the scraping blade may be at an acute angle as to the surface of the die upon which scraping blade slides, and may be formed of a ceramic.

A powder supplying opening of the powder supplying tube may be positioned so as to be offset outwards from the center of the powder injecting hole, and also pass through the ceiling of the powder storing unit to be inserted to the inside thereof.

A tapered portion may be formed at an edge of the powder injecting hole so as to fit with the blade tip of the scraping blade when closing off the powder injecting hole.

The scraping blade may be provided independently from the powder storing unit, pass through a slot formed in the powder storing unit and extend into the powder storing unit, and be driven to perform scraping action by an actuator disposed outside the powder storing unit.

According to a seventh aspect of the present invention, a powder molding machine comprises: a transporting table which is configured so as to transport a mold, having a powder molding space, between at least a powder supplying stage, a compressing molding stage, and a molded article extracting stage; and a powder supplying device for supplying powder material to the powder molding space in the mold, at the powder supplying stage; the powder supplying device comprising a powder storing unit to which a powder supplying tube is connected, a powder injecting hole formed at a portion of the bottom wall of the powder storing unit facing the powder molding space, and a scraping blade for sliding along the mold to scrape away excess powder material outside the powder molding space, and also to close off the powder injecting hole.

According to the first aspect of the present invention, molded articles separated from the die are held by a molded article holding means, so the molded articles can be prevented from falling or shifting during transporting, enabling increased transporting speed and thus improving productivity.

Holding by engaging the molded article with the lower punch unit ensures holding in a more secure manner by fitting the lower punch unit according to the form of the molded article, for example, fitting to the recess and protrusions of the molded article, and increase in costs can be avoided as compared to cases of providing a separate holding mechanism.

Holding by engaging the molded article with a engaging piece provided on the die prevents the molded article from falling or shifting during transporting, facilitating increased transporting speed in this case as well.

Holding by engaging the molded article with a guide member allows for transporting not dependent on gravity, and similarly facilitates increased transporting speed also.

Holding by pressing the molded article with a pressing mechanism also allows for transporting not dependent on gravity, and facilitates even more increased transporting speed.

Holding the molded article using a fluid pressure generating mechanism by pressurized air or by vacuum suction similarly facilitates increased transporting speed.

A second aspect of the present invention provides punch positioning means for positioning the upper and lower punch units at the die, so positioning between the upper punch unit and the die in the event of transporting the lower punch unit with the die, for example, can be performed in a secure manner, thereby ensuring quality and dimensional precision of the molded article.

Inserting the tapered block to the upper punch unit and fitting the tapered block to the tapered portion formed on the die allows positioning to be carried out in a sure manner with a simple structure.

Driving the tapered block independently from the upper punch unit prevents problems such as damage to the mold and so forth by the compression driving of the upper and lower punch units in a state wherein the tapered block is prepositioned on the die, thereby ensuring quality and dimensional precision of the molded article.

Positioning by fitting a guide pin, formed on the upper punch unit and having a point, to a positioning hole formed in the die, allows positioning to be performed in a secure manner as with the second aspect of the present invention, thereby ensuring quality and dimensional precision of the molded article.

Depressurizing by suctioning out air within the powder molding space formed by the die and upper and lower punch units allows the space between powder grains filling the die to be reduced, thereby preventing irregularities in powder density, and reducing the compression molding time.

An arrangement comprising a depressurizing channel formed at the die or tapered block, and a vacuum generating source connected to the depressurizing channel, allows depressurizing means to be configured with a simple structure, thereby suppressing increases in costs.

Forming the tapered block so as to envelop the powder molding space of the die and the surroundings thereof prevents scattering of powder to around the die.

Starting depressurizing at the point that powder is filled in the die and maintaining the state of depressurization until compression molding is performed enables the filling speed for supplying powder to the die to be increased, prevents scattering of powder at the time of filling, further does away with the need for depressurizing at the time of compressing, and thus reduces compression molding time.

With the third aspect of the present invention, detachably linking the lower punch unit to the compression driving mechanism by moving in a direction orthogonal to the compression direction with linking means allows the linking means to be designed more compactly, since no compression force acts in the linking direction. That is to say, with conventional arrangement wherein the linking direction and the compression direction are the same direction, the mold and molded article do not readily separate in the separating process following the compression molding, and the molded article could be damaged. The present invention solves the problem of necessitated increased strength of the linking means and surrounding parts, and increased complication of the structure thereof.

The arrangement wherein the linking means comprises a clamp main unit positioned and fixed on the compression driving mechanism, a sliding claw movably supported on the clamp main unit, and a sliding claw driving mechanism for moving the sliding claw, allows the linking and disengaging operation to be carried out with a simple structure for advancing and retracting the sliding claw to and from the clamp main unit, thereby suppressing increased costs.

Forming a tapered portion for tapered fitting with the lower punch unit on the sliding claw ensures secure linking between the lower punch unit and the compression driving mechanism, and also increases precision in positioning.

Linearly moving the sliding claw to link and disengage increases linking force.

Rotating the sliding claw to link and disengage reduces the rotational force of the sliding claw, enabling reduction in the size of the driving unit.

With the fourth aspect of the present invention, the lower punch unit is held to the die when transporting between the stages, and disengaged when transported to one of the stages, thereby preventing the lower punch unit from moving or falling during transportation. Also, the holding of the lower punch unit is disengaged when transported to one of the stages, so driving of the lower punch unit can be performed without problem.

Supporting the lower punch unit with a guide mechanism so as to be movable in the direction of compression, and either fixing and holding or disengaging holding of the lower punch unit to the guide mechanism by a holding mechanism, allows the lower punch unit to be held or disengaged with a simple structure, thereby suppressing increased costs.

The configuration wherein a fastening lever axially supported to the lower punch unit is brought into plane contact against the guide mechanism with a pressing member so as to fix and hold the lower punch unit enables the lower punch unit to be held with a simple structure and the minimum number of parts necessary.

Providing a permanent magnet or an electromagnet to the fastening lever to strengthen the force of fixing with the guide mechanism enables the lower punch unit to be fixed and held even more strongly.

Causing plane contact of the fastening lever against the guide mechanism by magnetic force for adsorption holding of the lower punch unit with a permanent magnet, and applying electricity to an electromagnet to weaken the adsorption force of the permanent magnet at the time of disengaging the holding enables holding and disengaging to be performed electrically.

Fixing the lower punch unit by pressing by friction from linear contact of a cam member movably supported on the lower punch unit against the guide mechanism increases the linear contact pressure with the guide mechanism by taking advantage of the wedging effect of the cam member, thereby securely holding the lower punch unit. Thus, even in the event that there are irregularities in the precision of manufacturing and assembling the cam member and guide mechanism, the irregularities can be absorbed and sufficient contact force can be obtained, thereby preventing positional shifting of the lower punch unit.

Configuring the cam member of a rotating cam enables the lower punch unit to be securely held with a simple structure and the minimum number of parts necessary.

Configuring the cam member of a linear cam further increases contact pressure with the guide mechanism, and enables the lower punch unit to be even more securely held.

With the fifth aspect of the present invention, a molded article separated from the die is held with a molded article holding means, so the molded articles can be prevented from falling or shifting during transporting, enabling increased transporting speed and thus improving productivity. According to this aspect, the invention also comprises punch positioning means for positioning the upper and lower punch units at the die, so positioning between the upper punch unit and the die in the event of transporting the lower punch unit with the die, for example, can be performed in a secure manner, thereby ensuring quality and dimensional precision of the molded article. Further, detachably linking the lower punch unit to the compression driving mechanism by moving in a direction orthogonal to the compression direction with linking means allows the linking means to be designed more compactly, since no compression force acts in the linking direction. Holding the lower punch unit as to the die when transporting between the stages, and disengaging when transported to one of the stages, prevents the lower punch unit from moving of falling during transportation. Also, the holding of the lower punch unit is disengaged when transported to one of the stages, so driving of the lower punch unit can be performed without problem.

Supporting the lower punch unit with a guide mechanism so as to be movable in the direction of compression, and fixing and holding the lower punch unit to a brake member provided independently from the guide mechanism, prevents wear of the guide mechanism accompanying the fixing and holding of the lower punch unit in the event of fixing the lower punch unit to the guide mechanism for example, thereby extending the life of the guide mechanism and improving the supporting precision of the lower punch unit. Also, the brake member can be configured of a structure and material different from that of the guide mechanism, and a material with a great friction coefficient and low cost can be selected.

Fixing and holding the lower punch unit by causing plane contact of a fastening lever axially supported to the lower punch unit against the brake member with a pressing member allows the lower punch unit to be held or disengaged with a simple structure, thereby suppressing increased costs.

Providing a permanent magnet or an electromagnet to the fastening lever to strengthen the force of fixing with the brake member enables the lower punch unit to be fixed and held even more strongly.

Causing plane contact of the fastening lever against the brake member by magnetic force for adsorption holding of the lower punch unit with a permanent magnet, and applying electricity to an electromagnet to weaken the adsorption force of the permanent magnet at the time of disengaging the holding, enables holding and disengaging to be performed electrically.

Fixing the lower punch unit by pressing by friction from linear contact of a cam member movably supported on the lower punch unit against the brake member increases the linear contact pressure with the brake member by taking advantage of the wedging effect of the cam member, thereby securely holding the lower punch unit, and obtaining the same advantages as those of a similar arrangement described above.

Configuring the cam member of a rotating cam enables the lower punch unit to be securely fixed and held with a simple structure and the minimum number of parts necessary.

Configuring the cam member of a linear cam further increases contact pressure with the brake member, and enables the lower punch unit to be even more securely held.

With the powder molding apparatus according to the first aspect, linking the first and second punches to the die so as to only move in the compression direction and collectively mounting and fixing the die to the die set along with the first and second punches allows the first and second punches to be removed along with the die when replacing the mold, with a simple task of taking the die off of the die set. Attaching a new mold similarly involves only the simple task of mounting and fixing the die to the die set, so the time required for replacing molds can be reduced in comparison with conventional arrangements which required the die set itself to be removed and attached, or the mold to be disassembled, thereby facilitating work. This facilitates replacement of molds for manufacturing a small number of articles each of a great number of types, thereby improving productivity, and meeting the above-described demands.

Slidably engaging the engaging pins of the die and first punch holder with the grooves on the first punch holder and the second punch holder allows the first and second punches to be linked to the die so as to not fall, with a simple structure. Making the width of the grooves to be approximately the same as with width of the engaging pins prevents axial rotation of the punch holders.

Tapered fitting of the die and die set with a fixing bush allows the die to be positioned and fixed simply by mounting the fixing bush on the die set, thereby improving positioning precision, and further improving ease of work.

Pressing and fixing the die to the die set with an actuator through a pressing member allows the mold exchanging work to be performed automatically, further improving ease of work.

Pressing and fixing the die to the die set using fluid pressure allows the die to be mounted and fixed with a simple task, enables further reduction in mold replacement time, and improves ease of work. Also, the fixing bush uniformly expands in the radial direction (inwards and outwards) due to the fluid pressure, so the die can be precisely positioned to the position of the die set.

Detachably collectively fastening the first and second punches to the driving shaft allows the punch units to be easily removed from the driving shaft when replacing molds, thereby reducing the mold replacing time, and improving ease of work.

Erecting hook-shaped claw members on pressure rams of each of the driving shafts and fixing engaging pins on each of the punch holders so as to engage the claw members allows attaching and removing to be performed with a simple structure, improving ease of work form this perspective as well.

Fastening punch holders to the pressure rams by actuators allows the mold exchanging work to be performed automatically, further improving ease of work.

Transporting the mold between the stages allows consecutive production while manufacturing a small number of articles each of a great number of types.

Linking the first and second punches to the die so as to only move in the compression direction and collectively mounting and fixing the die to the die set along with the first and second punches allows the first and second punches to be removed along with the die when replacing the mold with a simple task of taking the die off of the die set, obtaining the same advantages as those of the first aspect of the present invention. Also, collectively detachably fastening the first and second punches to the driving shaft allows the punch units to be readily removed from the driving shaft in the event of replacing the mold, so the mold replacing time can be reduced, and ease of work improved.

According to the sixth aspect of the present invention, placing one of the driving shafts for independently driving the upper and lower punch units upon the other of the driving shafts and moving the other of the driving shafts synchronously with the movement of the one of the driving shafts allows the powder material to be subjected to compression forming by independently driving the upper and lower punch units by the driving shafts at the time of compression molding, and allows the upper and lower punch units to be moved in a state wherein the distance between the punches is maintained by driving one driving shaft at the time of separating, so as to separate the molded article in a state wherein the die is fixed. This simplifies the structure of the powder supplying device and molded article extracting device, thereby suppressing increased costs.

Fixing the die to the upper and lower punch units with the upper and lower punch units comprising first and second punches respectively, and placing and the other of the driving shafts upon a driving base moved and driven by the one of the driving shafts such that moving the driving base causes the upper first and second punches and the lower first and second punches to move simultaneously, allowing the molded article to be separated in a state wherein the distance between the first and second punches is maintained, thus obtaining the same advantages as those of the first aspect.

Disposing the die on a transporting table which moves between a powder supplying stage, a powder compressing stage, and a molded article extracting stage, allows high-speed consecutive production of molded articles, thereby improving productivity.

Supporting the driving shafts driving the upper and lower punches by a single base, and centrally disposing the driving sources on the base, facilitates assembly precision of the driving unit since the reference plane for attached the driving shafts and driving source only needs to be provided on the base, thereby facilitating the assembly work and maintenance work. Also, concentrating the heavy components of the driving sources and driving shafts on a base allows the rigidity of the overall apparatus to be alleviated by increasing the rigidity of the base itself, thus contributing to reduction in size and in costs.

Disposing the base below the die with the die disposed and fixed on a frame portion formed as an extension of the base allows the die to be supported by and fixed on a base with great rigidity, thereby ensuring rigidity at the time of compression.

Disposing the base below the die with the die disposed and fixed on a transporting table with the transporting table moving between stages enables high-speed consecutive production of molded articles, improving productivity.

Lowering the upper mold supporting plate attached to the upper punch with the driving shaft while raising the lower mold supporting plate attached to the lower punch with the driving shaft, thereby effecting compression molding, allows the height-wise dimensions of the apparatus to be reduced as compared with conventional arrangements wherein driving units are disposed above and below the die plate, thereby contributing to even further reduction in size.

Driving the upper and lower punches by ball screws by servo motors with timing belts allows the stroke precision of the punches to be increased, back-lashing to be avoided, and accordingly, the quality and dimensional precision of the molded articles can be improved.

Arranging the first and second driving shafts driving the punches as an inner cylinder inserted in a hollow outer cylinder relatively movable in the axial direction allows the placement space of the driving shafts to be reduced, contributing to reduction in size of the overall apparatus. Also, the driving shafts driving the punches have a concentric structure of an inner cylinder inserted in a hollow outer cylinder, so the positional precision of the hollow outer cylinder increases matching the position of the inner cylinder, thereby increasing the positional precision of the working punches themselves.

Driving the hollow outer cylinder and inner cylinder independently by the first and second driving sources with the first and second mold supporting plates allows the freedom of form and so forth of the molded articles to be expanded, and also realizes uniform density of molded articles.

Driving the hollow outer cylinder shafts and inner cylinder by servo motors linked to the ball screws by timing belts allows the stroke precision of the punches to be increased, back-lashing to be avoided, and accordingly, the quality and dimensional precision of the molded articles can be improved.

Supporting the hollow outer cylinder by a movable base, the inner cylinder by a fixed base, and disposing and fixing the die on a frame portion integrally extended from the fixed base, allows the inner cylinder and die to be supported by a fixed base with high rigidity, thereby ensuring rigidity at the time of compression.

Supporting the hollow outer cylinder and the inner cylinder by a common movable base, disposing and fixing the die on a transporting table provided separately from the movable base, and moving the transporting table between the stages, enables high-speed consecutive production of molded articles, thereby improving productivity.

Forming a powder injecting hole at the bottom wall of a powder storing unit, and providing a scraping blade to scrape away excess powder material outside the powder molding space, and also to close off the powder injecting hole, enables scraping off of excess powder material and closing off of the powder injecting hole at the same time simply by moving the scraping blade, so there is no need to move the entire powder supplying box or to keep in constant contact with the die as with conventional arrangements, application to be made to dice with small areas of scraping contact, and also, application can be made to consecutive molding apparatuses.

Making the blade tip of the scraping blade to be at an acute angle as to the surface of the die upon which scraping blade slides allows the excess powder material outside the molding space to be smoothly scraped off without causing the powder material to scatter, the face of the scraped powder material can be made uniform, and irregularities in the density of powder filling and the amount of supplying can be prevented.

Forming the scraping blade of a ceramic material suppresses wear of the blade tip even after repeated scraping operations, thus extending the life thereof as compared to conventional arrangements wherein felt is applied.

Offsetting the powder supplying tube outwards from the center of the powder injecting hole keeps the pressure due to change in the amount of the powder remaining within the hopper from directly acting upon the powder injecting hole, thereby preventing irregularities in powder density within the powder storing unit, thus preventing irregularities in filling density. Also, passing the powder supplying tube through the ceiling of the powder storing unit to be inserted to the inside thereof, so space can be left within the powder storing unit, suppressing change in the density of powder in the powder storing unit due to change in the amount of powder remaining in the hopper, also preventing irregularities in filling density. Further, offsetting the powder supplying tube outwards from the center of the powder injecting hole and passing the powder supplying tube through the ceiling of the powder storing unit inside causes the injected powder material to heap up (in a bridging form) from the bottom wall of the powder storing unit toward the powder supplying tube at the top, so no more powder is supplied, and only as much powder material as necessary is supplied.

Forming a tapered portion at an edge of the powder injecting hole so as to fit with the blade tip of the scraping blade allows any gap between the two to be done away with when closing off the powder injecting hole with the scraping blade, thereby preventing leaking of the powder material.

Providing the scraping blade independently from the powder storing unit so as to be driven from outside the powder storing unit allows the change in volume within the powder storing unit with the scraping blade provided to be reduced, maintaining the amount of powder stored within the powder storing unit.

According to a seventh aspect of the present invention, a powder molding machine, comprising a transporting table for sequentially transporting a mold between a powder supplying stage, a powder molding stage, and a molded article extracting stage, so as to mold molded articles, uses the powder supplying device described above, so powder supplying can be smoothly performed at the powder supplying stage without allowing powder to scatter around, and thus applicable to consecutive production.

DESCRIPTION OF THE PREFERRED EMBODIMENTS

Figure 1:
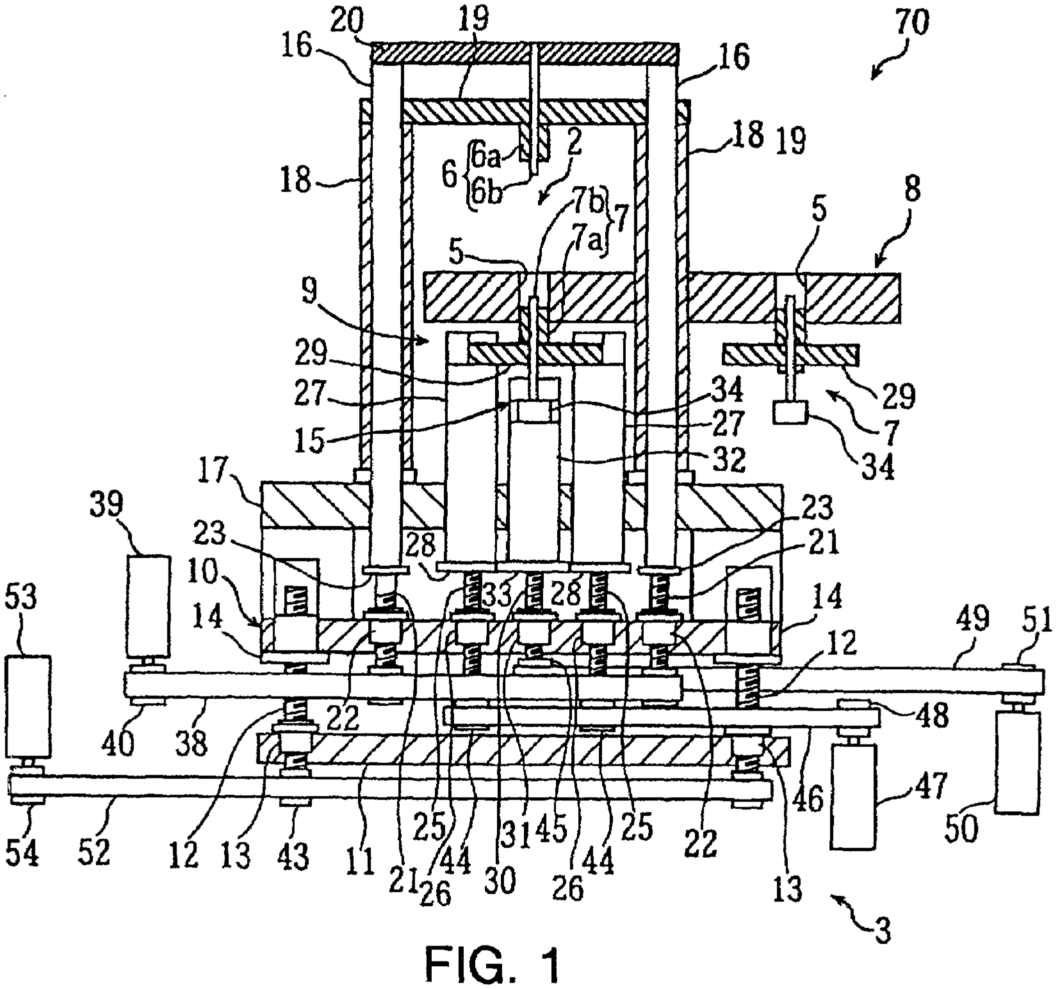
FIG. 1 is a schematic configuration diagram describing the powder molding apparatus according to a first embodiment of the present invention.
Figure 2:
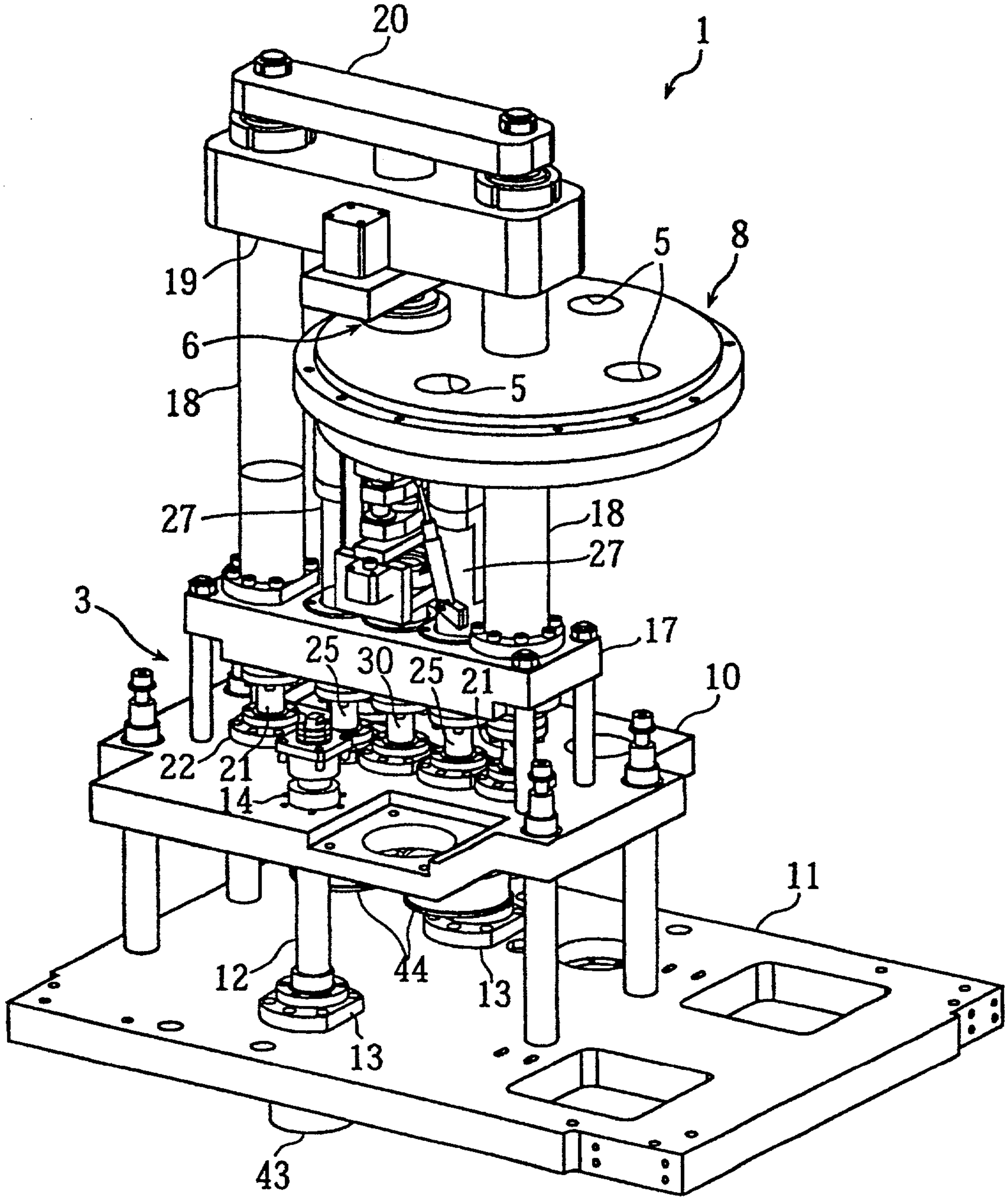
FIG. 2 is a perspective view of the powder molding apparatus.
Figure 3:
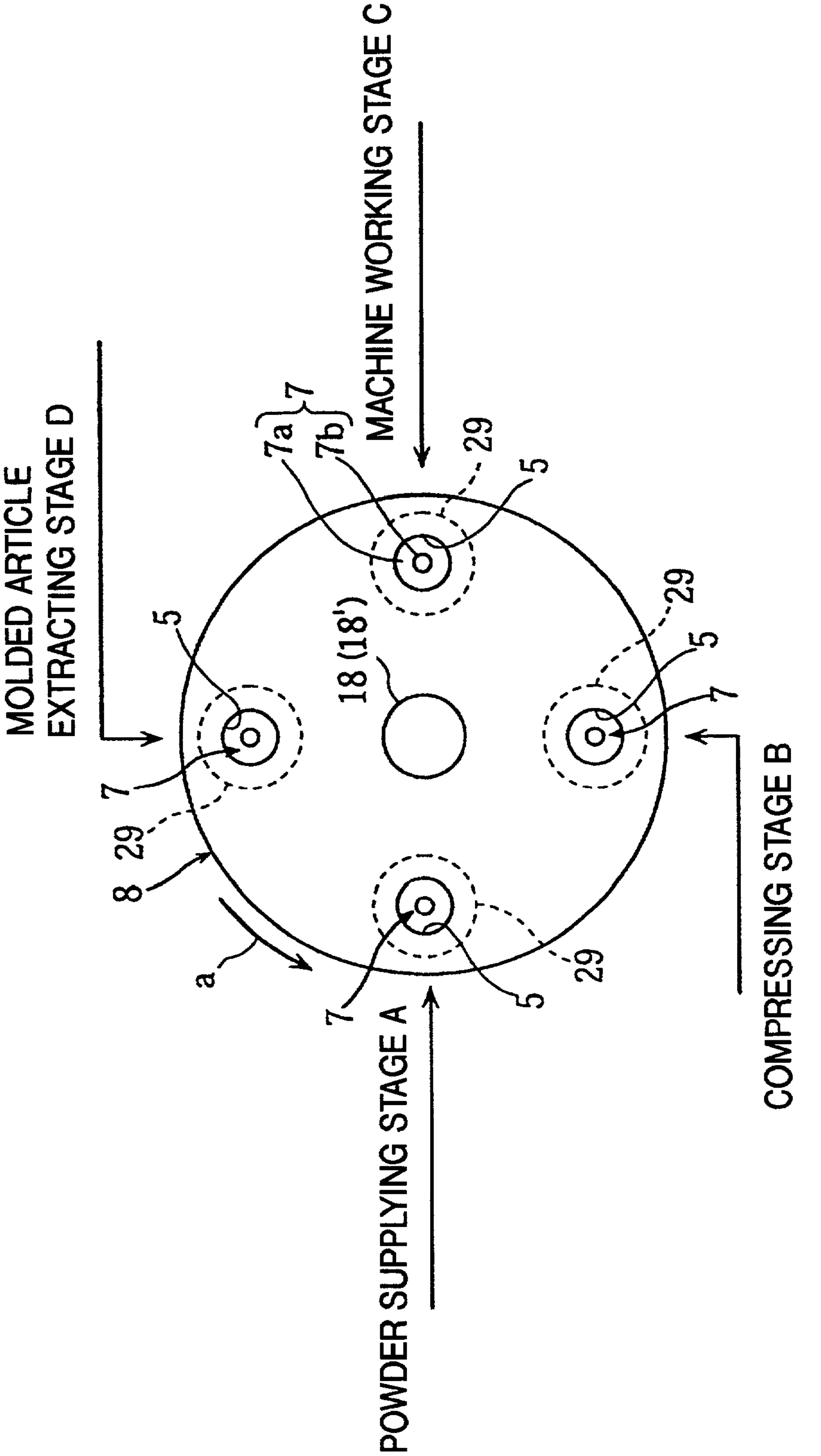
FIG. 3 is a plan view illustrating the action of the transporting table of the powder molding apparatus.
Figures 4A, 4B, 4C, 4D:
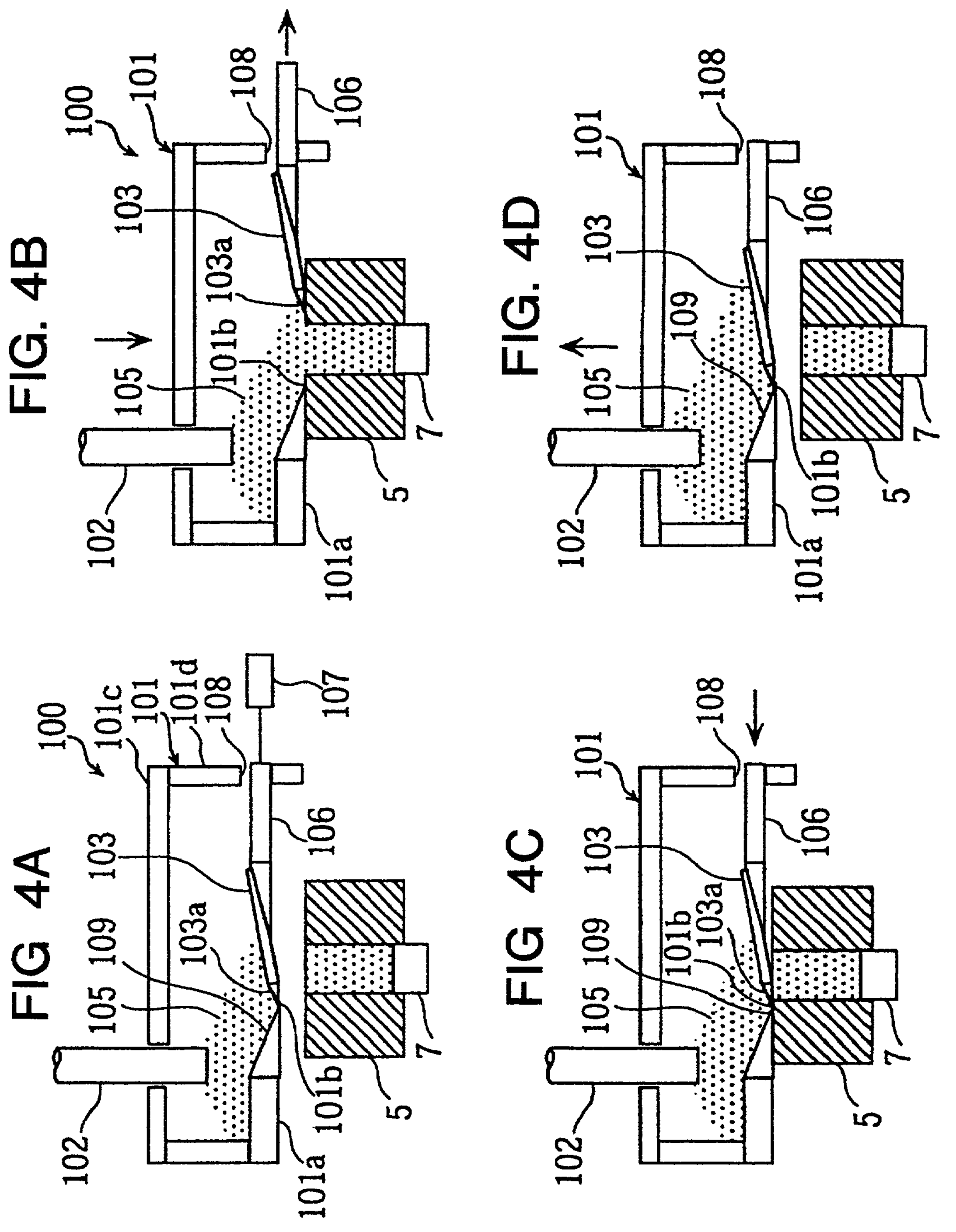
FIGS. 4A through 4D are diagrams illustrating the action of the powder injecting mechanism of the powder molding apparatus.
Figure 5:
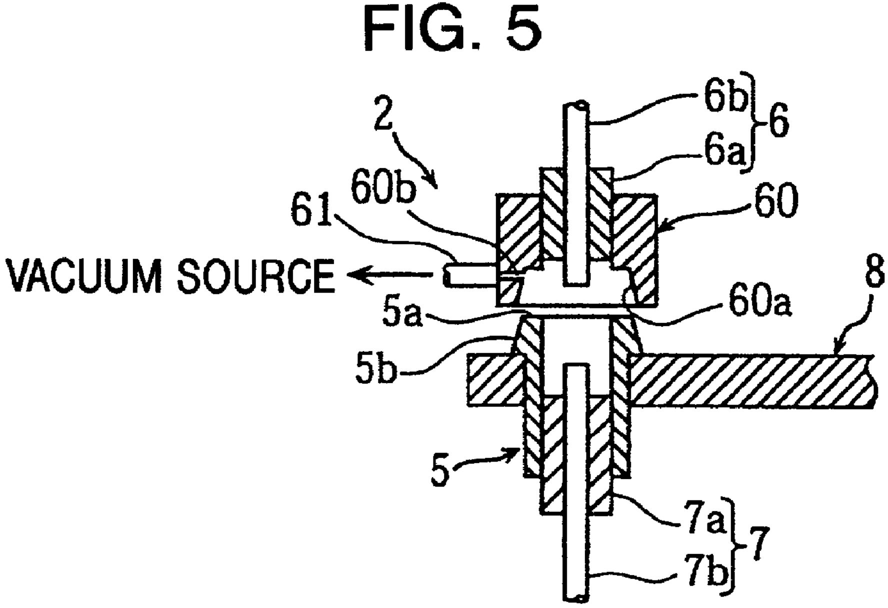
FIG. 5 is a cross-sectional view of molding positioning means of the mold of the powder molding apparatus.
Figure 6:
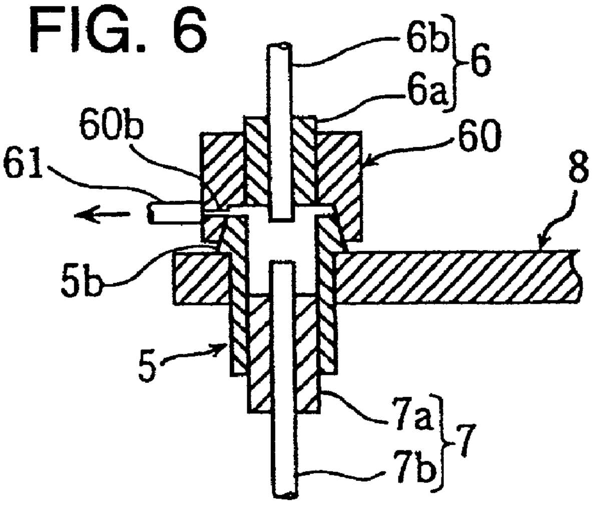
FIG. 6 is a cross-sectional view of the molding positioning means.
Figure 7A:
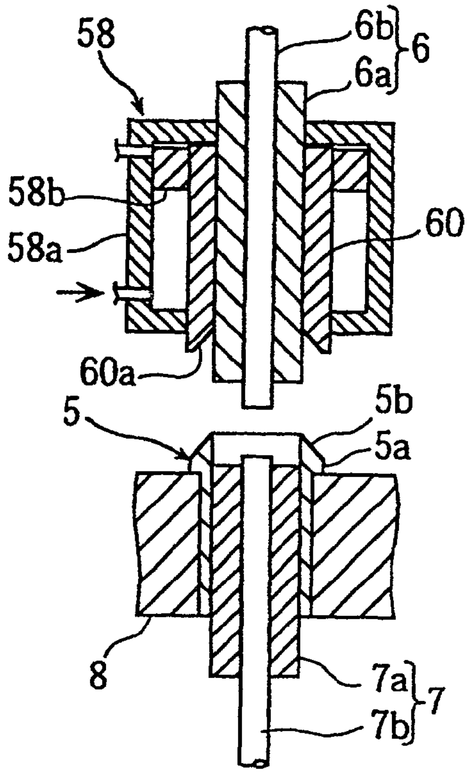
FIGS. 7A and 7B are cross-sectional views of the elevating driving mechanism of the tapered block of the powder molding apparatus.
Figure 7B:
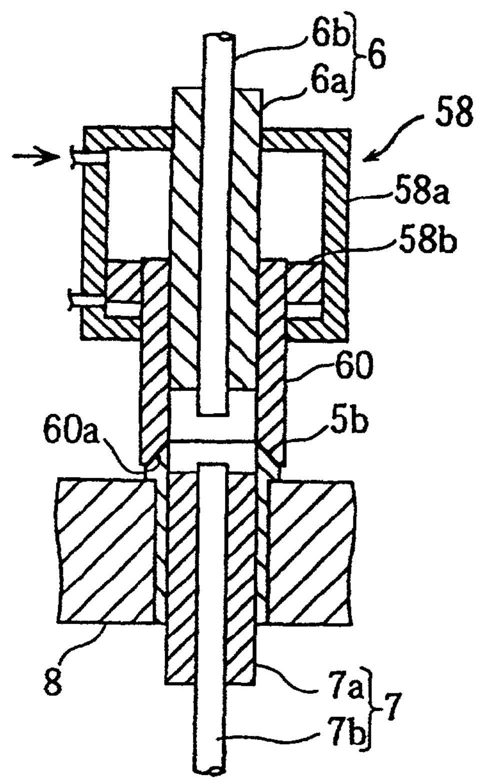
Figure 8:
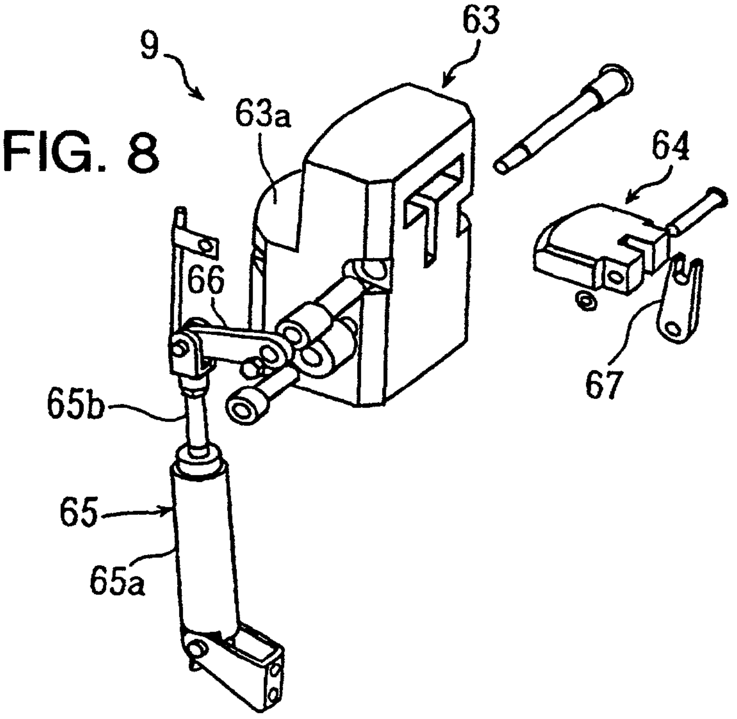
FIG. 8 is a disassembled perspective view of the linking means of the powder molding apparatus.
Figure 9A:
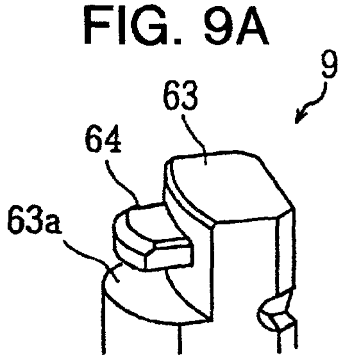
FIGS. 9A and 9B are perspective diagrams of the linking means.
Figure 9B:
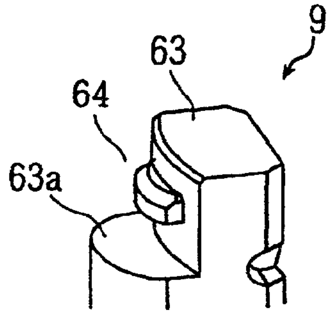
Figure 10A:
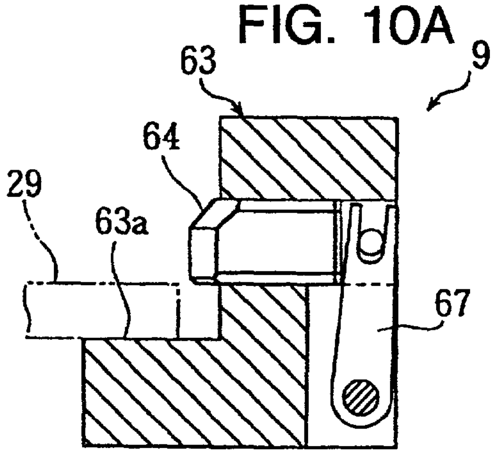
FIGS. 10A and 10B are cross-sectional views of the linking means.
Figure 10B:
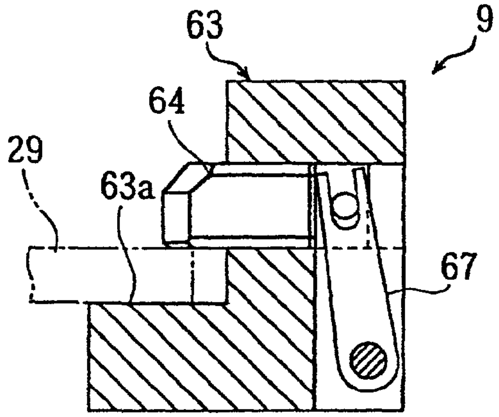
Figure 11:
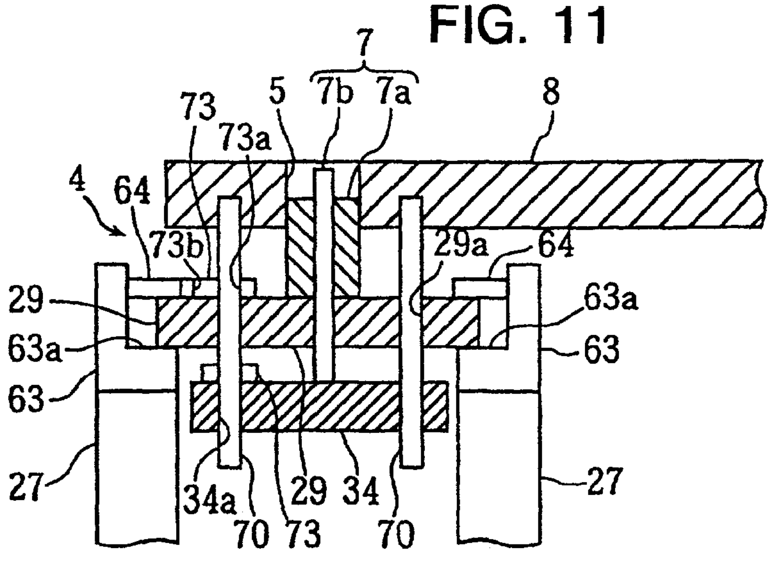
FIG. 11 is a cross-sectional view of unit holding means of the powder molding apparatus.
Figure 12:
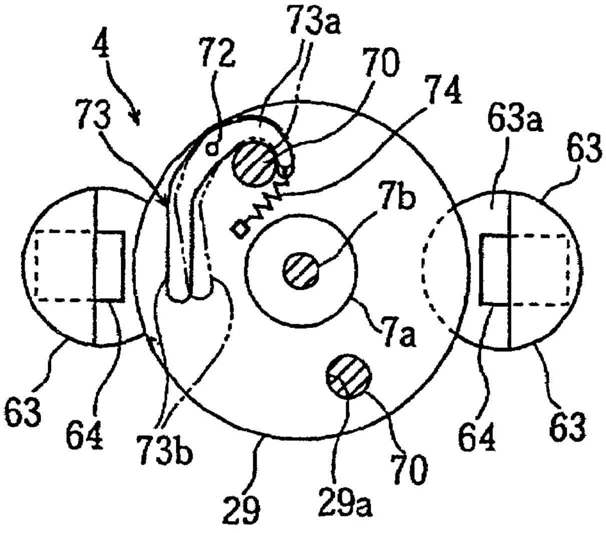
FIG. 12 is a plan view of the unit holding means.

FIGS. 1 through 15B are diagrams describing a powder molding apparatus according to a first embodiment of the present invention. FIGS. 1 and 2 are a schematic configuration diagram and perspective view of the powder molding apparatus, FIG. 3 is a plan view illustrating the rotating action of the transporting table, FIGS. 4A through 4D are diagrams illustrating the action of the powder injecting mechanism, FIGS. 5 and 6 are cross-sectional views of the molding positioning means of the mold, FIGS. 7A and 7B are cross-sectional views of the elevating driving mechanism of the tapered block, FIGS. 8, 9A and 9B, and 10A and 10B, are a disassembled perspective view, perspective diagrams, and cross-sectional views of the linking means; FIGS. 11 and 12 are a cross-sectional view and plan view of unit holding means, and FIGS. 13A through 15B are diagrams illustrating the state of the lower punch unit holding a molded article.

In the figures, reference numeral 1 denotes a powder molding apparatus which manufactures ceramic electronic part elements by compressing molding of a ceramic powder material. The powder molding apparatus 1 comprises: a mold 2 made up of a die 5 having a powder molding space, and upper and lower punch units 6 and 7; a disc-shaped transporting table (mold transporting mechanism) 8 for transporting the mold 2 between a powder supplying stage A, a compression molding stage B, a machine working stage C, and a molded article extracting stage D; a compression driving mechanism 3 for performing compressing molding of the ceramic powder material; linking means 9 for detachably linking the lower punch unit 7 to the compression driving mechanism 3 at predetermined positions at the stages A through D, unit holding means 4 for detachably holding the lower punch unit 7 to the transporting table 8, and a powder injecting mechanism 100 for injecting the powder material into the mold 2 at the powder supplying stage A.

Four dice 5 are disposed and fixed at 90° intervals on the perimeter of the transporting table 8. The upper punch unit 6 has an upper second punch 6*b* formed of a core pin inserted within a cylindrical upper first punch 6*a* in a relatively movable manner, and also, the lower punch unit 7 similarly has a lower second punch 7*b* formed of a core pin inserted within a cylindrical lower first punch 7*a* in a relatively movable manner. The upper punch unit 6 is input disposed at the compressing forming stage B, and lower punch units 7 disposed below each of the dice 5 on the transporting table 8.

The transporting table 8 is rotationally driven by external rotational driving means (not shown), and is configured so as to continuously transport the mold 2 in the order of the powder supplying stage A, compression molding stage B, machine working stage C, and molded article extracting stage D.

As shown in FIG. 3, upon a die 5 being filled with the ceramic powder material by the later-described powder injecting mechanism 100, the transporting table 8 rotates 90° in the direction indicated by the arrow "a". Thus, the mold 2 filled with the ceramic powder material is transported to the powder compressing stage B, and here compression molding is performed by the upper and lower punch units 6 and 7. At this time, the next die 5 transported to the powder supplying stage A is filled with the ceramic powder material.

Once the compressing molding is completed, the transporting table 8 rotates 90°, the molded article which has been formed by the compression molding is transported to the machine working stage C, and subjected to machine working such as grinding, hole-opening, flash removal, and so forth. At this time, compression molding is performed on the next ceramic powder at the powder compressing stage B, and the next die 5 transported to the powder supplying stage A is filled with the ceramic powder.

Once the predetermined machine working is completed at the machine working stage C, the transporting table 8 rotates 90°, the molded article that has been worked is transported to the molded article extracting stage D, where the molded article is extracted, and recovered to a predetermined place. Subsequently, the empty die 5 is transported to the powder supplying stage A again. Thus, the transporting table 8 rotates sequentially such that molded articles are continuously manufactured.

The powder injecting mechanism 100 comprises: a powder storing unit 101 in a form of a generally airtight box, disposed above the transporting table 8 and capable of being raised or lowered; a powder supplying tube 102 for supplying powder material 105 within the powder storing unit 101; a powder injecting hole 101*b* formed in the center of a bottom wall 101*a* of the powder storing unit 101 for injecting powder material 105 into the dice 5; and a scraping blade 103 for opening and closing the powder injecting hole 101*b*.

The powder supplying tube 102 is offset to the side from a position facing the powder injecting hole 101*b*, and is inserted through the ceiling 110*c* so as to be positioned at a vertically intermediate position within the powder storing unit 101. A hopper (not shown) is connected at the upper end of the powder supplying tube 102.

The scraping blade 103 is formed of a ceramic material, with the blade tip 103*a* being formed at an acute angle. The scraping blade 103 is linked to an actuator 107 disposed outside the powder storing unit 101, by a supporting member 106, and is driven between a closed position wherein the powder injecting hole 101*b* is closed and an open position wherein the powder injecting hole 101*b* is open, by the actuator 107. The supporting member 106 is linked to the actuator 107 by a slit 108 formed in the side wall 110*d* of the powder storing unit 101.

Also, a tapered portion 109 which fits with the blade tip 103*a* of the scraping blade 103 is formed at the edge of the powder injecting hole 101*b*. This arrangement is such that, at the point that the scraping blade 103 moves from the open position to the closed position, the blade tip 103*a* abuts the tapered portion 109 so as to ride up somewhat.

As shown in FIGS. 4A through 4D, upon the die 5 being transported to the powder supplying stage A, the powder injecting mechanism 100 lowers the powder storing unit 101 to the standby position that the bottom wall 101*a* comes into contact with the upper plane of the die 5. The powder injecting hole 101*b* and the cavity of the die 5 match at this lowered position.

The scraping blade 103 is retracted by the actuator 107, causing the powder injecting hole 101*b* to open, the powder material 105 flows out from the powder injecting hole 101*b*, and is injected within the cavity of the die 5.

Subsequently, the scraping blade 103 moves forward by the actuator 107, such that the blade tip 103*a* scrapes away the excess powder material 105 showing out of the cavity while scraping the surface of the die 5, the excess powder is returned to the powder storing unit 101, and the powder injecting hole 101*b* is closed off. At this time, the blade tip 103*a* rides up on the tapered portion 109 so as to close off the powder injecting hole 101*b*. Subsequently, the powder storing unit 101 rises to the standby position.

The compression driving mechanism 3 has the following structure. A driving base 10 is disposed below the transporting table 8 so as to be vertically driven, and a fixed base 11 is disposed and fixed below the driving base 10 so as to not be moved. Upper first ball screws 12 making up one of the driving shafts are rotatably supported by this fixed base 11 by bearings 13, with the bearings 13 being attached and fixed to the fixed base 11. Nuts 14 attached and fixed to the driving base 10 are screwed onto the upper first ball screws 12.

A supporting table 17, having the shape of a box with one side open and facing downwards, is attached and fixed to the driving base 10, with cylindrical upper first poles 18 which are the other of the driving shafts, erected on the upper face of the supporting table 17. An upper first mold supporting plate 19 is laid across between the upper ends of the poles 18 and thus fixed, and the upper first punch 6*a* is attached and fixed on the lower face of the upper first mold supporting plate 19. Rotating the upper first ball screws 12 causes the upper first punch 6*a* to move vertically along with the driving base 10 and both upper first poles 18.

Upper second ball screws 21 are rotatably supported on the driving base 10 by bearings 22, with the bearings 22 being attached and fixed to the driving base 10. The upper second ball screws 21 are inserted into upper second poles 16 slidably supported by the supporting table 17, and screws to nuts 23 inserted and fixed to the lower end of the upper second poles 16. Also, an upper second mold supporting plate 20 is laid across between the upper ends of the upper second poles 16 and thus fixed, and the upper second punch 6*b* is attached and fixed on the lower face of the mold supporting plate 20. Rotating the upper second ball screws 21 causes the upper second punch 6*b* to move vertically along with the upper second poles 16.

The upper first poles 18 have cylindrical shapes, and the upper second poles 16 are concentrically inserted within the upper first poles 18 so as to be relatively slidable. Concentrically inserting the upper second poles 16 within the upper first poles 18 allows the width dimensions of the driving base 10 to be reduced as compared to arrangements wherein the poles are arrayed in parallel, thus contributing to reduction in size of the overall apparatus.

Lower first ball screws 25 are rotatably supported on the driving base 10 by bearings 26, with the bearings 26 being attached and fixed to the driving base 10. The lower first ball screws 25 are inserted into lower first poles 27 slidably supported by the supporting table 17, and screwed to nuts 28 inserted and fixed to the lower end of the lower first poles 27.

A lower first mold supporting plate 29 is detachably linked between the upper end of the lower first poles 27 with the linking means 9 introduced therebetween, and the lower first punch 7*a* is attached and fixed on the upper face of the mold supporting plate 29. Rotating the lower first ball screws 25 causes the lower first punch 7*a* to move vertically along with the lower first poles 27.

A lower second ball screw 30 is rotatably supported on the driving base 10 between the lower first ball screws 25 by bearings 31, with the bearings 31 attached and fixed to the driving base 10. The lower second ball screws 30 are inserted into lower second poles 32 slidably supported by the supporting table 17, and screwed to nuts 33 inserted and fixed to the lower end of the lower second poles 32.

Also, a lower second mold supporting plate 34 is detachably linked to the top of the lower second poles 32 with the linking means 9 introduced therebetween, and the lower second punch 7*b* is attached and fixed on the upper face of the mold supporting plate 34. Rotating the lower second ball screw 30 causes the lower second punch 7*b* to move vertically along with the lower second poles 32. Thus, all of the ball screws 12, 21, 25, and 30, are concentrated on the driving base 10.

The upper second ball screws 21 and the lower first and second ball screws 25 and 30 pass through the driving base 10 and protrude downwards, with slave pulleys 37, 44, and 45 mounted to the protruding portions of these.

An upper second timing belt 38 passes over the driving pulley 37 of the upper second ball screws 21, and the timing belt 38 passes over a driving pulley 40 mounted on an upper second servo motor 39. Thus, rotation of the upper second servo motor 39 causes the upper second punch 6*b* to vertically move along with both upper second poles 16.

A lower first timing belt 46 passes over the slave pulleys 44 of the lower first ball screws 25, and the timing belt 46 passes over a driving pulley 48 mounted on a lower first servo motor 47. Thus, rotation of the lower first servo motor 47 causes the lower first punch 7*a* to vertically move along with both lower first poles 27.

A lower second timing belt 49 passes over the slave pulley 45 of the lower second ball screw 30, and the timing belt 49 passes over a driving pulley 51 mounted on a lower second servo motor 50. Thus, rotation of the lower second servo motor 50 causes the lower second punch 7*b* to vertically move along with the lower second poles 32.

The upper first ball screws 12 pass through the fixed base 11 to protrude downwards, with slave pulleys 43 mounted to the protruding portions. An upper first timing belt 52 passes over slave pulleys 43, and the timing belt 52 passes over a driving pulley 54 mounted on an upper first servo motor 53. The servo motors 53, 39, 47, and 50, are concentrated around the driving base 10, with the upper first servo motor 53 attached and fixed to the fixed base 11, and the upper first servo motor 39 and lower first and second servo motors 47 and 50 attached and fixed to the driving base 10, with respective brackets or the like.

Such independent driving of the upper first and second punches 6*a* and 6*b* and lower first and second punches 7*a* and 7*b* with the servo motors 53, 39, 47, and 50 allows working of molded articles having cylindrical shapes, hollow cylindrical shapes, cross-sectional H shapes, cross-sectional cross shapes, for example, to be realized. That is to say, the feeding of the upper first and second ball screws 12 and 21 lowers the upper first and second punches 6*a* and 6*b*, the feeding of the lower first and second ball screws 25 and 30 raises the lower first and second punches 7*a* and 7*b*, thereby performing compression molding. In this case, the descent of the lower first and second punches 7*a* and 7*b* accompanying the descent of the driving base 10 is absorbed by making the amount of feeding of the lower first and second ball screws 25 and 30 to be greater by the amount of feeding of the upper first ball screws 12.

Also, rotating the upper first servo motor 53 in the state that the upper second servo motor 39 and the lower first and second servo motors 47 and 50 are stopped causes the upper first and second punches 6*a* and 6*b* and the lower first and second punches 7*a* and 7*b* to be moved vertically along with the driving base 10 in a synchronous manner. Thus, this allows the molded article to be separated from the mold on the transporting table 8 with the distance between the punches maintained. That is to say, at the point that the compression molding process ends, the upper second servo motor 39 and the lower first and second servo motors 47 and 50 are stopped, which fixes the upper second ball screws 21 and lower first and second ball screws 25 and 30. In this state, the upper first ball screws 12 are rotated by the upper first servo motor 53. This causes the driving base 10 rise, and also for the upper first and second punches 6*a* and 6*b* and the lower first and second punches 7*a* and 7*b* to be raised with the distance between the punches maintained.

A punch positioning means for positioning the upper punch unit 6 at the die 5 transported to the compression molding stage B is disposed on the mold 2. As shown in FIGS. 5 through 7B, the positioning means comprises a tapered block 60 into which the first punch 6*a* of the upper punch unit 6 is inserted, and a tapered portion 5*a* integrally formed at the upper opening portion of the die 5, with a recessed tapered face 60*a* having a greater diameter than that of the upper first punch 6*a* being formed on the lower inner circumference of the tapered block 60.

The tapered portion 5*a* of the die 5 protrudes out from the upper face of the transporting table 8, and a protruding tapered face 5*b* which fits with the recessed tapered face 60*a* is formed on the outer perimeter of the tapered portion 5*a*. Also, the tapered block 60 is independently driven so as to rise and descend independently from the upper punch unit 6, by means of an elevating driving mechanism 58. This elevating driving mechanism 58 has a structure of inserting the tapered block 60 within a cylinder 58*a*, and also sectioning within the cylinder 58*a* into two chambers by a piston 58*b* mounted and fixed to the tapered block 60, such that the tapered block 60 rises and descends by supplying compressed air into the chambers of the cylinder 58*a*.

A depressurizing means for suctioning the air within the powder molding space so as to depressurize the space is disposed on the tapered block 60. The depressurizing means comprises a depressurizing channel 60*b* formed on the tapered block 60, and a vacuum pump (not shown) connected to the depressurizing channel 60*b* by a suction hose 61. Also, the depressurizing means is configured so as to start depressurizing within the powder molding space at the time of filling the die 5 with the powder material at the powder supplying stage A, and to maintain the depressurization until the compression molding at the next compression molding stage B.

The lower punch unit 7 functions as a molded article holding means. The first and second punches 7*a* and 7*b* of the lower punch unit are independently driven by the lower first and second ball screws 25 and 30 as described above, so as to hold by fitting the lower first and second punches 7*a* and 7*b* to the form of the molded article.

Figure 13A:
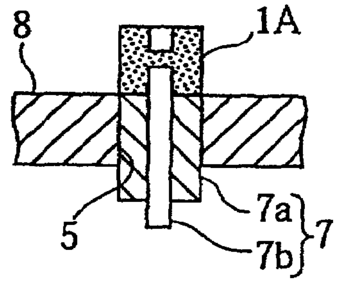
FIGS. 13A and 13B are diagrams illustrating the state of the lower punch unit (molded article holding means) of the powder molding apparatus holding a molded article.
Figure 13B:
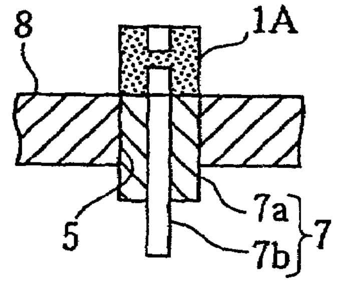

For example, as shown in FIGS. 13A and 13B, in the event that the vertical-sectional face of the molded article 1A has a H shape, following separating the molded article 1A from the die 5, the lower second punch 7*b* is fit into the recess in the molded article 1A so as to hold it. Then, in this state, this is transported to the molded article extracting stage D, and the molded article 1A is extracted at the molded article extracting stage D by lowering the second punch 7*d*.

Figure 14A:
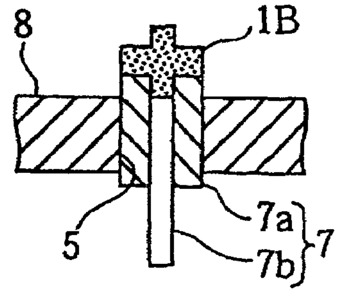
FIGS. 14A and 14B are diagrams illustrating the state of the lower punch unit holding a molded article.
Figure 14B:
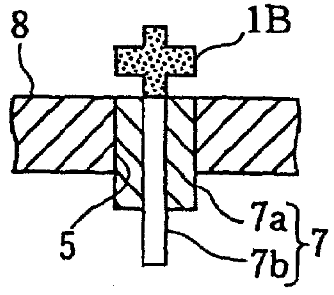
Figure 15A:
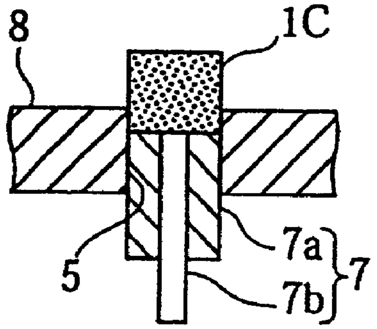
FIGS. 15A and 15B are diagrams illustrating the state of the lower punch unit holding a molded article.
Figure 15B:
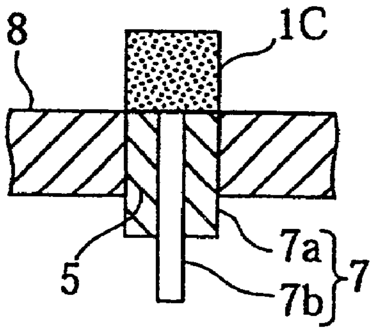

Also, as shown in FIGS. 14A and 14B, in the event that the vertical-sectional face of the molded article 1B has a cross shape, the lower first punch 7*a* is fit with the protrusion on the molded article 1B so as to hold it. Further, as shown in FIGS. 15A and 15B, in the event that the molded article 1C is cylindrical, a part of the molded article 1C is retracted into the die 5 following separation from the mode, and is held between the die 5 and the lower punch unit 7.

Linking means 9 are disposed at each of the stages A through D, and at the point that the lower first and second mold supporting plates 29 and 34 are transported thereto, the lower first and second poles 27 and 32 are linked thereto, while at the time of transporting, this linkage is disengaged.

As shown in FIGS. 8 through 10B, the linking means 9 comprises a clamp main unit 63 fixed on the upper face of each of the lower first poles 27, a sliding claw 64 supported so as to move forwards and back in the horizontal direction (the direction orthogonal to the compression direction) as to the clamp main unit 63, and an air cylinder mechanism (slide driving mechanism) 65 for motion driving of the sliding claw 64. The clamp main unit 63 has a stepped bearing surface 63*a* for supporting the lower face of the lower first mold supporting plate 29.

The air cylinder mechanism 65 has a piston rod 65*b* inserted into the cylinder main unit 65*a* so as to move back and forth therein, and the sliding claw 64 is linked to the piston rod 65*b* with first and second links 66 and 67.

When the piston rod 65*b* compresses the first and second links 66 and 67 rotate counter-clockwise so as to cause the sliding claw 64 to protrude out, and the lower first mold supporting plate 29 is clamped between the sliding claw 64 and the bearing surface 63*a*, thereby positioning and fixing the lower first punch 7*a* with both lower first poles 27. When the piston rod 65*b* expands, the first and second links 66 and 67 rotate clockwise so as to retract the sliding claw 64, and thus the clamping of the lower first mold supporting plate 29 is disengaged.

Also, a pair of clamp main units (not shown) are arrayed and fixed on the upper end face of the lower second poles 32 so as to face one another, configured such that sliding claws (not shown) disposed on the clamp main units clamp and unclamp the lower second mold supporting plate 34, the basic configuration being generally the same as that described above.

The unit holding means 4 holds the lower first and second mold supporting plates 29 and 34 of the lower punch unit 7 so as to not fall while the transporting table 8 is moving, and is configured so as to disengage the holding of the lower first and second mold supporting plates 29 and 34 at predetermined locations of the stages A through D and allow vertical movement of the lower first and second punches 7*a* and 7*b*.

As shown in FIGS. 11 and 12, the unit holding means 4 comprises multiple guide posts (guiding mechanism) 70 inserted and fixed to the lower face of the transporting table 8 so as to surround the perimeter of the dice 5, lower first and second mold supporting plates 29 and 34 fit onto the guide posts 70 so as to be vertically movable, and a holding mechanism for fixing and holding the mold supporting plates 29 and 34 onto the guide posts 70. Insertion holes 29*a* and 34*a* through which the guide posts 70 are inserted are formed on the mold supporting plates 29 and 34.

The holding mechanism is made up of a fastening lever 73 axially supported to the mold supporting plates 29 and 34 by a rotating shaft 72 so as to be capable of rocking, and a spring 74 for pressing the fastening lever 73 to the guide posts 70, wherein the lower punch unit 7 is fixed and held by the spring 74 causing plane contact of the fastening lever 73 against the guide posts 70. The fastening lever 73 is made up of a gripping portion 73*a* of a bent form so as to follow the perimeter of a guide post 70, and an arm portion 73*b* extending from the gripping portion 73*a* so as to face the sliding claw 64. The linkage with the guide posts 70 is disengaged by the sliding claw 64 protruding and rotating the arm portion 73*b* in the direction opposite to the pressing direction.

Now, description will be made regarding the action of the unit holding means 4 and the linking means 9. At the point that the lower first and second mold supporting plates 29 and 34 fixed and held by the unit holding means 4 are transported from the powder supplying stage A to the compression molding stage B for example, the lower first and second poles 27 and 32 rise, and the bearing surfaces 63*a* of the clamp main units 63 abut the lower first and second mold supporting plates 29 and 34. Next, the sliding claw 64 protrudes, and clamps the mold supporting plates 29 and 34 between the sliding claw 64 and the clamp main unit 63 so as to position and hold. At the same time as this operation, the sliding claw 64 rotates the fastening lever 73, so that the gripping portion 73*a* departs from the guide post 70 and the fastening is disengaged, thus, the lower first and second punches 7*a* and 7*b* are linked with the lower first and second poles 27 and 32 so as to be vertically movable. In this state, the upper and lower punch units 6 and 7 move vertically so as to perform the above-described compression molding.

Once the compression molding has been completed, the sliding claw 64 is retracted, the clamp is disengaged, the pressing of the fastening lever 73 is disengaged, and the fastening lever 73 is fastened to the guide post 70 by the pressing force of the spring 74. Thus, the linkage is disengaged, and the lower first and second punches 7*a* and 7*b* are held to the transporting table 8. This is transported to the next machine working stage C in this state.

Next, the advantages of the present embodiment will be described.

With the powder molding apparatus 1 according to the present embodiment, a molded article 1A subjected to compression molding at the compression molding stage B is transported to the machine working stage C and molded article extracting stage D while being held by the lower punch unit 7, so the molded article 1A can be prevented from falling or shifting during transporting, leading to higher transporting speeds and improved productivity. Also, fitting the lower first and second punches 7*a* and 7*b* according to the form of the molded articles 1A through 1C facilitates holding in a sure manner, and increases in costs can be avoided as compared to arrangements wherein a separate holding mechanism is provided.

Note that while with the present embodiment, an example has been described of an arrangement wherein the molded article is held by the lower first and second punches 7*a* and 7*b*, but the molded article holding means according to the present invention is by no means restricted to this.

FIGS. 16A through 16F illustrating molded article holding means according to another embodiment of the present invention, and the reference numerals in these figures which are the same as those in FIGS. 13A through 15B denote the same or equivalent components.

Figure 16A:
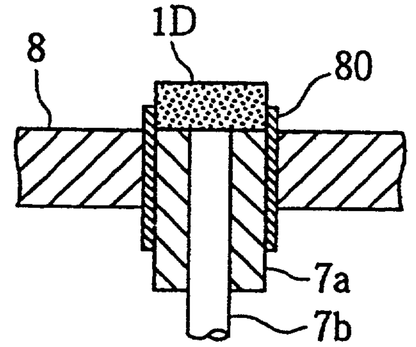
FIGS. 16A through 16F are diagrams illustrating molded article holding means according to another embodiment of the present invention.
Figure 16B:
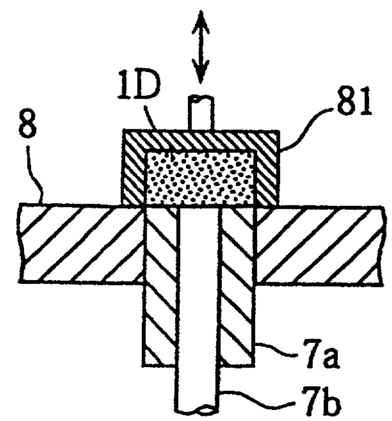

FIG. 16A illustrates an example wherein an engaging piece 80 disposed to the die 5 so as to protract therefrom or retract therein is engaged with the outer perimeter face of a molded article 1D. FIG. 16B illustrates an example of holding with a guide member 81 formed so as to envelop the outer face of the molded article 1D.

Figure 16C:
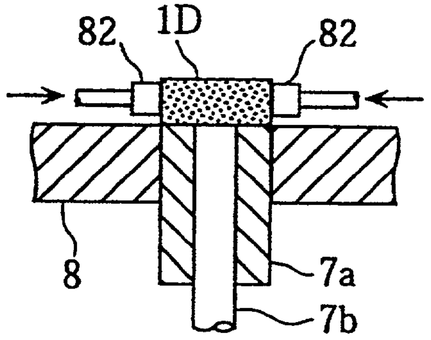
Figure 16D:
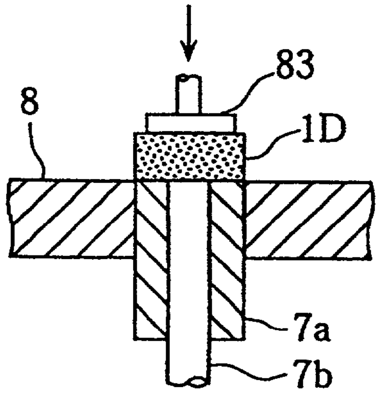

Also, FIG. 16C illustrates an example wherein the molded article 1D is nipped and held in the horizontal direction by a pair of pressing members (pressing mechanism) 82, and FIG. 16D illustrates an example wherein the molded article 1D is pressed from above by a pressing member (pressing mechanism) 83 and held.

Figure 16E:
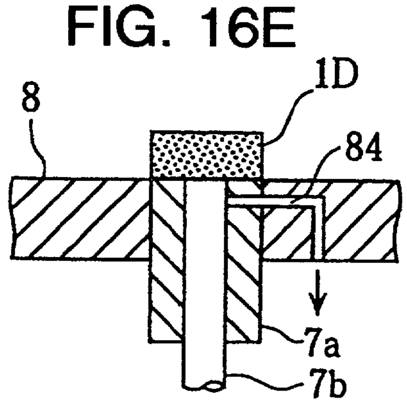
Figure 16F:
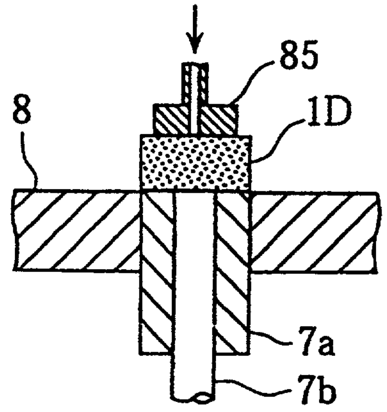

FIG. 16E illustrates an example wherein a suction channel 84 contacting the inside of the powder forming space is formed to the lower first punch 7*a* and the transporting table 8 (i.e., a fluid pressure generating mechanism) 84 and a molded article 1D is hold by suctioning the air within the powder molding space with the suction channel 84 by a suction pump. FIG. 16F illustrates an example wherein the molded article 1D is held by applying pressurized air to the molded article 1D with a pneumatic pressure supplying member 85. All of these examples are capable of preventing the molded article 1D from falling or shifting during transporting, thereby leading to higher transporting speeds and improved productivity.

Figure 17A:
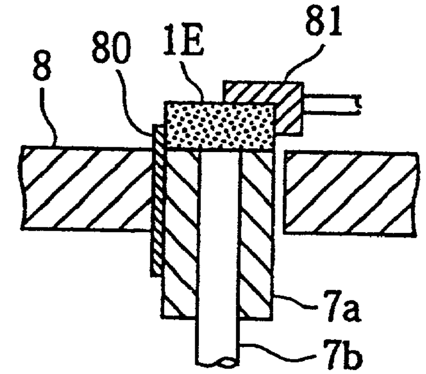
FIGS. 17A through 17F are diagrams illustrating another embodiment of the molded article holding means.
Figure 17B:
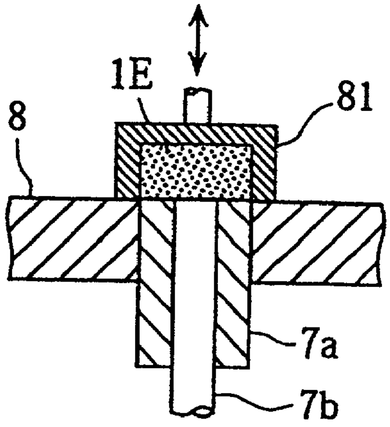
Figure 17C:
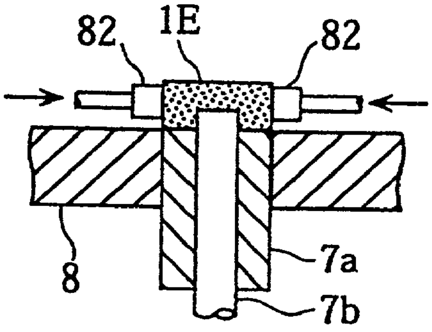
Figure 17D:
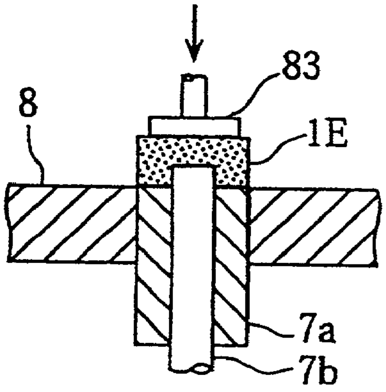
Figure 17E:
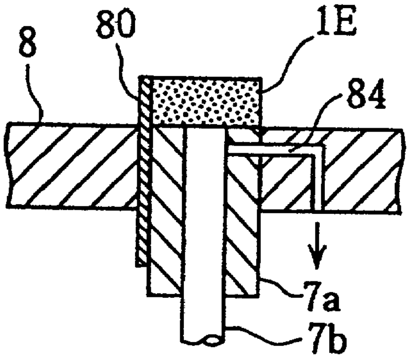
Figure 17F:
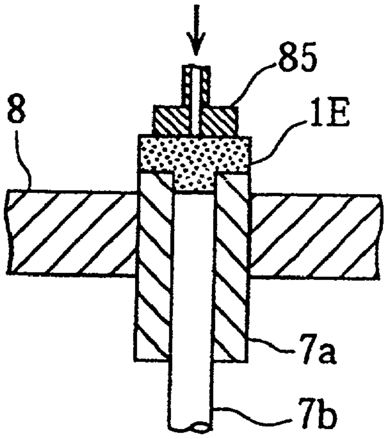

Further, with the present invention, the above-described lower punch unit 7 and the engaging piece 80, guide member 81, and so forth, may be combined to hold the molded article, as shown in FIGS. 17A through 17F. For example, FIG. 17A shows an arrangement wherein the molded article 1E is held with the lower second punch 7*a* and engaging piece 80 and guide member 81, and FIG. 17B shows an arrangement wherein the molded article 1E is held with the lower first and second punches 7*a* and 7*b* and the guide member 81. Also, FIG. 17C illustrates an example wherein the molded article 1E is held between the lower second punch 7*b* and a pair of pressing members 82, and FIG. 17D illustrates an example wherein holding is performed by the lower second punch 7*b* and the pressing member 83. Further, FIG. 17E illustrates an example wherein the molded article 1E is held by the engaging piece 80 and a suction channel 84, and FIG. 17F is an example wherein the molded article 1E is held by the lower first punch 7*a* and the pneumatic pressure supplying member 85. All of these examples enable higher transporting speeds as with the above-described arrangements. The point made here is that any of these components can be used independently or combined according to the shape of the molded article, the transporting speed, and so forth.

According to the present embodiment, the tapered block 60 is inserted to the upper first punch 6*a*, and the recessed tapered face 60*a* of the tapered block 60 is fit with the protruding tapered face 5*b* of the die 5, so positioning with the upper punch unit 6 at the time of transporting the lower punch unit 7 with the transporting table 8 between the stages A through D can be carried out in a sure manner with a simple structure, thereby ensuring the quality and dimensional precision of the molded article.

Also, the tapered block 60 has a structure of being elevated and lowered independently from the upper first and second punches 6*a* and 6*b*, so the upper and lower punch units 6 and 7 can be subjected to compression driving with the tapered block pre-positioned at the die 5, thereby preventing problems such as damaging molds and so forth, consequently improving the quality and dimensional precision of the molded article.

Figure 18:
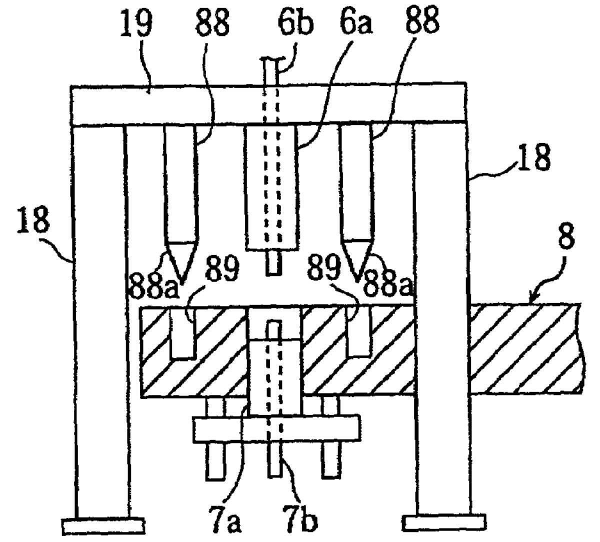
FIG. 18 is a diagram illustrating punch positioning means according to another embodiment of the present invention.

Also, with the present embodiment, an example has been described of an arrangement wherein the upper punch unit 7 is fit to the die 5 with a tapered block 60, but the punch positioning means according to the present invention is by no means restricted to this; rather, various arrangements may be made such as, for example, as shown in FIG. 18, an arrangement wherein guide pins 88 having points 88*a* are fixed on the upper first mold supporting plate 19 with the upper first punch 7*a* fixed, and positioning holes 89 for engaging the points 88*a* are formed on the transporting table 8 or the dice 5. Such an arrangement has been mentioned in the Summary above. In this case as well, positioning can be performed in a sure manner, as with the embodiment described above.

With the present embodiment, a depressurizing channel 60*b* contacting the powder molding space of the die 5 is formed to the tapered block 60, and a vacuum pump is connected to the depressurizing channel 60*b* by a suction hose 61 so as to depressurize the air within the powder molding space, so the gaps between the powder gains filled in the die 5 can be reduced with a simple structure, and irregularities in powder density can be prevented, while reducing compression forming time.

Also, depressurizing is started at the time of filling the die 5 with the powder material at the powder supplying stage A, maintained until the compression molding at the next compression molding stage B, which enables the filling speed for supplying powder to the die 5 to be increased, prevents scattering of powder at the time of filling, and further does away with the need for depressurizing at the time of compressing, thereby reducing that much time.

Now, with the above embodiment, a depressurizing channel is formed at the positioning tapered block 60, but the present invention is by no means restricted to this. For example, the depressurizing channel may be connected and formed to a box-shaped block formed enveloping the powder molding space of the die and the surroundings. Such an arrangement has also been mentioned in the Summary above. This arrangement prevents scattering of powder to around the die.

According to the present embodiment, the linking means 9 detachably linking the lower punch unit 7 with the lower first and second poles 27 and 32 serving as the driving unit comprises: clamp main units 63 disposed and fixed to each of the poles 27 and 32; sliding claws 64 movably supported by the clamp main units 63 in the direction orthogonal to the direction of compression; and an air cylinder mechanism 65 for advancing and retracting driving of the sliding claws 64, so the compression force at the time of compression molding is not applied to the air cylinder mechanism 65 which advances and retracts the sliding claws 64, and the compression force can be taken by a mechanical structure. Thus, the driving unit of the air cylinder mechanism 65 can be made smaller. That is to say, in the event that the sliding claws 64 are moved in the same direction as the compression direction, the mold and molded article do not readily separate in the separating process following the compression molding for example, and the molded article could be damaged This necessitates increased strength of the air cylinder mechanism 65 and surrounding parts, leading to the problem of increased complication of the structure thereof.

Reducing the clearance between the clamp main unit 63 and sliding claw 64 allows the mold supporting plates 29 and 34 to be clamped without any play, and according positioning precision can be improved.

Also, the sliding claw 64 is driven so as to advance or retract by first and second links 66 and 67, so the sliding claw 64 can be driven with small force, and the air cylinder mechanism 65 can be reduced in size.

Figure 19:
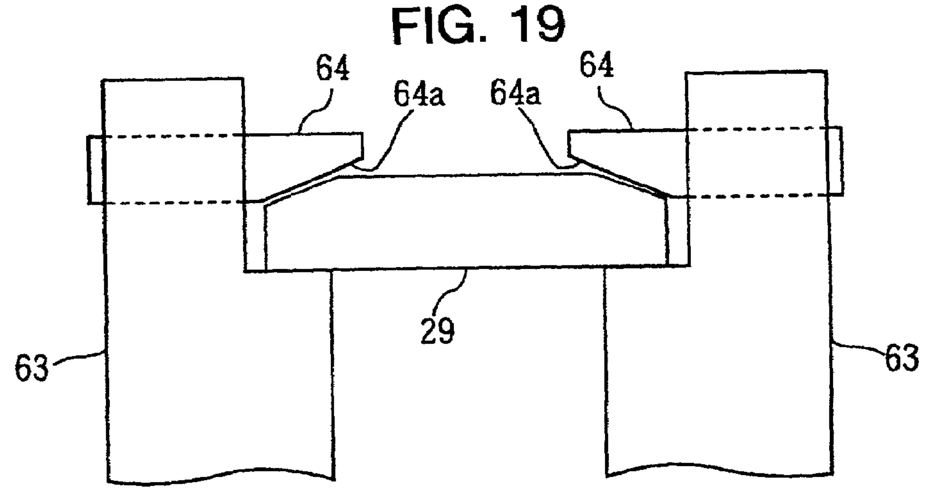
FIG. 19 is a diagram illustrating linking means according to the first embodiment of the present invention.

Now, an arrangement may be made such as shown in FIG. 19 wherein a tapered portion 64*a* is formed on the sliding claw 64 such that the tapered portion 64*a* fits with the tapered face of the mold supporting plate 29. This arrangement has also been mentioned in the Summary above. In this case, the mold supporting plate 29 can be clamped with high precision in a sure manner.

Figure 20A:
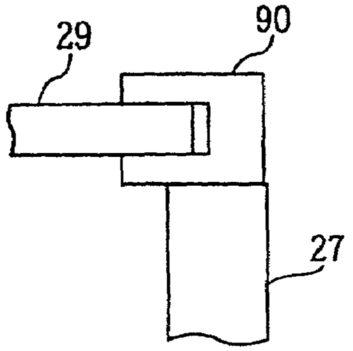
FIGS. 20A and 20B are diagrams illustrating a variation of the sliding claws.
Figure 20B:
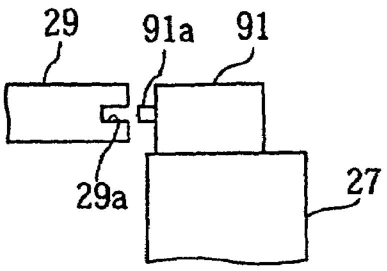

Now, in the above embodiment, an arrangement has been described within the mold supporting plates 29 and 34 are clamped with the sliding claws 64 and bearing surfaces 63*a* of the clamp main units 63, but the present invention is by no means restricted to this arrangement. For example, as shown in FIG. 20A, an arrangement may be made wherein the mold supporting plate 29 is gripped by advancing or retracting a sliding claw 90 with a shape of a box with one end open, or as shown in FIG. 20B, a sliding claw 91 having a protrusion 91*a* may be advanced and retracted to fit to a recess 29*a* on the mold supporting plate 29, these arrangements also yielding advantages the same as those described with the above embodiment.

Figure 21A:
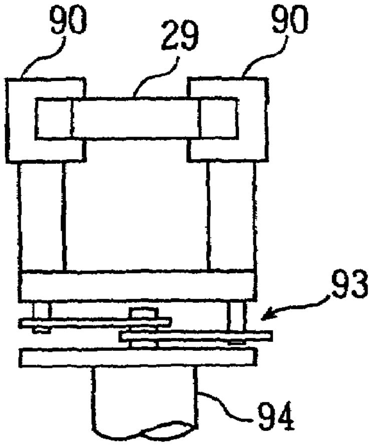
FIGS. 21A and 21B are diagrams illustrating linking means according to another embodiment of the present invention.
Figure 21B:
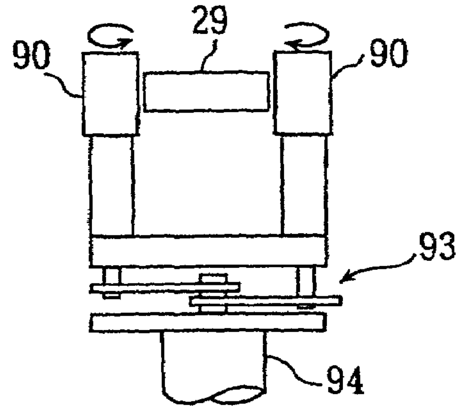

Also, the above embodiment involves performing linking and unlinking by linearly moving the sliding claws 64, 90, and 91, but the present invention allows performing linking and unlinking by rotationally driving the sliding claws, another arrangement which has been mentioned in the above Summary. For example, as shown in FIGS. 21A and 21B, an arrangement may be made wherein a pair of sliding claws 90 having the shape of a box with one end open is connected to a single rotary actuator 94 by a rotating link mechanism 93, so as to rotationally drive the sliding claws 90 to link or disengage the linkage of the mold supporting plate 29. In this case, the multiple sliding claws 90 are synchronized and driven by a single actuator 94, thereby reducing both size and costs.

According to the present embodiment, a unit holding means 4 is provided which holds the lower punch unit 7 when transporting between the stages A through D and disengaging this holding when transported to one of the stages A through D, that is to say, the holding is disengaged at the point of the liking the lower punch unit 7 to the poles 27 and 32 of the compression driving mechanism 3 so as to permit vertical movement of the lower punch unit 7 and the lower punch unit 7 is held to the transporting table 8 when this linkage is disengaged, so the lower punch unit 7 can be transported in a state wherein the punch position is maintained, and the lower punch unit 7 can be prevented from moving or falling during transporting. Thus, both space and costs can be reduced as compared to conventional arrangements wherein the mold is held while transporting by a cam follower and track rail.

Also, the unit holding means 4 comprises multiple guide posts 70 fixed on the transporting table 8, lower first and second mold supporting plates 29 and 34 inserted into the guide posts 70 in a vertically movable manner, and a fastening lever 73 for fixing and holding the mold supporting plates 29 and 34 to the guide posts, so the lower punch unit can be held or disengaged with a simple structure, thereby suppressing increases in costs.

Further, the fastening lever 73 is fixed to the guide post 70 by pressing with a spring 74, so the lower punch unit 7 can be held with a simple structure and the minimum number of parts necessary, thereby suppressing increases in costs.

According to the present embodiment, the fastening lever 73 is rotationally operated synchronously with the advancing and retracting of the sliding claw 64 of the linking means 9, so the necessity for holding and holding-disengaging operations using a separate mechanism can be done away with, thereby suppressing increases in costs. Also, the lower punch unit 7 can be transported to the next stage in a state of being held at the linking position, thereby ensuring positional precision of the lower punch unit 7.

Figure 22:
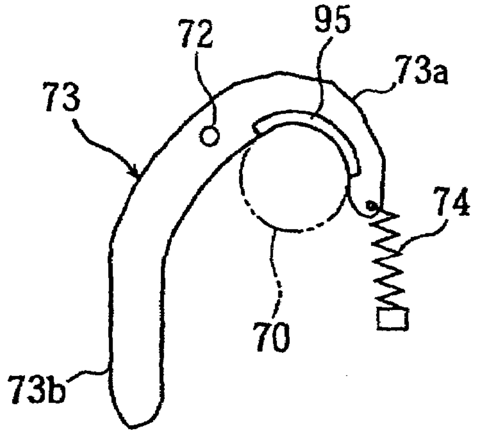
FIG. 22 is a diagram illustrating unit holding means according to another embodiment of the present invention.

Now, while an arrangement has been described with the above embodiment wherein the fastening lever 73 is fixed by face contact with the guide post 70 by the pressing force of the string 74, the present invention may also be arranged as shown in FIG. 22, wherein a permanent magnet 95 is positioned at the grasping portion 73*a* of the fastening lever 73 so as increase the fastening force with the permanent magnet 95, another arrangement which has been mentioned in the above Summary. In this case, the lower punch unit 7 can be held more strongly.

Figure 23:
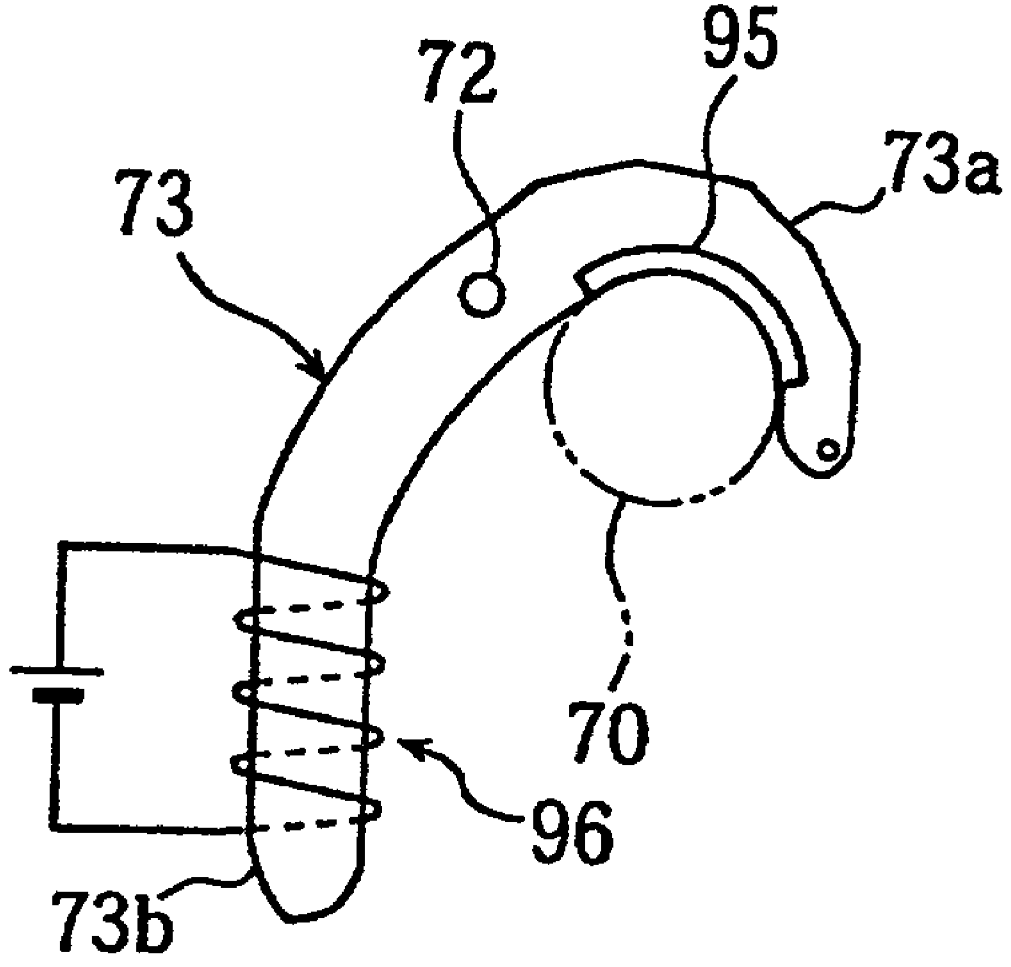
FIG. 23 is a diagram illustrating unit holding means according to another embodiment of the present invention.

Also, as shown in FIG. 23, an arrangement may be made wherein a permanent magnet 95 is positioned at the grasping portion 73*a* of the fastening lever 73 while an electromagnet 96 is positioned on the fastening lever 73, such that the lower punch unit 7 is held to the guide post 70 by the permanent magnet 95, and the magnetism of the permanent magnet 95 is cancelled at the time of disengaging this holding by applying electricity to the electromagnet 96, another arrangement which has been mentioned in the above Summary.

Now, the above embodiments have been described with reference to arrangements wherein the fastening lever 73 is fixed to the guide post 70 by a spring 74, permanent magnet 95, etc., but the present invention may also be arranged comprising a cylindrical brake member, not shown in the drawings, independently from the guide posts, to fix and hold the mold supporting plate by bringing the fastening lever into plane contact with the brake member, another arrangement which has been mentioned in the above Summary.

In the event that the brake member is disposed independently from the guide posts and the mold supporting plate is held by fixing the fastening lever to the brake member, wear on the guide posts can be prevented as compared to arrangements wherein the fastening lever is fixed to the guide posts, thus extending the life of the guide posts and improving the supporting precision of the mold supporting plate. Also, the brake member can be configured of a material different from that of the guide posts, and a material with a great friction coefficient and low cost can be selected.

Figure 31:
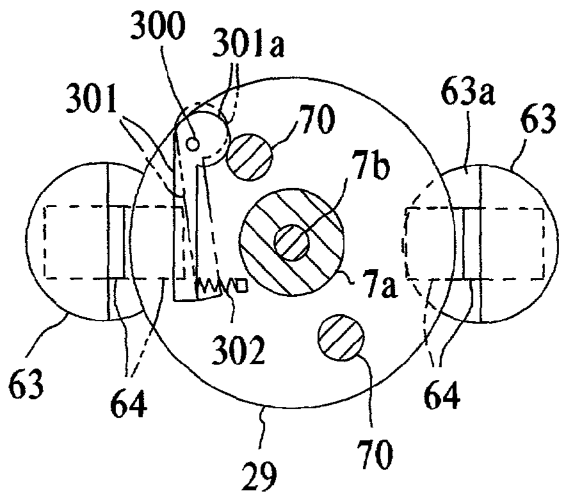
FIG. 31 is a plan view illustrating a holding mechanism according to another embodiment of the present invention.

FIG. 31 is a diagram describing the holding mechanism according to another embodiment of the invention, and the reference numerals in these figures which are the same as those in FIG. 12 denote the same or equivalent components.

The holding mechanism according to the present embodiment is made up of a rotating cam member 301 rotatably supported to the mold supporting plate 29 by a rotational shaft 300, and a spring (pressing member) 302 for pressing the rotating cam member 301 against the guide post 70. The rotating cam 301*a* of the rotating cam member 301 is pressed by the spring 302 and fixed against the guide post 70 by friction force due to linear contact. Also, the slide claw 64 protrudes to rotate the rotating cam member 301 in the direction opposite to the pressing, thereby disengaging fixing to the guide post 70.

With the present embodiment, the linear contact pressure with the guide post 70 can be increased by using the wedging effect of the rotating cam member 301, and thus the lower punch unit 7 can be held in a sure manner. Thus, even in the event that there are irregularities in the precision of finishing or precision of assembly of the rotating cam member 301 or guide posts 70, the irregularities can be absorbed to obtain sufficient contact force, thereby preventing shifting of the position of the lower punch unit 7 when transporting.

Also, the holding mechanism is configured of a rotating cam member 301 and spring 302, so the lower punch unit 7 can be fixed and held in a sure manner with a simple structure and the minimum number of parts necessary.

Figure 32A:
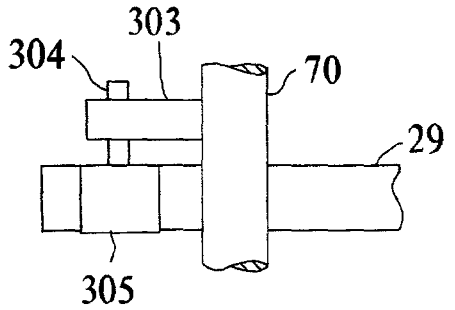
FIGS. 32A and 32B are diagram illustrating a pressing member according to another embodiment of the holding mechanism.
Figure 32B:
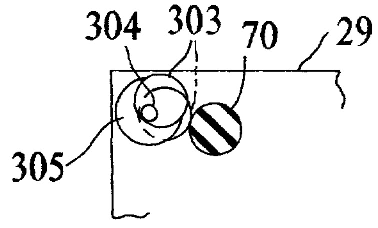

Also, though the present embodiment involves pressing and fixing the rotating cam member 301 with a spring 302 and the pressing fixing being disengaged by the slide claw 64, an arrangement may be made with the present invention, such as shown in FIGS. 32A and 32B, wherein a rotational shaft 304 fixed to a disc-shaped rotating cam 303 is directly linked to a driving motor 305, thereby rotating the rotating cam 303 with the driving motor 305. This arrangement also yields advantages the same as those described with the above embodiment.

Figure 33:
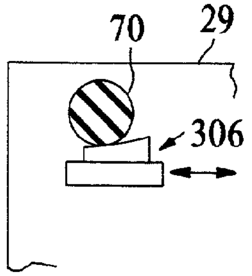
FIG. 33 is a diagram illustrating a linear cam member according to another embodiment of the present invention.

Also, the above embodiment has been described with reference to an arrangement wherein the rotating cam member 301 is rotated and pressed against the guide post 70, but an arrangement may be made, as shown in FIG. 33, wherein a linear cam member 306 is linearly moved to press against the guide post 70, another arrangement which has been mentioned in the above Summary. In this case, the pressure of contact against the guide post 70 can be increased even further, and the lower punch unit 7 can be held in an even more sure manner.

Figure 34:
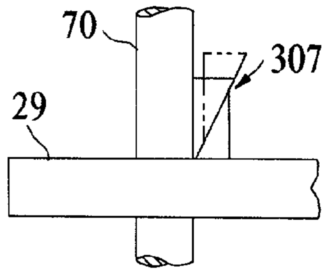
FIG. 34 is a diagram illustrating a linear cam according to another embodiment.

Also, FIG. 34 illustrates an example of vertically sliding a wedge-shaped linear cam member 307 so as to press against the guide post 70, another arrangement which further increases the pressure of contact against the guide post 70.

Figure 35:
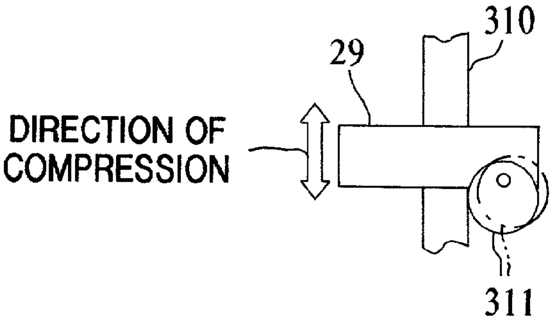
FIG. 35 is a diagram illustrating a linear guide according to another embodiment of the guide mechanism.

Further, the above embodiment has been described with reference to an arrangement wherein the mold supporting plate 29 is movably supported in the compression direction by the guide post 70, but the guide mechanism according to the present invention is by no means restricted to this. For example, an arrangement may be made as shown in FIG. 35, wherein mold supporting plate 29 is movably supported in the compression direction by a linear guide 310, configured such that the mold supporting plate 29 is pressed and fixed to the linear guide 310 by a circular rotating cam 311.

In this case, the mold supporting plate 29 can be supported by the linear guide 310 with great precision.

Figure 36:
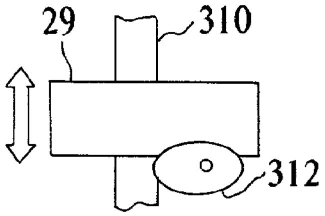
FIG. 36 is a diagram illustrating a linear guide according to another embodiment of the guide mechanism.

Also, FIG. 36 illustrates an example of supporting the mold supporting plate 29 movably in the compression direction by the linear guide 310, wherein the mold supporting plate 29 is pressed and fixed to the linear guide 310 by an ellipse rotating cam 312.

Figure 37:
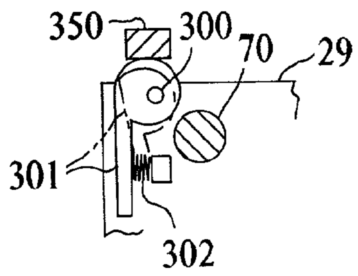
FIG. 37 is a diagram illustrating unit holding means/holding mechanism according to another embodiment of the present invention.

FIG. 37 is a diagram describing the unit holding means and holding mechanism according to the fifth aspect of the present invention, and the reference numerals in these figures which are the same as those in FIG. 31 denote the same or equivalent components.

The unit holding means according to the present embodiment comprise a rotating cam member 301 rotatably supported by a rotational shaft 300 to the mold supporting plate 29 movably supported by the guide post 70 in the compression direction, a brake member 350 having the shape of a square post disposed outside of the mold supporting plate 29 independently from the guide post 70, and spring (pressing member) 302 for pressing and fixing the rotating cam member 301 against the brake member 350 by friction force due to linear contact.

With the present embodiment, the linear contact pressure with the brake member 350 can be increased by using the wedging effect of the rotating cam member 301, and thus the lower punch unit 7 can be held in a sure manner, yielding advantages the same as those described with the above embodiment.

Also, with the present embodiment, the brake member 350 is disposed on the inner side of the mold supporting plate 29 independent from the guide post 70, and the rotating cam material 301 is pressed and fixed against the brake member 350, so the pressing force of the spring 302 does not act upon the guide post 70, thereby preventing wear of the guide post 70. Consequently, the life of the guide post 70 can be extended, and the supporting precision of the mold supporting plate 29 can be improved. Also, the brake member 350 can be formed of a material other than that of the guide post 70, and a material with a great friction coefficient and low cost can be employed.

Figure 38:
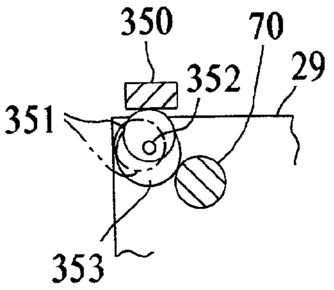
FIG. 38 is a diagram illustrating another embodiment of the holding mechanism.

Now, with the above embodiment, an arrangement has been described wherein the rotating cam member 301 is pressed by a spring 302, but an arrangement may be made with the present invention as shown in FIG. 38, wherein a driving motor 353 is linked to a rotational shaft 352 of a disc-shaped rotating cam 351, and the rotating cam 351 is rotationally driven by the driving motor 353 so as to press and fix the brake member 350. This arrangement yields generally the same advantages as the embodiment described above.

Figure 39:
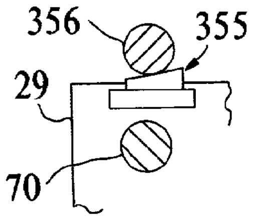
FIG. 39 is a diagram illustrating the linear cam member of the holding mechanism according to another embodiment of the present invention.

The above embodiment has been described with regard to an arrangement wherein the rotating cam member 301 is rotated to be pressed and fixed against the brake member 350, but an arrangement may be made with the present invention as shown in FIG. 39, wherein a linear cam member 355 is linearly reciprocally moved to be pressed against a cylindrical brake member 356 and fixed, another arrangement which has been mentioned in the above Summary. In this case, the contact pressure to the brake member 356 can be further increases, and the lower punch unit 7 can be held even more securely.

Figure 40:
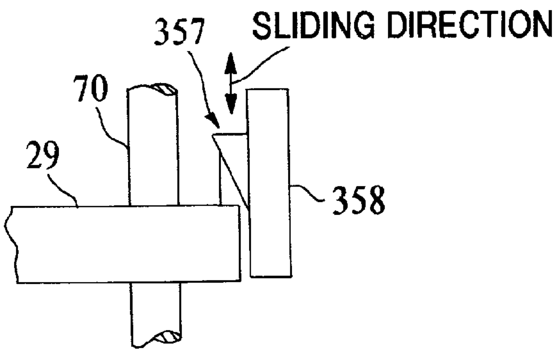
FIG. 40 is a diagram illustrating the linear cam member according to another embodiment.

Also, an arrangement may be made such as shown in FIG. 40, wherein a wedge-shaped linear cam member 357 is disposed between the mold supporting plate 29 and the brake member 358, so as to press and fix the mold supporting plate 29 against the brake member 358 by sliding the linear cam member 357 vertically. This arrangement also yields advantages the same as the above embodiment.

Figure 41:
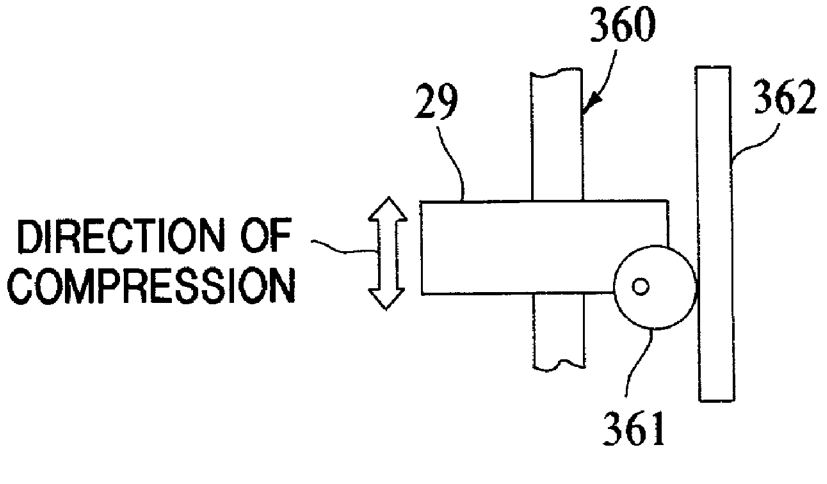
FIG. 41 is a diagram illustrating the linear guide according to another embodiment of the guide mechanism described above.

Further, with the present embodiment, an arrangement has been described wherein the mold supporting plate 29 is supported by the guide posts 70 so as to be movable in the compression direction, but an arrangement may be made with the present invention such as shown in FIG. 41, wherein the mold supporting plate 29 is supported by a linear guide 360 so as to be movable in the compression direction, so that the mold supporting plate 29 is pressed and fixed against the brake member 362 by a circular rotating cam 361. In this case, the mold supporting plate 29 can be supported with high precision.

Figure 42:
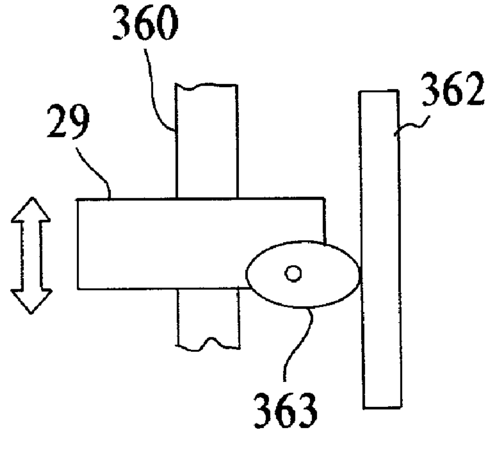
FIG. 42 is a diagram illustrating the linear guide according to another embodiment of the guide mechanism.

Also, FIG. 42 illustrates an example wherein the mold supporting plate 29 is movably supported by the linear guide 360 and also the mold supporting plate 29 is pressed and fixed against the brake member 362 by an ellipse rotating cam 363, yielding advantages the same as those of the above embodiment.

With the powder injecting mechanism 100 according to the present embodiment, a powder injecting hole 101*b* is formed at the bottom wall 101*a* of a powder storing unit 101 storing the powder material 105, a scraping blade 103 is provided to close off the powder injecting hole 101*b*, and excess powder material 105 is scraped away from the die 5 by the blade tip 103*a* of the scraping blade 103 so as to return the powder material 105 to the powder storing unit 101, thereby preventing scattering of the powder material 105 around the die 5, and a predetermined amount of powder can be filled in the die 5.

Also, excess powder material 105 is scraped away by the scraping blade 103, so the flatness of the scraping face can be improved, and the amount of powder supplied and the filling density can be made to be uniform.

The scraping blade 103 is formed of a ceramic material, thereby suppressing wear of the blade tip 103*a* after repeated scraping operations, and extending the life thereof.

With the present embodiment, the powder supplying tube 102 is offset outwards from the center of the powder injecting hole 101*b*, which prevents powder material supplied from the powder supplying tube 102 from being directly injected from the powder injecting hole 101*b*.

Also, the powder supplying tube 102 is passed through the ceiling 101*c* of the powder storing unit 101 allows space to be left in the powder storing unit 101 at the time of supplying powder material 105 thereto, so change in the powder density within the powder storing unit 101 due to change in the amount remaining in the hopper can be suppressed, and irregularities in density of powder filled in the die 5 can be prevented.

With the present embodiment, a tapered portion 109 is formed at an edge of the powder injecting hole 101*b* so as to fit with the blade tip 103*a*, so the blade tip 103*a* closes off the powder injecting hole 101*b* in a sure manner by riding up on the tapered portion 109, thus preventing leaking of the powder material 105.

Also, with the present embodiment, a slit 108 is formed at the side wall 101*d* of the powder storing unit 101, and the scraping blade 103 is driven to open and close by an actuator 107 outside through the slit 108 allows the capacity of the powder storing unit 101 to be increased.

According to the present embodiment, the upper first punch 6*a* is fixed by the upper first poles 18 to the driving base 10 supported by the upper first ball screws 12 in a vertically movable manner, and the driving base 10 mounts the remaining upper second ball screw 21 and lower first and second ball screws 25 and 30, with the upper second punch 6*b* and the lower first and second punches 7*a* and 7*b* being each independently driven by the ball screws 21, 25, and 30, so at the time of compressing, the upper first and second punches 6*a* and 6*b* and the lower first and second punches 7*a* and 7*b* can perform compression forming of the ceramic powder material by the ball screws 12, 21, 25, and 30, thereby forming molded articles having a uniform compression density.

Also, at the time of separating from the mold, the driving base 10 is raised with the upper first ball screw 12 in the state that the upper second ball screws 21 and lower first and second ball screws 25 and 30 are fixed, thereby causing the upper first and second punches 6*a* and 6*b* and the lower first and second punches 7*a* and 7*b* to rise at the same time, and the molded article can be separated from the die 5 with the distance between punches maintained. Accordingly, the structure of the apparatus for supplying powder and for extracting the molded article can be simplified, suppressing increases in costs by that much.

With the present embodiment, the ball screws 12, 21, 25, and 30 are centrally disposed on the driving base 10, and the servo motors 53, 39, 47, and 50 are centrally disposed on the perimeter of the driving base 10 and the fixed base 11, so the assembly precision of the ball screws 12, 21, 25, and 30 and of the servo motors 53, 39, 47, and 50 can be improved by providing a reference surface on the driving base 10, thus facilitating assembly work and maintenance work. Also, the compression driving system is centrally disposed on the driving base 10 below the transporting table 8, so the overall apparatus height can be reduced, thereby contributing to reduction in size.

FIGS. 24 through 30 are diagrams for describing a powder molding apparatus according to a second embodiment of the present invention, and the reference numerals in these figures which are the same as those in FIGS. 1 and 4A through 7B denote the same or equivalent components. The powder molding apparatus 200 according to the present embodiment has generally the same basic structure as that of the first embodiment, comprising a mold 2 made up of a die 5 having a powder molding space, and upper and lower punch units 6 and 7, a disc-shaped transporting table (die set) 8 for transporting the mold 2 between a powder supplying stage A, a compression molding stage B, a machine working stage C, and a molded article extracting stage D, and a compression driving mechanism 201 for independently driving the upper and lower punch units and performing compressing molding of the ceramic powder material.

The upper punch unit 6 comprises upper second and third punches 6*b* and 6*c* inserted in an upper first punch 6*a* in a relatively movable manner, and the lower punch unit 7 comprises lower second and third punches 7*b* and 7*c* inserted in a lower first punch 7*a* in a relatively movable manner, as described above. The upper punch unit 6 is disposed above the compression molding stage B, and the lower punch unit 7 is linked to each of the dice 5 on the transporting table by later-described linking supporting means.

The compression driving mechanism 201 comprises an upper driving unit 203*a* for independently driving upper first, second, and third driving shafts 210, 211, and 213, by servo motors with unshown ball screws, and a lower driving unit 203*b* for independently driving lower first, second, and third driving shafts 213, 214, and 215, by servo motors with unshown ball screws in the same manner, the upper and lower driving units 203*a* and 203*b* being disposed on a common driving base (not shown).

Disc-shaped upper first, second, and third compression rams 218, 219, and 220 are each connected between the upper ends of the upper first, second, and third driving shafts 210, 211, and 212, and disc-shaped lower first, second, and third compression rams 221, 222, and 223 are each connected between the upper ends of the lower first, second, and third driving shafts 213, 214, and 215. The compression rams 218 through 223 have linked thereto the upper first through third punches 6*a* through 6*c* and the lower first through third punches 7*a* through 7*c*, by later-described linking means. Thus enabling the upper first through third punches 6*a* through 6*c* and the lower first through third punches 7*a* through 7*c* to be independently driven by servo motors with ball screws allows working of molded articles having cylindrical shapes, hollow cylindrical shapes, cross-sectional H shapes, vertical-sectional cross shapes, for example, to be realized.

The upper first, second, and third punches 6*a*, 6*b*, and 6*c* are respectively connected to upper first, second, and third punch holders 225, 226, and 227, and the lower first, second, and third punches 7*a*, 7*b*, and 7*c* are respectively connected to lower first, second, and third punch holders 228, 229, and 230.

These upper and lower punch holders 225 through 227 and 228 through 230 are connected one to another by linking supporting means so as to be relatively movable. The linking supporting means for the upper and the lower are of the same configuration, so description will be made for only the linking supporting means for the lower punch unit 7.

Figure 24:
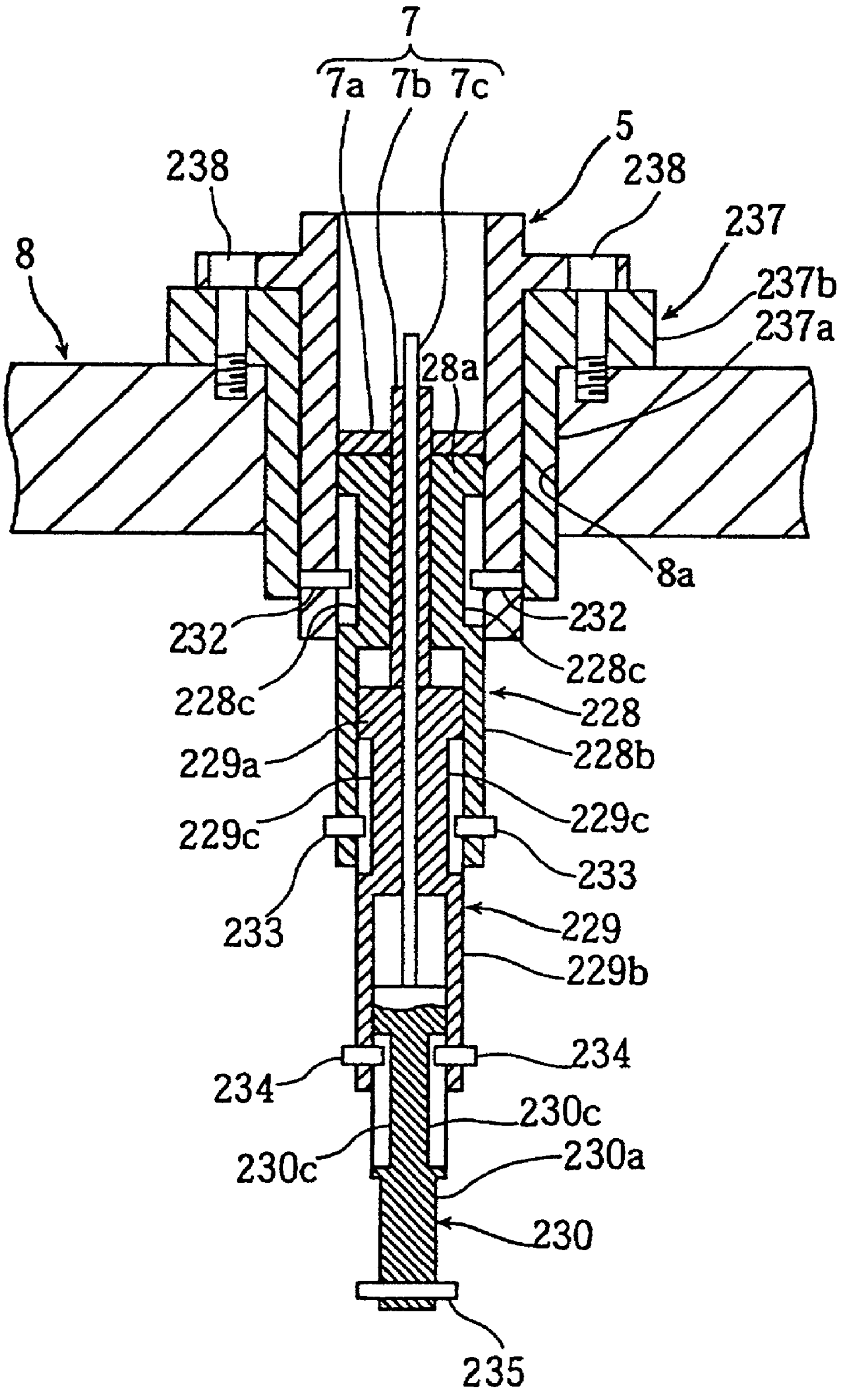
FIG. 24 is a cross-sectional view illustrating the linked and fixed state of the lower punch of the powder molding apparatus according to a second embodiment of the present invention.
Figure 25:
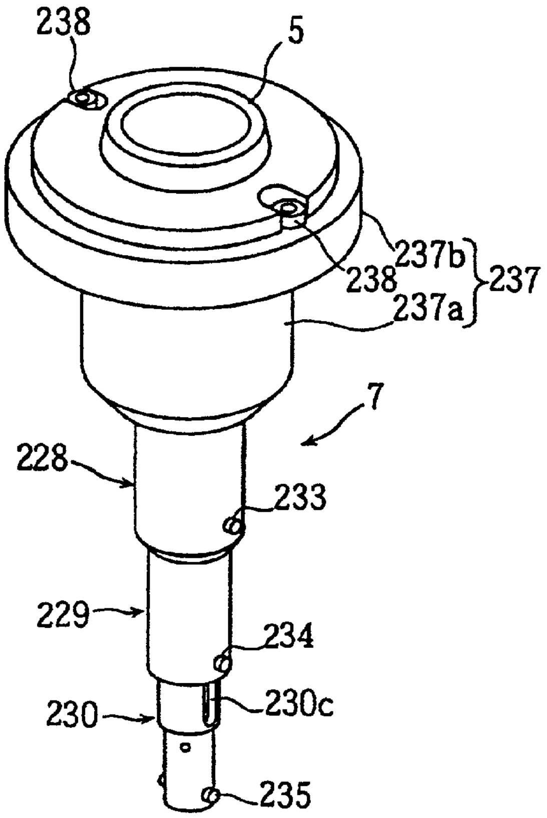
FIG. 25 is a perspective view of the lower punch unit.
Figure 26:
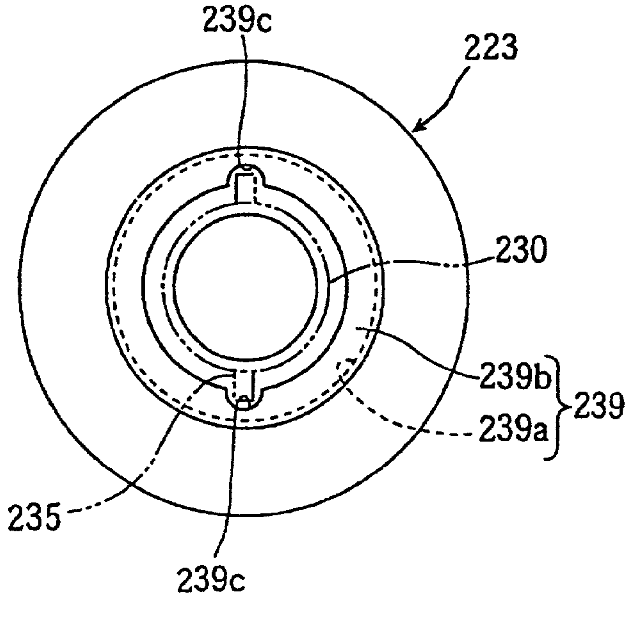
FIG. 26 is a plan view of a pressure ram of the lower punch unit.
Figure 27A:
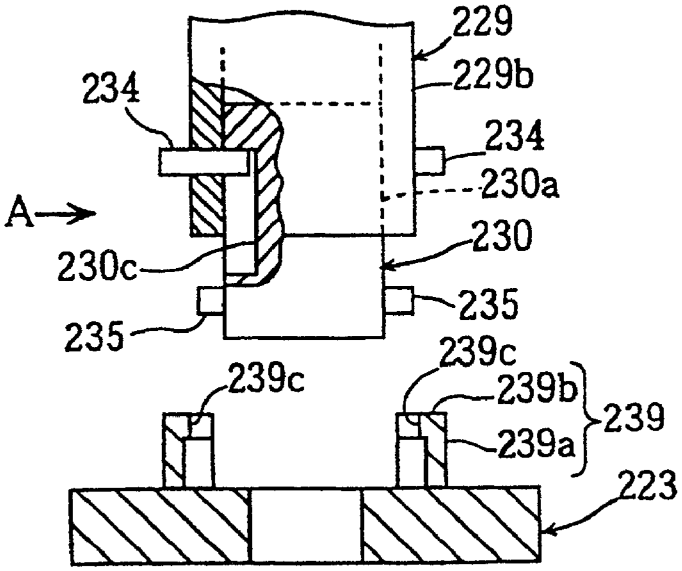
FIG. 27A is a diagram illustrating the fastening state of the lower punch unit.
Figure 27B:
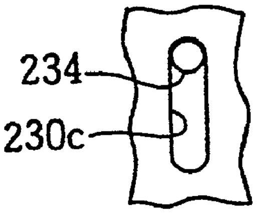
FIG. 27B is a diagram of a part of that shown in FIG. 27A, along the direction of the arrow A.
Figure 28:
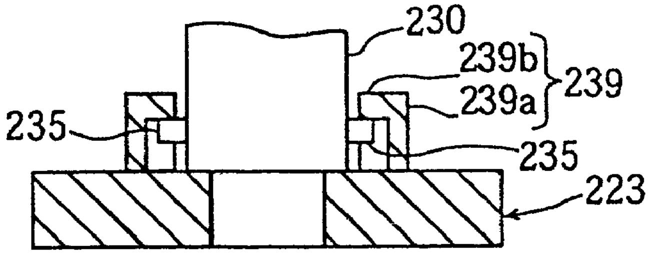
FIG. 28 is a diagram illustrating the fastening state of the lower punch unit.
Figure 29:
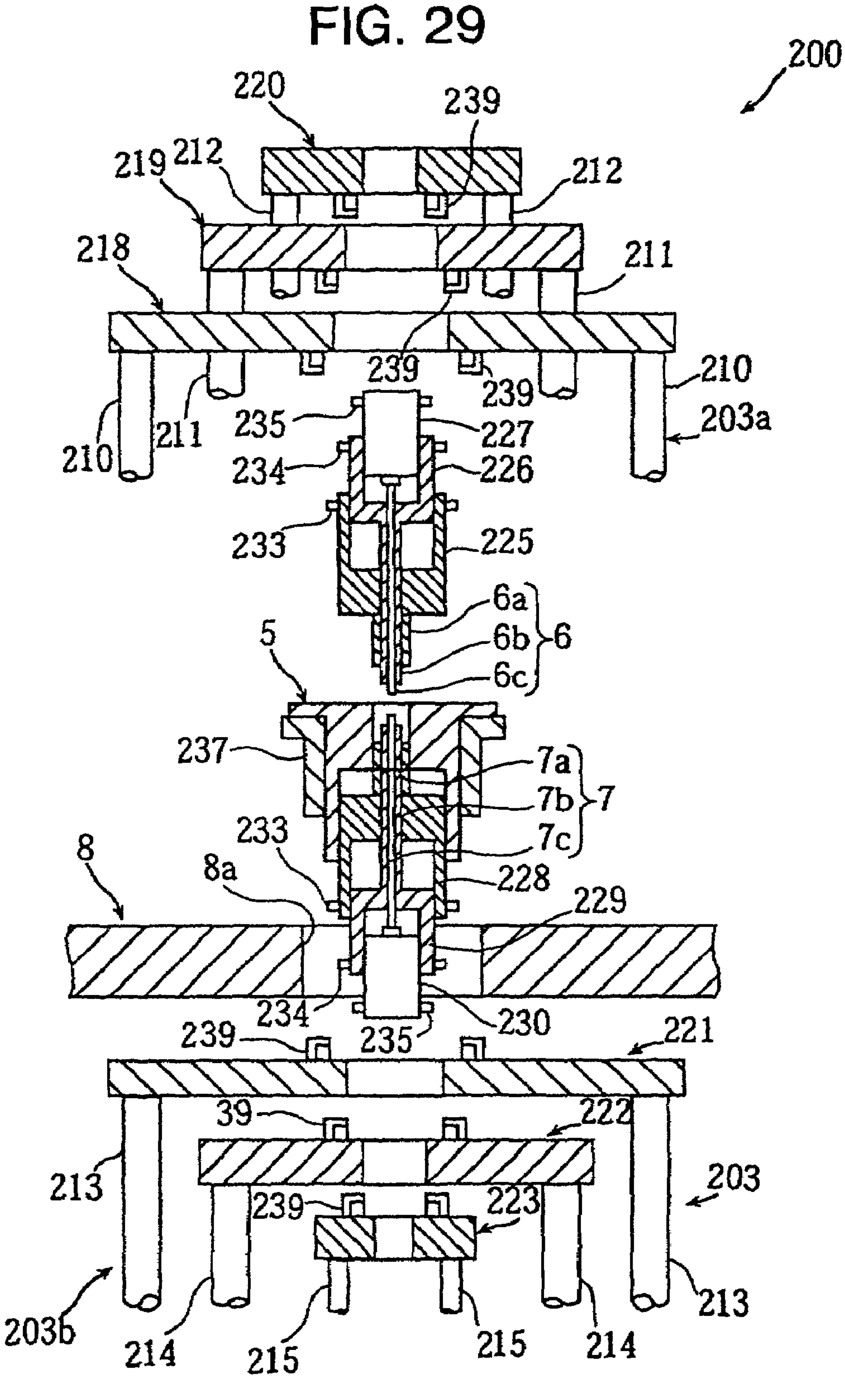
FIG. 29 is a schematic diagram illustrating the action of the powder molding apparatus.
Figure 30:
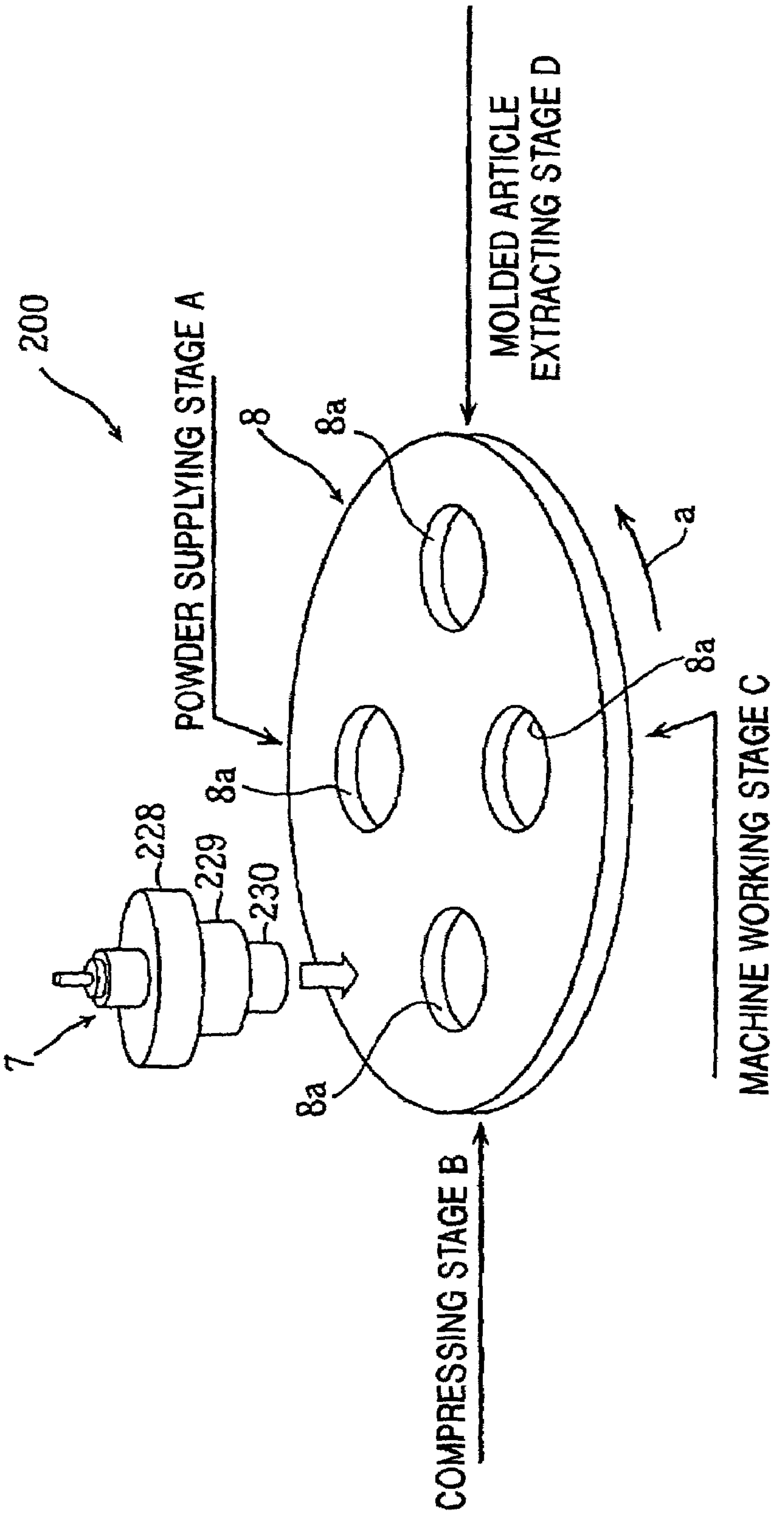
FIG. 30 is a diagram illustrating the action of the transporting table of the powder molding apparatus.

As shown in FIG. 24, the lower first punch holder 228 has a cylindrical upper holder portion 228*a* slidably inserted within the die 5, and a cylindrical lower holder portion 228*b* extending downwards integrally formed on the upper holder portion 228*a*, with multiple grooves 228*c* extending in the axial direction (compression direction) formed on the outer wall of the upper holder portion 228*a* at predetermined intervals in the circumferential direction.

Also, engaging pins 232 are inserted and fixed at the lower end portion of the die 5, and the engaging pins 232 slidably engage the grooves 228*c*. The vertical length of the grooves 228*c* is set so as to be somewhat longer than the compression stroke, and the width thereof is set so as to be slightly greater than the diameter of the engaging pins 232 (see the view along arrow A in FIG. 27B). thus, the lower first punch holder 228 is supported by the die 5 so as to not rotate or fall but so as to be capable of ascending and descending.

Also, the lower second punch holder 229 has a cylindrical upper holder portion 229*a* slidably inserted within the lower holder portion 228*b* of the lower first punch holder 228, and a cylindrical lower holder portion 229*b* extending downwards integrally formed on the upper holder portion 229*a*, with multiple grooves 229*c* extending in the axial direction formed on the outer wall of the upper holder portion 229*a* at predetermined intervals in the circumferential direction. Engaging pins 233 inserted and fixed at the lower holder portion 228*b* of the first punch holder 228 slidably engage the grooves 228*c*, and a part of the engaging pins 233 protrude outwards in the diameter direction from the lower holder portion 228*b*.

Also, the third punch holder 230 has a cylindrical holder main unit 230*a* slidably inserted within the lower holder portion 229*b* of the lower second punch holder 229 with multiple grooves 230*c* extending in the axial direction formed on the outer wall of the holder main unit 230*a* at predetermined intervals in the circumferential direction, engaging pins 234 inserted and fixed at the lower holder portion 229*b* of the second punch holder 229 slidably engage the grooves 230*c*, so the basic structure is generally the same as that described above. Also, an engaging pin 235 is inserted and fixed with both ends thereof protruding outwards from the lower part of the holder main unit 230*a* in the diameter direction.

A fixing bush 237 is mounted on the die 5 as a fixing means. This fixing bush 237 is integrally formed with a fixed flange 237*b* on the upper edge of a cylinder member 237*a* into which the die 5 is inserted, and this fixed flange 237*b* is fastened and fixed along with the die 5 to the transporting table 8 by two bolts 238.

The upper and lower punch holders 225 through 227 and 228 through 230 are detachably fastened to the upper and lower first, second, and third compression rams 218 through 220 and 221 through 223 with fastening means. The upper and lower fastening means are of the same structure, so description will be given regarding only the fastening means for the lower third compression ram 223.

A round claw member 239 is formed on the upper face of the lower third compression ram 223. This claw member 239 has a vertical-sectional hook-shaped form, made of a vertical wall 239*a* and a ceiling 239*b* bending inwards from the top of the vertical wall 239*a*, with a notch 239*c* formed on the ceiling 239*b* so as to face the diameter direction. The inner diameter of the claw member 239 is large enough that the lower third punch holder 230 can be inserted therein, and the ceiling 239*b* is designed so as to be lower in height farther away from the notch 239*c* in the circumferential direction.

Inserting the lower third punch holder 230 into the claw member 239 and inserting the engaging pin 235 into the claw member 239 from the notch 239*c* and rotating the punch holder 230 causes the engaging pin 235 to be fastened and fixed at the inner face of the ceiling 239*b* by friction.

Next, the advantages of the present embodiment will be described.

In order to attach the lower punch unit 7 top the transporting table 8, first, the first through third punches 7*a* through 7*c* are linked to the die 5 beforehand to form a unit. The die 5 is inserted within the cylinder member 237*a* of the fixing bush 237, and the fixing bush 237 is inserted in a mounting hole 8*a* of the transporting table 8. In this state, the lower first through third punch holders 228, 229, and 230 are collectively fastened to the lower first through third compressing rams 221, 222, and 223. In this case, the punch holders 228 through 230 are mutually incapable of rotating due to the engaging pins 232 through 234 engaging the grooves 228*c* through 230*c*, so the punch holders 228 through 230 can be collectively linked to the compressing rams 221 through 223 at the same time. Next, the die 5 is fastened and fixed to the transporting table 8 along with the fixing bush 237, by the bolts 238. Also, the upper first through third punch holders 225 through 227 are collectively fastened to the upper first through third compressing rams 218 through 220 following similar procedures.

In the event of exchanging the mold 2, the bolts 238 are loosened and removed, the lower first through third punch holders 228 through 230 are rotated and collectively removed from the lower first through third compressing rams 221, 222, and 223, and in this state, the fixing bush 237 is extracted form the transporting table 8. Thus, the die 5 and lower punch unit 7 are also removed at the same time. Also, with regard to the upper punch unit 6, the upper first through third punch holders 225 through 227 are collectively removed from the upper first through third compressing rams 218 through 220 in the same manner.

Thus, according to the present embodiment, the lower first through third punch holders 228 through 230 are linked one to another so as to not rotate or fall but to be relatively movable as to the die 5, the die 5 is inserted in the fixing bush 237, and the fixing bush 237 is bolted to the transporting table 8 along with the die 5, so in the event of replacing the mold, the die 5 and lower punch unit 7 can be extracted from the transportation table 8 simply by removing the bolts 238 and removing the lower first through third punch holders 228 through 230 from the lower first through third compressing rams 221 through 223. Also, all that is necessary for assembling a new mold is the simple task of inserting the fixing bush 237 in the mounting hole 8*a* of the transporting table 8, fastening the lower first through third punch holders 228 through 230 to the compressing rams 221 through 223, and then bolting down the die 5., so molds can be easily replaced in a short time, thereby improving productivity. This allows extremely simplified replacement of molds for manufacturing a small number of articles each of a great number of types, thereby improving productivity.

With the present embodiment, grooves 228*c* through 230*c* are formed on the lower first through third punch holders 228 through 230, and the fitting pins 232 through 234 of the die 5 and the first and second punch holders 228 and 229 engage the grooves 228*c* through 230*c*, so the first through third punch holders 228 through 230 can be linked one to another with a simple structure so as to not rotate or fall. Also, the upper punch unit 6 is linked with a structure similar to that of the lower punch unit 7, so the upper punch holders can also be linked one to another with a simple structure so as to not rotate or fall.

According to the present embodiment, claw members 239 are formed on the upper first through third compressing rams 218 through 220 and the lower first through third compressing rams 221 through 223, and fastened by engaging the claw members 239 with the engaging pins 233 through 235 of the upper first through third punch holders 225 through 227 and the lower first through third punch holders 228 through 230, so the punch holders 225 through 227 and 228 through 230 can be collectively mounted to the driving shafts 210 through 212 and 213 through 215, and consequently molds can be easily replaced in a short time, thereby obtaining advantages the same as those described above.

Also, the engaging pins 233 through 235 of the punch holders are inserted into the hook-shaped claw members 239 formed of a vertical wall 239*a* and ceiling 239*b*, and rotated to fasten, so the mounting and removing operation can be easily performed with a simple structure.

Figure 49:
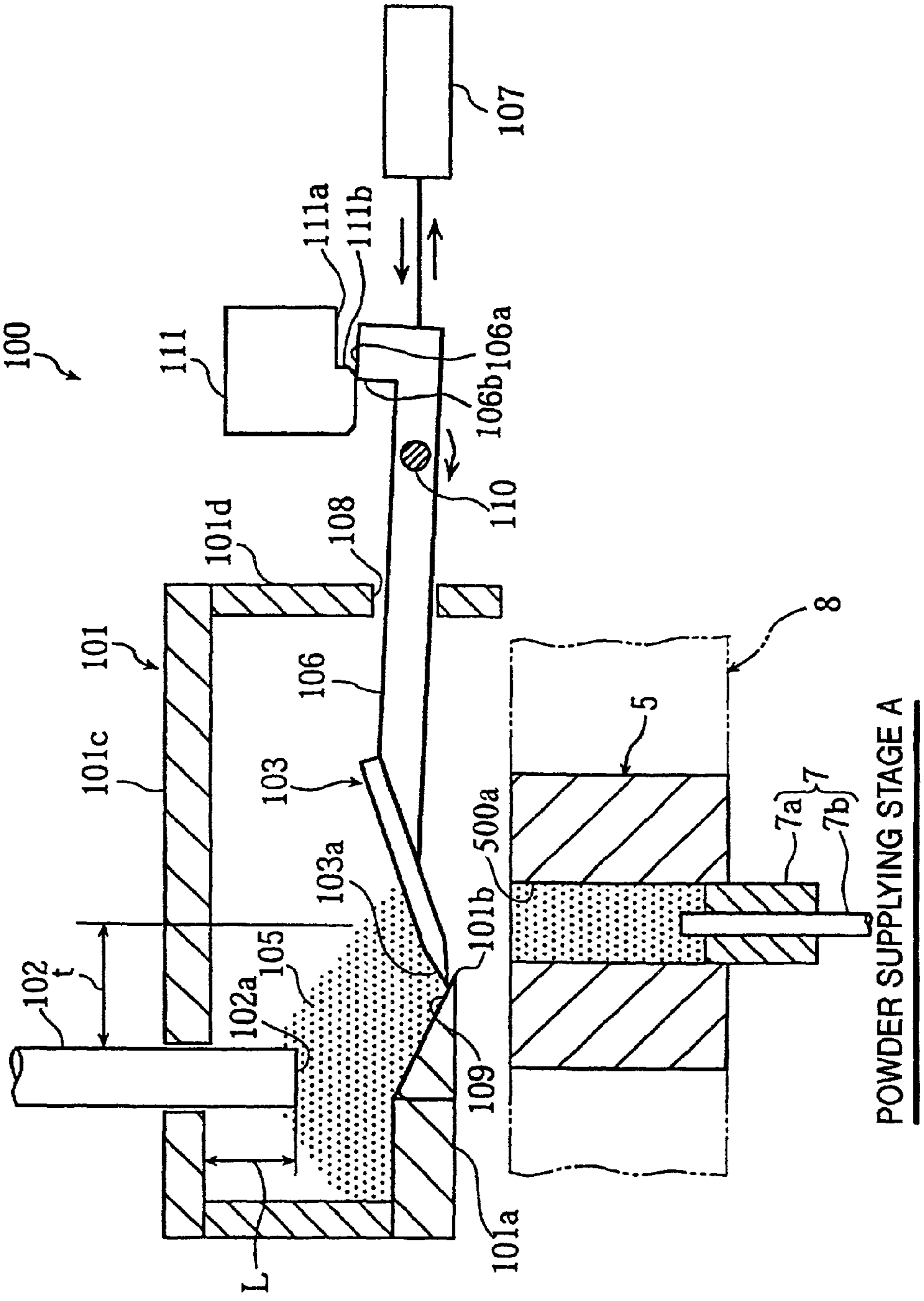
FIG. 49 is a schematic configuration diagram describing a powder molding apparatus according to another embodiment of the present invention.

As shown in FIG. 49, the powder supplying apparatus 100 comprises a powder storing unit 101 in a form of a generally airtight box that is disposed above the powder supplying stage A of the transporting table 8 and is capable of being raised or lowered, a powder supplying tube 102 for supplying powder material 105 within the powder storing unit 101, a powder injecting hole 101*b* formed on a bottom wall 101*a* of the powder storing unit 101 at a portion facing a powder molding space 500*a*, and a scraping blade 103 for opening and closing the powder injecting hole 101*b*.

The powder supplying tube 102 has the powder supplying opening 102*a* thereof offset to the side from the center of the powder injecting hole 101*b* by a distance t, so that the powder supplying opening 102*a* does not overlap the powder injecting hole 101*b* when viewing the powder supplying tube 102 linearly.

Also, the powder supplying tube 102 is inserted through the ceiling 101*c* into the powder storing unit 101 so that the powder supplying opening 102*a* is positioned at a vertically intermediate position within the powder storing unit 101. Now, the insertion length L of the powder supplying opening 102*a* from the ceiling 101*c* is determined according to the material quality, properties, etc., of the powder material. For example, in the event that the friction coefficient of the powder material is great, the insertion length L is made to be small, and in the event that the friction coefficient of the powder material is small, the insertion length L is made to be great. A hopper (not shown) filled with the powder material is connected at the upper end of the powder supplying tube 102. The powder material is naturally supplied from this hopper by the weight of the powder material itself.

The scraping blade 103 is formed of a ceramic material such as zirconia or the like, with the blade tip 103*a* being formed at an acute angle as to the upper face of the die 5. The scraping blade 103 is linked to an actuator 107 such as a cylinder mechanism or the like disposed outside the powder storing unit 101, by a supporting member 106, and is driven between a closed position wherein the powder injecting hole 101*b* is closed and an open position wherein the powder injecting hole 101*b* is open, by the actuator 107. The supporting member 106 is linked to the actuator 107 by a slit 108 formed in the side wall 101*d* of the powder storing unit 101.

A tapered portion 109 which fits with the blade tip 103*a* of the scraping blade 103 is formed at the edge of the powder injecting hole 101*b*. A rocking shaft 110 vertically supporting the supporting member 106 so as to rock is inserted to the supporting member 106. Further, the supporting member 106 has a stepped face 106*b*, with the stepped face 106*b* which engages a stepped face 111*b* of a cam 111 when the supporting member 106 advances. The cam 111 is pressed in the direction of the upper face of the die 5 by an unshown spring member, such that the spring member causes the upper face 106*a* of the supporting member 106 and the bottom face 111*a* of the cam 111 to engage when the supporting member 106 is retracted.

At the same time that the scraping blade 103 scrapes the excess powder material due to the advance of the supporting member 106, the stepped face 106*b* of the supporting member 106 engages the stepped face 111*b* of the cam 111, the supporting member 106 rotates on the rocking shaft 110 so as to raise the scraping blade 103 up slightly, and accordingly the blade tip 103*a* rides up on the tapered portion 109. Further advancement of the supporting member 106 causes the stepped face 106*b* and the stepped face 111*b* to overlap, thereby positioning and holding the scraping blade 103 at the closed position.

With the powder injecting mechanism 100 according to the present embodiment, forming a powder injecting hole 101*b* at the bottom wall 110*a* of a generally airtight box-shaped powder storing unit 101, and providing a scraping blade 103 to scrape away excess powder material 105 outside the powder molding space 500*a* and also to close off the powder injecting hole 101*b*, enables scraping off of excess powder material 105 and closing off of the powder injecting hole 101*b* at the same time simply by moving the scraping blade 103, so there is no need to move the entire powder supplying box or to keep in constant contact with the die as with conventional arrangements, application can also be made to dice with small areas of scraping contact, and also, application can be made to consecutive molding apparatuses.

Making the blade tip 103*a* of the scraping blade 103 to be at an acute angle as to the surface of the die upon which scraping blade slides allows the excess powder material 105 outside the powder molding space 500*a* to be smoothly scraped off without causing the powder material 105 to scatter, the face of the scraped powder material can be made uniform, and irregularities in the density of powder filling and the amount of supplying can be prevented.

Forming the scraping blade 103 of a ceramic material such as zirconia or the like suppresses wear of the blade tip 103*a* even after repeated operations, thus extending the life thereof as compared to conventional arrangements wherein felt is applied.

With the present embodiment, offsetting the powder supplying tube 102 outwards from the center of the powder injecting hole 101*b* by a distance t keeps the change in pressure due to the amount of powder remaining within the hopper from directly acting upon the powder injecting hole 101*b*, thereby preventing irregularities in powder density within the powder storing unit 101, and thus preventing irregularities in filling density to the die 5.

Also, passing the powder supplying tube 102 through the ceiling 101*c* of the powder storing unit 101 so as to be inserted to the inside thereof allows space to be left within the powder storing unit 101, suppressing change in the density of powder in the powder storing unit 101 due to change in the amount of powder remaining in the hopper, also preventing irregularities in filling density from this perspective as well.

With the present embodiment, forming a tapered portion 109 at an edge of the powder injecting hole 101*b* so as to fit with the blade tip 103*a* of the scraping blade 103 closes off the powder injecting hole 101*b* while the blade tip 103*a* rides up on the tapered portion 109 at the same time, thus allows any gap between the powder injecting hole 101*b* and the blade 103 to be done away with when closing, and preventing leaking of the powder material 105.

Providing the scraping blade 103 independently from the powder storing unit 101 so as to drive the scraping blade 103 with the actuator 107 outside the powder storing unit 101 with the supporting member 106 allows the change in capacity within the powder storing unit 101 due to the scraping blade 103 to be reduced, thereby maintaining the amount of powder stored within the powder storing unit 101 at a stable level.

Further, transporting the die 5 on the transporting table 8 in the order of the powder supplying stage A, compression molding stage B, machine working stage C, and molded article extracting stage D, so powder supplying can be smoothly performed at the powder supplying stage A without allowing powder to scatter around, and thus is applicable to consecutive production.

Now, though the above embodiments have been described with reference to examples of powder molding apparatuses which perform continuous production by transporting the die 5 on the transporting table 8 through the stages A through D, the powder supplying device according to the present invention is by no means restricted to use with such continuous-production type powder molding apparatuses; rather, the powder supplying device can also be applied to molding apparatus which perform compression molding in a state wherein the mold is fixed immovably.

Also, though the above embodiment has been described with reference to an arrangement wherein the fixing bush 237 is tightened and fixed to the transporting able 8 along with the die 5 by bolts 238, the present invention is by no means restricted to this arrangement.

Figure 43:
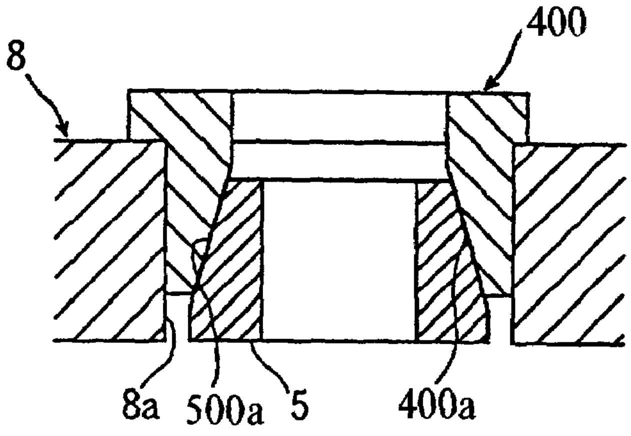
FIG. 43 is a cross-sectional view illustrating fixing means according to another embodiment of the present invention.

FIG. 43 illustrates fixing means according another embodiment of the present invention. With the fixing means according to the present embodiment, a recessed tapered portion 400*a* is formed on the inner circumference of a fixing bush 400, a protruding tapered portion 500*a* is formed on the outer perimeter of the die 5, and the protruding tapered portion 500*a* and recessed tapered portion 400*a* are fit so as to fix the die 5 to the transporting table 8. In this case, the positioning of the die 5 can be performed in a sure manner, and the die can be mounted and fixed with a single operation, thereby doing away with the necessity to fasten with bolts and further reducing the time for replacing molds.

Figure 44A:
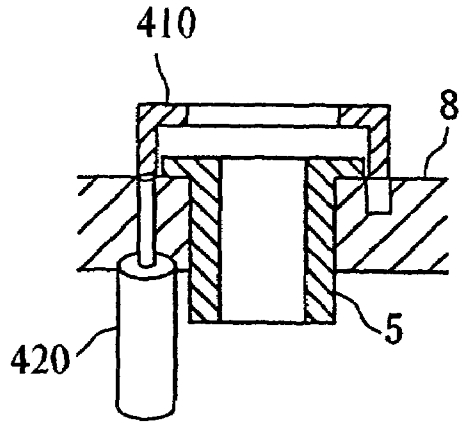
FIGS. 44A and 44B are diagrams illustrating fixing means according to another embodiment of the present invention.
Figure 44B:
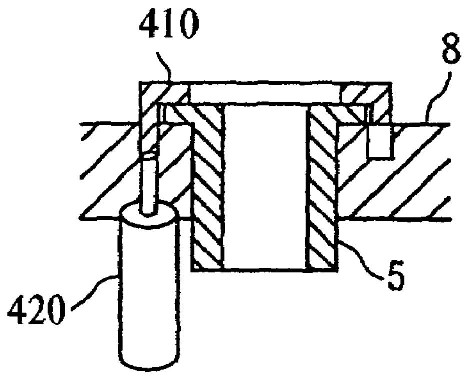

FIGS. 44A and 44B illustrate fixing means according to another embodiment of the present invention. This is an example of pressing and fixing the die 5 to the transporting table 8 with a pressing plate 410, but an actuator 420 such as a pneumatic cylinder or hydraulic cylinder. This arrangement allows fixing of the dice 5 to be performed automatically, further improving ease of work.

Figure 45:
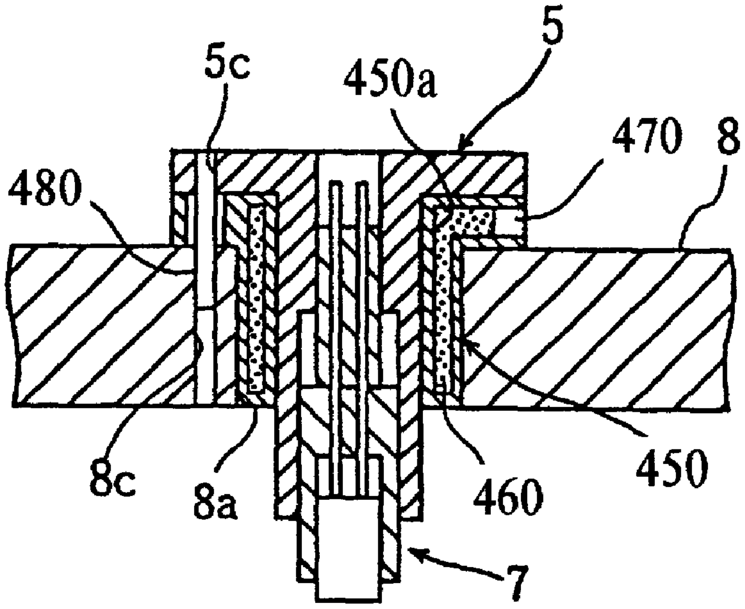
FIG. 45 is a cross-sectional view illustrating fixing means according to another embodiment of the present invention.
Figure 46:
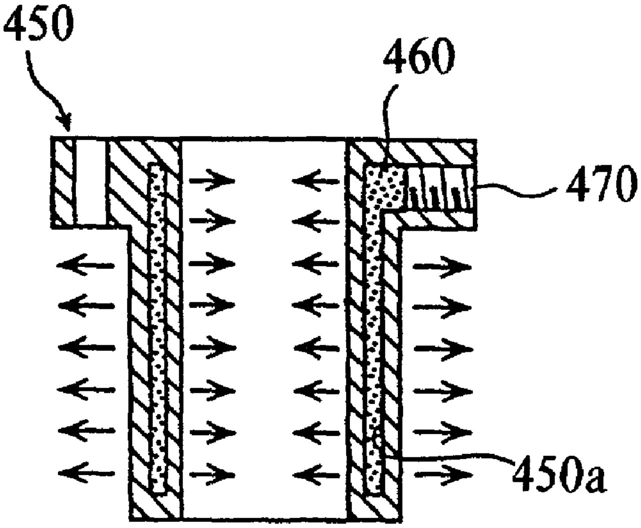
FIG. 46 is a cross-sectional view of a fixing bush of the fixing means.

FIGS. 45 and 46 illustrate fixing means according to another embodiment of the present invention. The fixing means here have an oil jacket 450*a* filled with operating oil 460 for the fixing bush (fluid pressure fixing member), with a plug 470 for pressurizing the operating oil 460 within the oil jacket 450*a* capable of advancing and retreating being screwed in. Screwing in the plug 470 causes the oil jacket 450*a* to expand due to the oil, so the fixing bush 450 uniformly expands in the radial direction and presses and fixes the die 5 to the transporting table 8, thereby enabling the positioning precision of the die 5 as to the transporting table 8 to be improved. With the present embodiment, the die 5 can be fixed simply by screwing the plug 470, thus enabling further reduction in time for replacing molds.

Also, a positioning pin 480 is inserted into a flange 5*c* of the die 5, and inserting this positioning pin 480 into a positioning hole 8*c* on the transporting table restricts the attachment position and attachment direction of the die 5.

Also, with the above embodiments, an arrangement has been described wherein fastening is realized by rotating the engaging pins 233 through 235 of the upper and lower first through third punch holders 225, 226, and 227 and 228 through 230 with the claw members 239 of the compressing rams 218, 220, 221, and 223, but with the present invention, the punch holders may be fastened to the compressing rams by pneumatic or hydraulic actuators or the like, as mentioned above in the Summary. This arrangement allows mold replacing work to be performed automatically, further improving ease of work.

Further, though the above embodiment has been described with reference to an example comprising upper and lower punch units with first, second, and third punches, the present invention is by no means restricted to this arrangement, and it is needless to state that the present invention can be applied to punch units comprising two punches, or punch units comprising four or more punches, as well.

Figure 47:
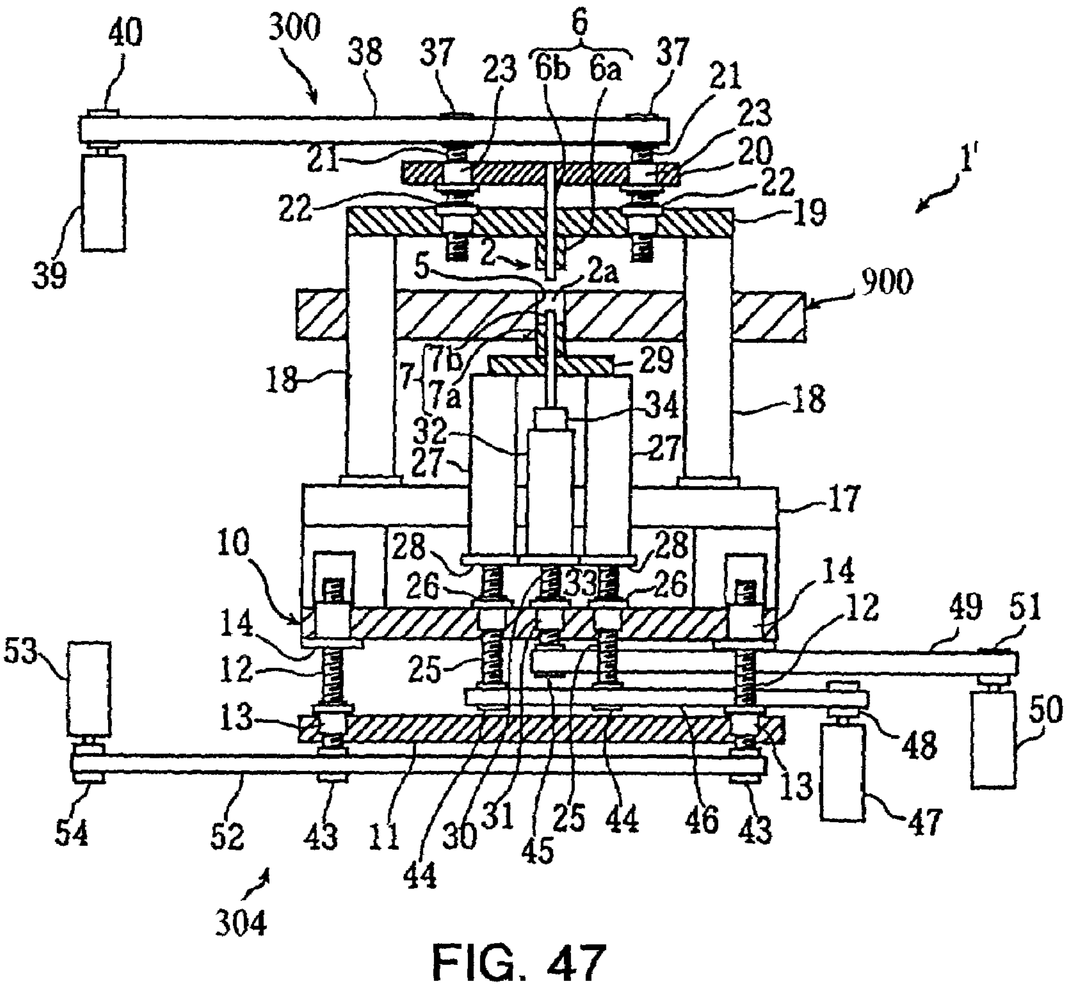
FIG. 47 is a schematic configuration diagram describing a powder molding apparatus according to another embodiment of the present invention.

FIG. 47 is a schematic configuration diagram describing a powder molding apparatus according to a sixth aspect of the present invention.

In the figure, reference numeral 1' denotes a powder molding apparatus which manufactures ceramic electronic part elements by compressing molding of a ceramic powder material. The powder molding apparatus 1' comprises a mold 2 made up of a die 5 wherein mainly ceramic powder is filled, and upper and lower driving units 300 and 304 for performing compression forming of the ceramic powder material with the mold 2. The upper driving unit 300 is positioned above the mold 2, and the lower driving unit 304 is positioned below the mold 2.

The mold 2 is formed of a dice plate 900 where the die 5 is positioned, and an upper punch unit 6 and lower punch unit 7 inserted and positioned across the die 5, such that the part encompassed by the die 5 and the upper and lower punch units 6 and 7 forms a powder molding space 2*a*. The dice plate 900 is fixed so as to be immovable.

The upper punch unit 6 is formed by inserting a pin-shaped upper second punch 6*b* within a cylindrical upper first punch 6*a* in a relatively movable manner, and the lower punch unit 7 is formed by inserting a pin-shaped lower second punch 7*b* within a cylindrical lower first punch 7*a* in a relatively movable manner, as described above. Such independent driving of the punch units 6 and 7 allows formation of molded articles of various types having uniform density, and enables working of molded articles having cylindrical shapes, hollow cylindrical shapes, cross-sectional H shapes, cross-sectional cross shapes, for example, to be realized.

A driving base 10 is disposed below the dice plate 900 so as to be vertically driven, and a fixed base 11 is disposed and fixed below the driving base 10 so as to not be moved. Upper first ball screws 12 are rotatably supported by this fixed base 11 by bearings 13, with the bearings 13 being attached and fixed to the fixed base 11. Nuts 14 attached and fixed to the driving base 10 are screwed onto the upper first ball screws 12.

A supporting table 17, having the shape of a box with one side open and facing downwards, is attached and fixed to the driving base 10. Upper first poles 18 slidably supported by the dice plate 9 are erected on the upper face of the supporting table 17, and the upper ends of the poles 18 pass through the dice plate 9 and on upwards. An upper first mold supporting plate 19 is laid across between the upper ends of the poles 18 and thus fixed, and the upper first punch 6*a* is attached and fixed on the lower face of the upper first mold supporting plate 19. Rotating the upper first ball screws 12 causes the upper first punch 6*a* to move vertically along with the driving base 10 and the upper first poles 18.

An upper second mold supporting plate 20 is disposed above the first mold supporting plate 19 so as to be vertically movable, and the upper second punch 6*b* is attached and fixed at the lower face of the second mold supporting plate 20. Upper second ball screws 21 are rotatably supported on the upper first mold supporting plate 19 by bearings 22, with the bearings 22 being attached and fixed onto the mold supporting plate 19. The upper second ball screws 21 are screwed to nuts 23 attached and fixed to the upper second mold supporting plate 20, such that rotating the ball screws 21 vertically moves the upper second punch 6*b* along with the upper second mold supporting plate 20.

Lower first ball screws 25 are rotatably supported on the driving base 10 by bearings 26, with the bearings 26 being attached and fixed to the driving base 10. The lower first ball screws 25 are inserted into lower first poles 27 slidably supported by the supporting table 17, and screwed to nuts 28 inserted and fixed to the lower end of the lower first poles 27. Also, a lower first mold supporting plate 29 is laid across the upper end of the lower first poles 27 and linked, and the lower first punch 7*a* is attached and fixed on the upper face of the lower first mold supporting plate 29. Thus, rotating the lower first ball screws 25 causes the lower first punch 7*a* to move vertically along with the driving base 10 and lower first poles 27.

A lower second ball screw 30 is rotatably supported on the driving base 10 between the lower first ball screws 25 by bearings 31, with the bearings 31 attached and fixed to the driving base 10. The lower second ball screw 30 is inserted into a lower second pole 32 slidably supported by the supporting table 17, and screwed to a nut 33 inserted and fixed to the lower end of the lower second pole 32. Also, a lower second mold supporting plate 34 is linked to the top of the lower second pole 32, and the lower second punch 7*b* is attached and fixed on the upper face of the mold supporting plate 34. Rotating the lower second ball screw 30 causes the lower second punch 7*b* to move vertically along with the lower second mold supporting plate 34 and the lower second pole 32.

The upper second ball screws 21 pass through the upper second mold supporting plate 20 and protrude upwards, with slave pulleys 37 mounted to the protruding portions of these. An upper second timing belt 38 passes over the salve riving pulleys 37, and the timing belt 38 passes over a driving pulley 40 mounted on an upper second servo motor 39. Thus, rotation of the upper second servo motor 39 causes the upper second punch 6*b* to vertically move along with the upper second mold supporting plate 20.

The lower first and second ball screws 25 and 30 pass through the driving base 10 and protrude downwards, with slave pulleys 44 and 45 mounted on the respective protruding portions.

A lower first timing belt 46 passes over the slave pulleys 44 of the lower first ball screws 25, and the timing belt 46 passes over a driving pulley 48 mounted on a lower first servo motor 47. Rotation of the lower first servo motor 47 causes the lower first punch 7*a* to vertically move along with both lower first poles 27.

A lower second timing belt 49 passes over the slave pulley 45 of the lower second ball screw 30, and the timing belt 49 passes over a driving pulley 51 mounted on a lower second servo motor 50. Rotation of the lower second servo motor 50 causes the lower second punch 7*b* to vertically move along with the lower second pole 32.

The upper first ball screws 12 pass through the fixed base 11 to protrude downwards, with slave pulleys 43 mounted to the protruding portions. An upper first timing belt 52 passes over slave pulleys 43, and the timing belt 52 passes over a driving pulley 54 mounted on an upper first servo motor 53.

Now, rotating the upper first servo motor 53 in the state that the upper second servo motor 39 and the lower first and second servo motors 47 and 50 are stopped causes the upper first and second punches 6*a* and 6*b* and the lower first and second punches 7*a* and 7*b* to be moved vertically along with the driving base 10 in a synchronous manner.

Next, the advantages of the present embodiment will be described.

In order to manufacture a ceramic molded article with the powder molding apparatus 1' according to the present embodiment, the upper punch unit 6 stands by at a predetermined position above the die 5, the lower face of the die 5 is closed with the lower punch unit 7, and ceramic powder material is filled in the powder molding space 2*a*. In this state, the punches 6*a*, 6*b*, 7*a*, and 7*b* are independently vertically driven with the servo motors 53, 39, 47, and 50. This compresses the ceramic powder material, thereby forming a ceramic molded article of the predetermined form. That is to say, the feeding of the upper first and second ball screws 12 and 21 lowers the upper first and second punches 6*a* and 6*b*, and the feeding of the lower first and second ball screws 25 and 30 raises the lower first and second punches 7*a* and 7*b*, thereby performing compression molding. In this case, the descent of the lower first and second punches 7*a* and 7*b* accompanying the descent of the driving base 10 is absorbed by raising the lower first and second ball screws 25 and 30 by the amount of feeding of the upper first ball screws 12 in addition to the amount of feeding necessary for compression.

Once the predetermined compression molding is completed, the upper second servo motor 39 and the lower first and second servo motors 47 and 50 are stopped, thereby fixing the upper second ball screws 21 and lower first and second ball screws 25 and 30. In this state, the upper first ball screws 12 are rotated by the upper first servo motor 53. This causes the driving base 10 rise, and also for the upper first and second punches 6*a* and 6*b* and the lower first and second punches 7a and 7b to be raised with the distance between the punches maintained, following which the formed article is extracted from the die 5.

Thus, according to the present embodiment, the upper first punch 6a is fixed with upper first poles 18 to a driving base 10 supported by upper first ball screws 12 so as to be vertically movable, and the other upper second ball screws 21 and lower first and second ball screws 25 and 30 are mounted on the driving base 10, with the upper second punch 6b and lower first and second punches 7a and 7b being independently driven by the ball screws 21, 25, and 30, so that at the time of compression forming, ceramic powder material is subjected to compression forming by upper first and second punches 6a and 6b and lower first and second punches 7a and 7b with the ball screws 12, 21, 25, and 30, and accordingly, a molded article having a uniform compression density can be formed.

Also, at the time of separating from the mold, raising the driving base 10 with the upper first ball screw 12 in the state that the upper second ball screws 21 and lower first and second ball screws 25 and 30 are fixed causes the upper first and second punches 6a and 6b and lower first and second punches 7a and 7b to rise simultaneously, so the molded article can be separated from the die 5 in a state that the distance between the punches is maintained. Thus, the structure of the devices for supplying powder and extracting the molded articles can be simplified, thereby suppressing increases in costs.

According to the present embodiment, independently driving the upper and lower punch units 6 and 7 by the servo motors 53, 39, 47, and 50 linked to the ball screws 12, 21, 25, and 30 by the timing belts 52, 38, 46, and 49 allows the degree of freedom of form to be increased while making the density of the molded article uniform, and also friction resistance at the time of driving is reduced so back-lashing can be avoided, and accordingly, the quality and dimensional precision of the molded articles can be improved.

Figure 48:
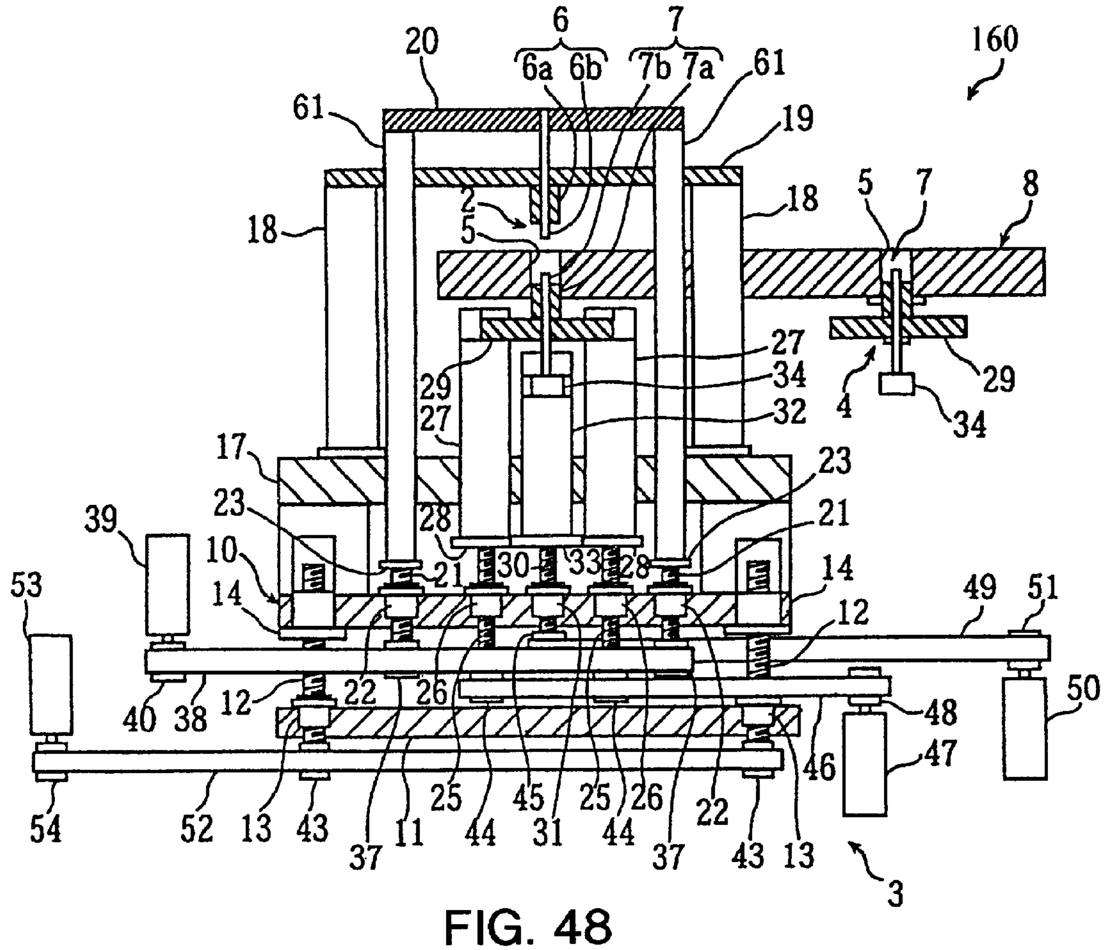
FIG. 48 is a schematic configuration diagram describing a powder molding apparatus according to another embodiment of the present invention.

FIG. 48 and FIG. 3 are diagram for describing the powder molding apparatus according to another embodiment of the present invention, wherein FIG. 48 is a schematic configuration diagram of the powder molding apparatus, and FIG. 3 is a plan view illustrating the action of the transporting table. The reference numerals in these figures which are the same as those in FIG. 17 denote the same or equivalent components, and description of the same reference numerals will be omitted.

The powder molding apparatus 160 according to the present invention is configured with a driving base 10 supported by upper first ball screws 12 so as to be vertically movable, the driving base 10 mounting the upper second ball screws 21 and lower first and second ball screws 25 and 30, so that the upper first and second punches 6a and 6b and lower first and second punches 7a and 7b vertically move simultaneously with the vertical movement of the driving base 10, and the basic configuration is generally the same as that of the first embodiment.

The upper second ball screws 21 are supported on the driving base 10 by bearings 22, and accordingly, all of the ball screws 12, 21, 25, and 30, are concentrated on the driving base 10, with the servo motors 53, 39, 47, and 50 also concentrated. The upper second ball screws 21 are screwed to nuts 23 inserted and fixed to the upper second poles 61, and the upper second punch 6b is attached and fixed on the lower face of the upper second mold supporting plate 20 fixed between the upper ends of the upper second poles 61.

The die 5 is disposed on the transporting table 8. The transporting table 8 is disc-shaped, and four dice 5 are disposed and fixed at 90° intervals on the perimeter thereof. Each of the dice 5 on the transporting table 8 have disposed thereto lower punch units 7 and lower first and second mold supporting plates 29 and 34.

As shown in FIG. 3, the transporting table 8 linked to an external rotational driving mechanism (not shown), and is configured so as to continuously be rotationally driven by the rotational driving mechanism in the order of the powder supplying stage A, compression molding stage B, machine working stage C, and molded article extracting stage D (the direction indicated by the arrow “a” in FIG. 3).

Disposed at the stages A through D is a clamping mechanism (not shown) for positioning and clamping the lower first and second molding supporting plates 29 and 34 at the predetermined positions at the stages A through D, and disengaging the clamping when transporting. Also disposed to the transporting table 8 is a holding mechanism (not shown) which holds and prevents falling of the lower first and second molding supporting plates 29 and 34 during transportation, and disengages the holding of the lower punch unit 7 at predetermined positions at the stages A through D, so as to permit vertical movement.

The operation of the powder molding apparatus 160 will now be described.

Upon a die 5 positioned at the powder supplying stage A being filled with the ceramic powder material, the transporting table 8 rotates 90° in the direction indicated by the arrow “a”. Thus, the die 5 filled with the ceramic powder material and the lower punch unit 7 are transported to the powder compressing stage B, and here compression molding is performed by the upper and lower punch units 6 and 7. At this time, the next die 5 transported to the powder supplying stage A is filled with the ceramic powder material.

Once the compressing molding is completed, the transporting table 8 rotates 90°, the molded article which has been formed by the compression molding is transported to the machine working stage C, and subjected to machine working such as grinding, hole-opening, and so forth, as necessary. At this time, compression molding is performed on the next ceramic powder at the powder compressing stage B, and the next die 5 transported to the powder supplying stage A is filled with the ceramic powder material.

Once the predetermined machine working is completed at the machine working stage C, the transporting table 8 rotates 90°, the molded article that has been worked is transported to the molded article extracting stage D, where the molded article is extracted. Thus, the transporting table 8 rotates sequentially such that molded articles are continuously manufactured at high speed.

According to the present embodiment, the driving base 10 is supported by upper first ball screws 12 so as to be vertically movable, and the driving base 10 mounts the upper second ball screws 21 and lower first and second ball screws 25 and 30, so that the upper first and second punches 6a and 6b and lower first and second punches 7a and 7b vertically move simultaneously with the vertical movement of the driving base 10. Accordingly, the molded article can be separated from the die 5 in a state wherein the distance between the punches is maintained, thereby yielding advantages the same as those of the first embodiment.

Also, with the present embodiment, the ball screws 12, 21, 25, and 30, are concentrated on the driving base 10, and the servo motors 53, 39, 47, and 50 are concentrated around the driving base 10, so providing a reference surface on the driving base 10 allows assembly precision to be improved, and facilitates assembly work and maintenance work.

Also, the driving system is disposed on the driving base 10 below the die 5, so the overall apparatus height can be reduced as compared to arrangements wherein the driving system is disposed above and below the die 5, thereby contributing to reduction in size.

Figure 50:
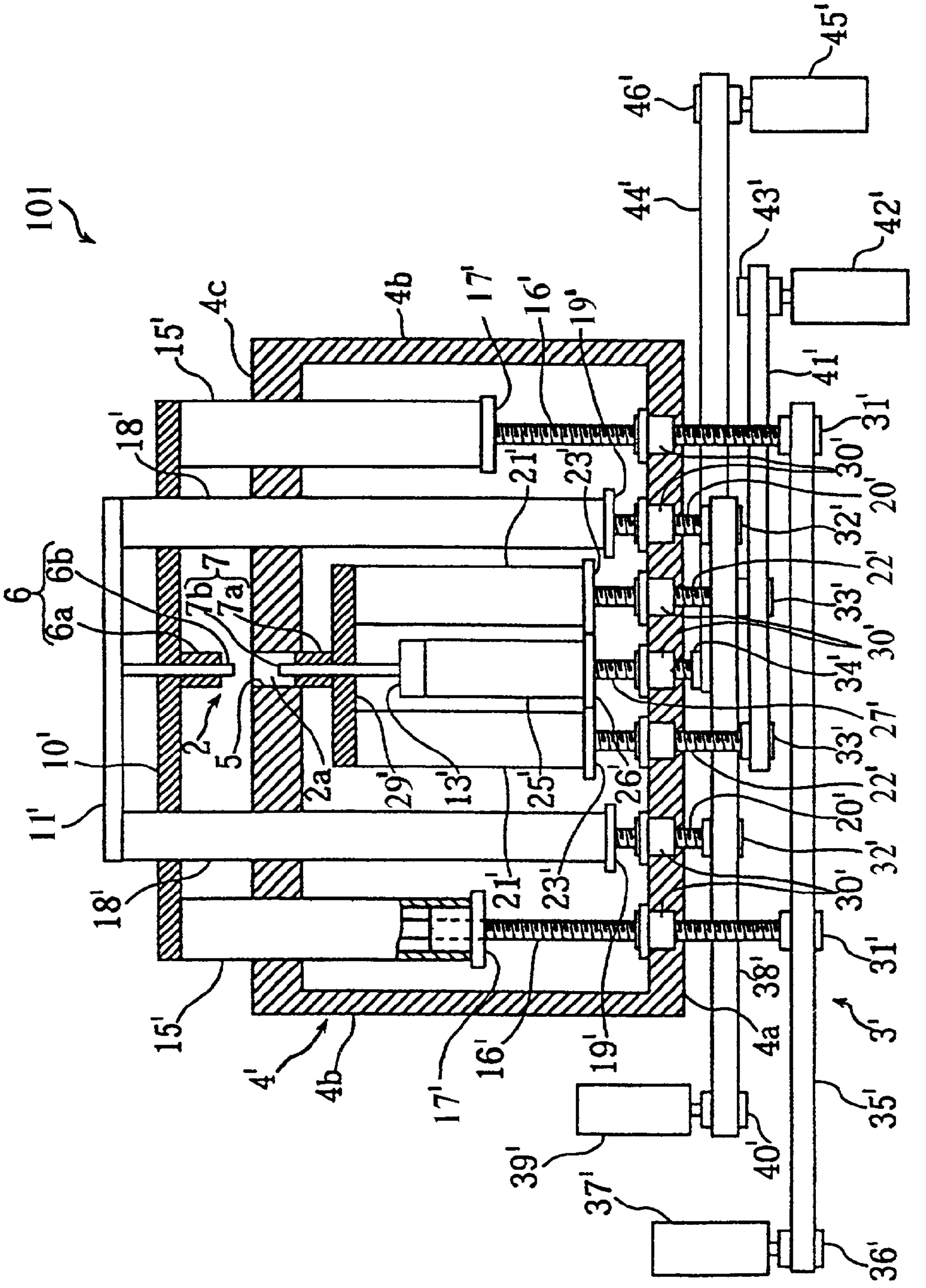
FIG. 50 is a schematic configuration diagram describing a powder molding apparatus according to another embodiment of the present invention.

FIG. 50 is a schematic configuration diagram describing a powder molding apparatus according to another embodiment of the present invention.

In the figure, reference numeral 1 denotes a powder molding apparatus which manufactures ceramic electronic part elements by compressing molding of a ceramic powder material. The powder molding apparatus 1 comprises a mold 2 wherein mainly ceramic powder is filled, a driving unit 3' for performing compression forming of the ceramic powder material filled in the mold 2, and a fixed frame (base) 4' for supporting the mold 2 and driving unit 3.

The mold 2 is formed of a cylindrical die 5, and an upper punch unit 6 and lower punch unit 7 inserted and positioned across the die 5, such that the part encompassed by the die 5 and the upper and lower punch units 6 and 7 forms a powder molding space 2*a*.

The upper punch unit 6 is formed by inserting a pin-shaped upper second punch 6*b* within a cylindrical upper first punch 6*a* in a relatively movable manner, and the lower punch unit 7 is formed by inserting a pin-shaped lower second punch 7*b* within a cylindrical lower first punch 7*a* in a relatively movable manner, as described above. Such independent driving of the punch units 6 and 7 allows formation of molded articles of various types, and enables working of molded articles having cylindrical shapes, hollow cylindrical shapes, cross-sectional H shapes, cross-sectional cross shapes, for example, to be realized.

An upper first mold supporting plate 10 is attached and fixed to the upper face of the upper first punch 6*a*, and an upper second mold supporting plate 11 is attached and fixed to the upper face of the upper second punch 6*b*. The upper first and second mold supporting plates 10 and 11 are vertically separated and positioned so as to not interfere with one another. Also, a lower first mold supporting plate 29 is attached and fixed to the lower face of the lower first punch 7*a*, and a lower second mold supporting plate 13' is attached and fixed to the lower face of the lower second punch 7*b*. The lower first and second mold supporting plates 29 and 13' are vertically separated and positioned so as to not interfere with one another, in the same manner as described above.

The upper faces of cylindrical upper first driving shafts 15 are connected and fixed to both end portions of the upper first mold supporting plate 10', and upper first ball screws 16' are inserted within each of the upper first driving shafts 15'. The upper first ball screws 16' are screwed to nuts 17' mounted and fixed to the lower end of the upper first driving shafts 15', such that vertically moving the upper first ball screws 16' causes the upper first driving shafts 15' to move vertically, and accordingly the upper first punch 6*a* is moved vertically by the upper first mold supporting plate 10'.

Also, the upper faces of cylindrical upper second driving shafts 18 are connected and fixed to both end portions of the upper second mold supporting plate 11', and upper second ball screws 20' are inserted within each of the upper second driving shafts 18' screwed to nuts 19' in the same manner as described above. Rotating the upper second ball screws 20' causes the upper second punch 6*b* to be moved vertically by the upper second driving shafts 18'.

The upper faces of lower first driving shafts 21' are connected and fixed to both end portions of the lower first mold supporting plate 29, and lower first ball screws 22' are inserted within each of the lower first driving shafts 21'. The lower first ball screws 22' are screwed to nuts 23' mounted and fixed to the lower end of the lower first driving shafts 22', such that rotating the upper first ball screws 22' causes the lower first driving shafts 21' to move vertically, and accordingly the lower first punch 7*a* is moved vertically by the lower first mold supporting plate 12'.

Also, the upper faces of lower second driving shafts 25' are connected and fixed to both end portions of the lower second mold supporting plate 13', and lower second ball screws 27' are inserted within each of the lower second driving shafts 25' screwed to nuts 26' in the same manner as described above. Rotating the lower second ball screws 27' causes the lower second punch 7*b* to be moved vertically by the lower second driving shafts 25'. The ball screws 16', 20', 22', and 27' are all disposed parallel and vertically, and are independently rotationally driven by later-described servo motors.

The driving shafts 15' and 18' are supported by the fixing frame 41 along with the ball screws 16' and 20', and the remaining driving shafts 21' and 25' are supported by the fixing frame 4' by the ball screws 22', and 27'. This fixing frame 4' comprises a base portion 4*a* positioned below the die 5, side frame portions 4*b* extending vertically upwards from both edges of the base portion 4*a*, and an upper frame portion 4*c* wherein the upper ends of the side frame portions 4*b* have been joined above, the components being integrally formed in a rectangular box shape.

The upper first and second driving shafts 15' and 18' are slidably supported by the upper frame portion 4*c*, and the die 5 is disposed and fixed on this upper frame portion 4*c*.

The ball screws 16', 20', 22', and 27' are rotatably supported and fixed by the bearings 30 disposed and fixed on the base portion 4*a*. The ball screws 16', 20', 22', and 27' pass through the base portion 4*a* and extend on downwards, and slave pulleys 31', 32', 33', and 34' are mounted on the lower ends thereof.

An upper first timing belt 35' passes over the slave pulleys 31' of the upper first ball screws 16', and the upper first timing belt 35' passes over a driving pulley 36' mounted to an upper first servo motor 37'. Rotating the upper first servo motor 37' causes the upper first driving shafts 15' to move vertically in a synchronous manner.

An upper second timing belt 38' passes over the slave pulleys 32' of the upper second ball screws 20', and the upper second timing belt 38' passes over a driving pulley 40' mounted to an upper second servo motor 39'. Rotating the upper second servo motor 39' causes the upper second driving shafts 18' to move vertically in a synchronous manner.

A lower first timing belt 41' passes over the slave pulleys 33' of the lower first ball screws 22', and the lower first timing belt 41' passes over a driving pulley 43' mounted to a lower first servo motor 42'. Rotating the lower first servo motor 42' causes the lower first driving shafts 21' to move vertically in a synchronous manner.

A lower second timing belt 44' passes over the slave pulleys 34' of the lower second ball screws 27', and the lower second timing belt 44' passes over a driving pulley 46' mounted to a lower second servo motor 45'. Rotating the lower second servo motor 45' causes the lower second driving shafts 25' to move vertically in a synchronous manner.

The servo motors 37', 39', 42', and 45', are centrally disposed around the base portion 4*a*, and are supported and fixed by the base portion 4*a* by unshown brackets or the like.

Next, the advantages of the present embodiment will be described.

In order to manufacture a ceramic molded article with the powder molding apparatus 1 according to the present embodiment, the upper punch unit 6 stands by at a predetermined position above the die 5, and the lower face of the die 5 is closed with the lower punch unit 7. In this state, ceramic powder material is filled in the powder molding space 2*a*. The upper first and second punches 6*a* and 6*b* are lowered, and the lower first and second punches 7*a* and 7*b* are raised by the servo motors 37', 39', 42', and 45'. This compresses the ceramic powder material, thereby forming a ceramic molded article of the predetermined form. Later, the upper first and second punches 6*a* and 6*b* are raised to the standby position, the lower first and second punches 7*a* and 7*b* are raised, and the formed article is extracted from the die 5.

According to the present embodiment, the ball screws 16', 20', 22', and 27', are centrally disposed on the base portion 4*a* of the frame 4' and supported and fixed by the bearings 30', thereby enabling a reference surface to be provided on the base portion 4*a* upon which the bearings 30' and the ball screws 16', 20', 22', and 27', are assembled on the reference surface. This arrangement allows precision in assembly to be achieved more readily than with conventional arrangements wherein the components are assembled at the upper and lower portions of the apparatus, also facilitating assembly work and maintenance work.

Also, the servo motors 37', 39', 42', and 45', are centrally disposed around the base portion 4*a*, so precision of assembly with the ball screws 16', 20', 22', and 27' can be readily achieved, also facilitating assembly work and maintenance work from this perspective as well.

Concentrating the heavy components such as the ball screws 16', 20', 22', and 27' and the servo motors 37', 39', 42', and 45' on the base portion 4*a* allows the rigidity of the overall apparatus to be alleviated by increasing the rigidity of the base portion 4*a* itself, thus contributing to reduction in size and in costs.

Forming side frame portions 4*b* extending vertically upwards from both edges of the base portion 4*a* and an upper frame portion 4*c* wherein the upper ends of the side frame portions 4*b* have been joined above to form a rectangular box shape frame 4', and disposing the die 5 on the upper frame portion 4*c*, allows the die 5 to be supported by and fixed on the frame 4' with great rigidity, thereby ensuring rigidity at the time of compression molding.

With the present embodiment, the upper first and second punches 6*a* and 6*b* are lowered by the upper first and second mold supporting plates 10', and 11' with the ball screws 16' and 20', the lower first and second punches 7*a* and 7*b* are raised by the lower first and second mold supporting plates 29 and 13' with the ball screws 22' and 27' thereby effecting compression molding, which allows the height-wise dimensions of the apparatus to be reduced as compared with conventional arrangements wherein driving units are disposed above and below the die plate, thereby contributing to even further reduction in size.

According to the present embodiment, independently driving the upper and lower punch units 6 and 7 by the servo motors 37', 39', 42', and 45' with the timing belts 35', 38', 41', and 44', passing over the ball screws 16', 20', 22', and 27' allows the density of the molded article to be made uniform, friction resistance at the time of driving to be reduced, and back-lashing to be suppressed, and accordingly, the quality and dimensional precision of the molded articles can be improved.

Figure 51:
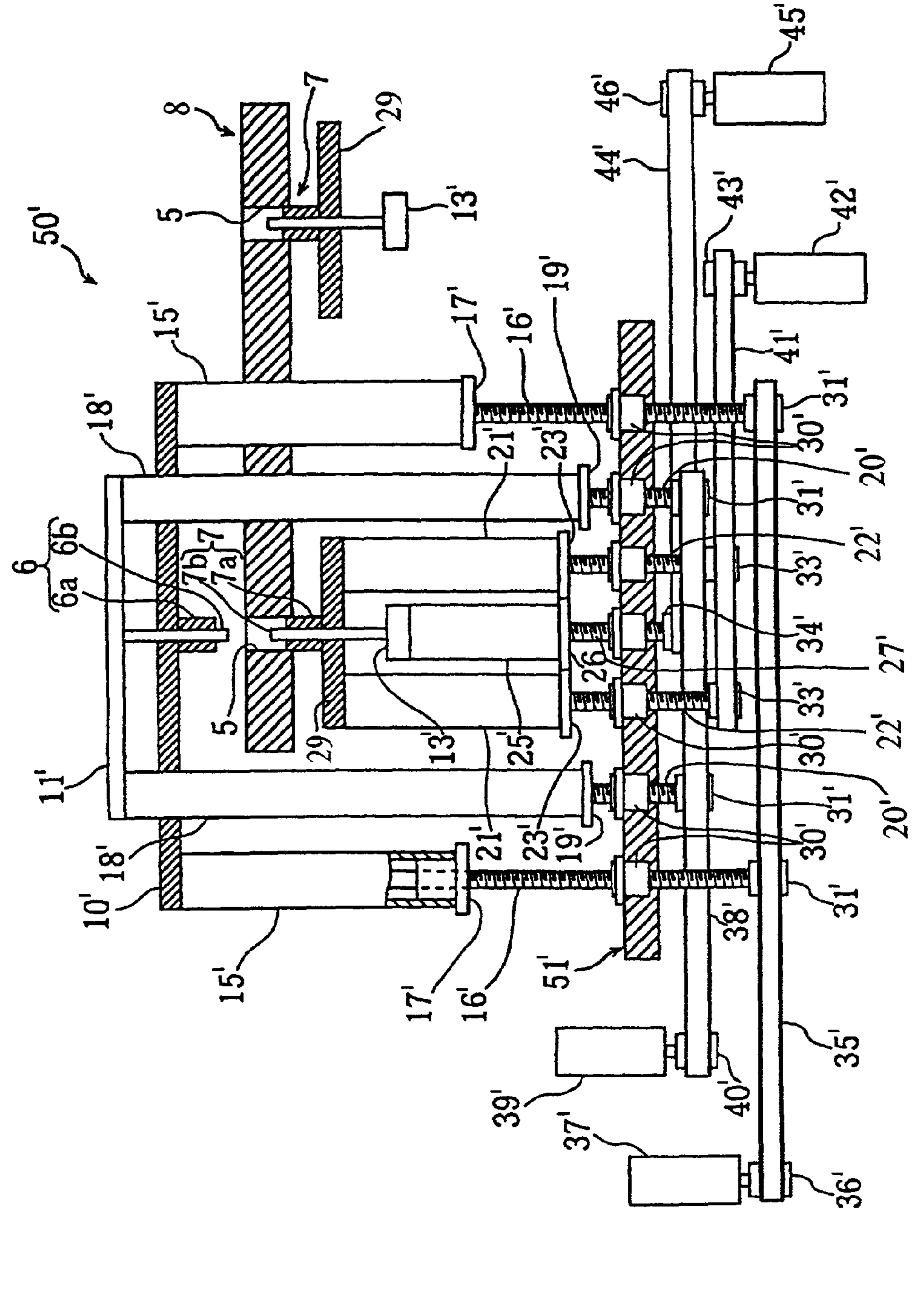
FIG. 51 is a schematic configuration diagram describing a powder molding apparatus according to another embodiment of the present invention.

FIG. 51 and FIG. 3 are diagrams for describing the powder molding apparatus according to another embodiment of the present invention. The reference numerals in these figures which are the same as those in FIG. 50 denote the same or equivalent components, and description of the same reference numerals will be omitted.

The powder molding apparatus 50' according to the present embodiment is configured with a base 51' below the die 5, with the ball screws 16', 20', 22', and 27' and the servo motors 37', 39', 42', and 45' concentrated on the base 51', and the basic configuration is generally the same as that of the embodiment shown in FIG. 50.

A transporting table 8 is provided independently above the base 51', and dice 5 are disposed on the transporting table 8. The transporting table 8 is disc-shaped, and four dice 5 are disposed and fixed at 90° intervals on the perimeter thereof. Each of the dice 5 on the lower surface of the transporting table 8 have disposed thereto lower punch units 7 and lower first and second mold supporting plates 29 and 13'.

As shown in FIG. 3, the transporting table 8 is connected to an external rotational driving mechanism (not shown), and is configured so as to continuously be rotationally driven by the rotational driving mechanism in the order of the powder supplying stage A, compression molding stage B, machine working stage C, and molded article extracting stage D (the direction indicated by the arrow “a” in FIG. 3).

Disposed at the stages A through D is a clamping mechanism (not shown) for positioning and clamping the lower first and second molding supporting plates 29 and 13' at the predetermined positions at the stages A through D, and disengaging the clamping when transporting. Also disposed to the transporting table 8 is a holding mechanism (not shown) which holds and prevents falling of the lower first and second molding supporting plates 29 and 13' during transportation, and disengages the holding of the lower punch unit 7 at predetermined positions at the stages A through D so as to permit vertical movement.

The operation of the powder molding apparatus 50' will now be described.

Upon a die 5 positioned at the powder supplying stage A being filled with the ceramic powder material, the transporting table 8 rotates 90° in the direction indicated by the arrow “a”. Thus, the die 5 filled with the ceramic powder material and the lower punch unit 7 are transported to the powder compressing stage B, and here compression molding is performed by the upper and lower punch units 6 and 7. At this time, the next die 5 transported to the powder supplying stage A is filled with the ceramic powder material.

Once the compressing molding is completed, the transporting table 8 rotates 90°, the molded article which has been formed by the compression molding is transported to the machine working stage C, and subjected to machine working such as grinding, hole-opening, and so forth, as necessary. At this time, compression molding is performed on the next ceramic powder at the powder compressing stage B, and the next die 5 transported to the powder supplying stage A is filled with the ceramic powder material.

Once the predetermined machine working is completed at the machine working stage C, the transporting table 8 rotates 90°, the molded article that has been worked is transported to the molded article extracting stage D, where the molded article is extracted. Thus, the transporting table 8 rotates sequentially such that molded articles are continuously manufactured at high speed.

According to the present embodiment, the ball screws 16', 20', 22', and 27' are supported by a single base 51 with bearings 30', and the servo motors 37', 39', 42', and 45' are concentrated on the base 51', so assembly is facilitated and size can be reduced, yielding advantages the same as those of the embodiment shown in FIG. 50.

Figure 52:
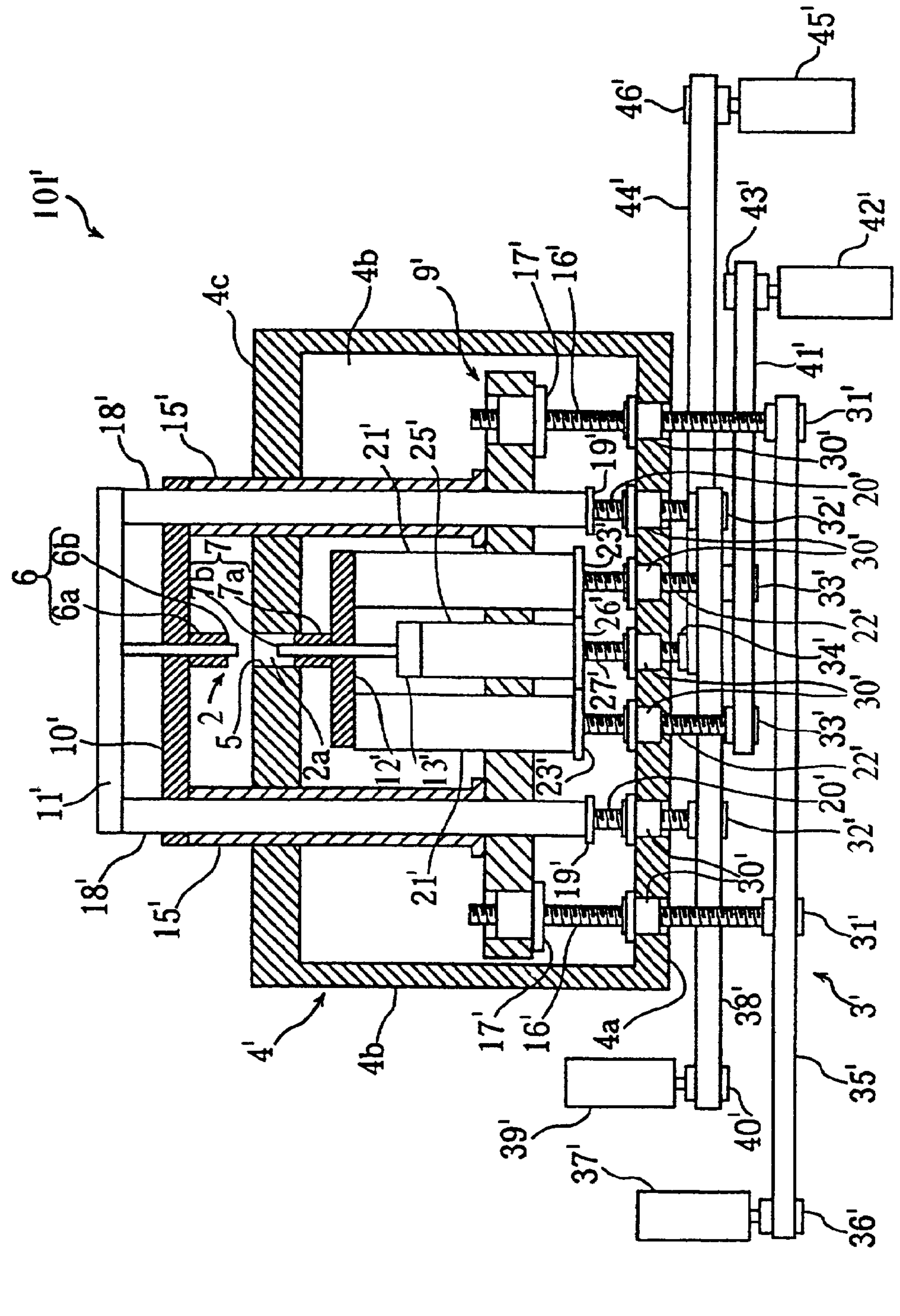
FIG. 52 is a schematic configuration diagram describing a powder molding apparatus according to another embodiment of the present invention.

FIG. 52 is a schematic configuration diagram describing a powder molding apparatus according to another embodiment of the present invention.

In the figure, reference numeral 1 denotes a powder molding apparatus which manufactures ceramic electronic part elements by compressing molding of a ceramic powder material. The powder molding apparatus 1 comprises a mold 2 wherein mainly ceramic powder is filled, a driving unit 3' for performing compression forming of the ceramic powder material filling the mold 2, and a fixed frame 4' for supporting the mold 2 and driving unit 3'.

The mold 2 is formed of a cylindrical die 5, and an upper punch unit 6 and lower punch unit 7 inserted and positioned across the die 5, such that the part encompassed by the die 5 and the upper and lower punch units 6 and 7 forms a powder molding space 2*a*.

The upper punch unit 6 is formed by inserting a pin-shaped upper second punch 6*b* within a cylindrical upper first punch 6*a* in a relatively movable manner, and the lower punch unit 7 is formed by inserting a pin-shaped lower second punch 7*b* within a cylindrical lower first punch 7*a* in a relatively movable manner, as described above. Such independent driving of the punch units 6 and 7 allows formation of molded articles of various types having uniform density, and enables forming of molded articles having cylindrical shapes, hollow cylindrical shapes, cross-sectional H shapes, cross-sectional cross shapes, for example, to be realized.

An upper first mold supporting plate 10' is attached and fixed to the upper face of the upper first punch 6*a*, and an upper second mold supporting plate 11' is attached and fixed to the upper face of the upper second punch 6*b*. The first and second mold supporting plates 10' and 11' are vertically separated and positioned so as to not interfere with one another. Also, a lower first mold supporting plate 12' is attached and fixed to the lower face of the lower first punch 7*a*, and a lower second mold supporting plate 13' is attached and fixed to the lower face of the lower second punch 7*b*. The lower first and second mold supporting plates 12' and 13' are vertically separated and positioned in the same manner as described above.

The fixing frame 4' side frame portions 4*b* integrally extending vertically upwards from both edges of a base portion 4*a*, and an upper frame portion 4*c* wherein the upper ends of the side frame portions 4*b* have been joined above, the components being integrally formed in a rectangular box shape, with the die 5 being disposed and fixed on this upper frame portion 4*c*. Also, a movable base 9' is disposed within the fixing frame 4' so as to be vertically movable.

The upper faces of cylindrical lower first driving shafts 21' are connected and fixed to both end portions of the lower first mold supporting plate 12', and lower first ball screws 22' are inserted within each of the lower first driving shafts 21'. The lower first ball screws 22' are screwed to nuts 23' mounted and fixed to the lower end of the lower first driving shafts 21', such that rotating the lower first ball screws 22' causes the lower first driving shafts 21' to move vertically, and accordingly the lower first punch 7*a* is moved vertically by the lower first mold supporting plate 12'.

Also, the upper faces of lower second driving shafts 25' are connected and fixed to both end portions of the lower second mold supporting plate 13', and lower second ball screws 27' are inserted within each of the lower second driving shafts 25' screwed to nuts 26' in the same manner as described above. Rotating the lower second ball screws 27' causes the lower second punch 7*b* to be moved vertically by the lower second driving shafts 25'. The lower first driving shafts 21' and lower second driving shafts 25' are slidably supported by the movable base 9'.

The upper faces of upper first driving shafts 15' are connected and fixed to both end portions of the upper first mold supporting plate 10'. The upper first driving shafts 15' have hollow cylindrical forms, with the lower end of the upper first driving shafts 15' being fixed on the movable base 9' and the upper ends being slidably supported by the upper fame portion 4*c*.

Upper first ball screws 16' are inserted on both sides of the movable base 9'. The upper first ball screws 16' are screwed to nuts 17' mounted and fixed to the movable base 9', such that rotating the upper first ball screws 16' causes the upper first driving shafts 15' to be moved vertically by the movable base 9', and accordingly the upper first punch 6*a* is moved vertically by the upper first mold supporting plate 10'.

Also, the upper faces of upper second driving shafts 18' are connected and fixed to both end portions of the upper second mold supporting plate 11', and upper second ball screws 20' are inserted within each of the upper second driving shafts 18'. The upper second ball screws 20' are screwed to nuts 19' mounted and fixed to the lower part of the upper second driving shafts 18', and rotating the upper second ball screws 20' causes the upper second driving shafts 18' to move vertically, and the upper second punch 6*b* to be moved vertically by the upper second mold supporting plate 11'.

The upper second driving shafts 18' are inserted concentrically within the upper first driving shafts 15', so the first and second driving shafts 15' and 18' can be moved. relatively in the axial direction. The upper second driving shafts 18' protrude outwards from both end openings of the upper first driving shafts 15', and the lower end portion of the upper second driving shafts 18' are slidably supported by the movable base 9'.

The ball screws 16', 20', 22', and 27' are each disposed parallel and vertically, and are rotatably supported by the bearings 30 disposed and fixed on the fixing base portion 4*a*. The lower portions of the ball screws 16', 20', 22', and 27' also pass through the fixing base portion 4*a* and extend on downwards, and slave pulleys 31', 32', 33', and 34' are mounted on the lower ends thereof.

An upper first timing belt 35' passes over the slave pulleys 31' of the upper first ball screws 16', and the upper first timing belt 35' passes over a driving pulley 36' mounted to an upper first servo motor 37'. Rotating the upper first servo motor 37' causes the upper first driving shafts 15' to move vertically in a synchronous manner along with the movable base 9'.

An upper second timing belt 38' passes over the slave pulleys 32' of the upper second ball screws 20', and the upper second timing belt 38' passes over a driving pulley 40' mounted to an upper second servo motor 39'. Rotating the upper second servo motor 39' causes the upper second driving shafts 18' to move vertically in a synchronous manner.

A lower first timing belt 41' passes over the slave pulleys 33' of the lower first ball screws 22', and the lower first timing belt 41' passes over a driving pulley 43' mounted to a lower first servo motor 42'. Rotating the lower first servo motor 42' causes the lower first driving shafts 21' to move vertically in a synchronous manner.

A lower second timing belt 44' passes over the slave pulleys 34' of the lower second ball screws 27', and the lower second timing belt 44' passes over a driving pulley 46' mounted to a lower second servo motor 45'. Rotating the lower second servo motor 45' causes the lower second driving shafts 25' to move vertically.

Next, the advantages of the present embodiment will be described.

In order to manufacture a ceramic molded article with the powder molding apparatus 1 according to the present embodiment, the upper punch unit 6 stands by at a predetermined position above the die 5, and the lower face of the die 5 is closed with the lower punch unit 7. In this state, ceramic powder material is filled in the powder molding space 2*a*. The upper first and second punches 6*a* and 6*b* are lowered, and the lower first and second punches 7*a* and 7*b* are raised by rotating driving of the servo motors 37', 39', 42', and 45'. This compresses the ceramic powder material, thereby forming a ceramic molded article of the predetermined form. Later, the upper first and second punches 6*a* and 6*b* are raised to the standby position, the lower first and second punches 7*a* and 7*b* are raised, and the formed article is extracted from the die 5.

According to the present embodiment, the upper second driving shafts 18' serving as inner cylinders are inserted in the cylindrical upper first driving shafts 15' in a concentric manner so as to be relatively movable, so displacement space can be reduced as compared to conventional arrangements wherein the driving shafts are disposed in parallel, thereby contributing to reduction in size of the overall apparatus.

With the present embodiment, the upper first and second driving shafts 15' and 18' are connected to the upper first and second punches 6*a* and 6*b* by the upper first and second mold supporting plates 10' 11', and independently driven by servo motors 37' and 39' by timing belts 35' and 38' on ball screws 16' and 20', so the degree of freedom in form of the molded article can be expanded, and the density of the molded article can be made uniform.

Also, the upper first and second punches 6*a* and 6*b* and the lower first and second punches 7*a* and 7*b* are driven vertically by the ball screws 16', 20', 22', and 27', so friction resistance can be reduced, and back-lashing can be suppressed, and accordingly, the quality and dimensional precision of the molded articles can be improved.

With the present embodiment, the upper first driving shafts 15' are fixed to the movable base 9, and the upper second driving shafts 18' are fixed to the fixing base portion 4*a*, with the die 5 disposed and fixed on the upper frame portion 4*c* wherein the upper ends of the side frame portions 4*b* have been joined, so the upper first and second driving shafts 15' 18' and the die 5 are supported by and fixed on the frame 4 with great rigidity, thereby ensuring rigidity at the time of compression.

Also, the ball screws 16', 20', 22', and 27', are centrally supported on the fixing base portion 4*a* and supported thereby, thereby realizing a reference surface on the fixing base portion 4*a* upon which the bearings 30' and the ball screws 16', 20', 22', and 27' can be assembled, which facilitates precision in assembly, and also facilitates assembly work and maintenance work from this perspective.

Also, the servo motors 37', 39', 42', and 45', are centrally disposed around the fixing base portion 4*a*, so precision of assembly with the ball screws 16', 20', 22', and 27' can be readily achieved, also facilitating assembly work and maintenance work from this perspective as well.

Concentrating the heavy components such as the ball screws 16', 20', 22', and 27' and the servo motors 37', 39', 42', and 45' on the fixing base portion 4*a* allows the rigidity of the overall apparatus to be alleviated by increasing the rigidity of the fixing base portion 4*a* itself, thus contributing to reduction in size and in costs.

Figure 53:
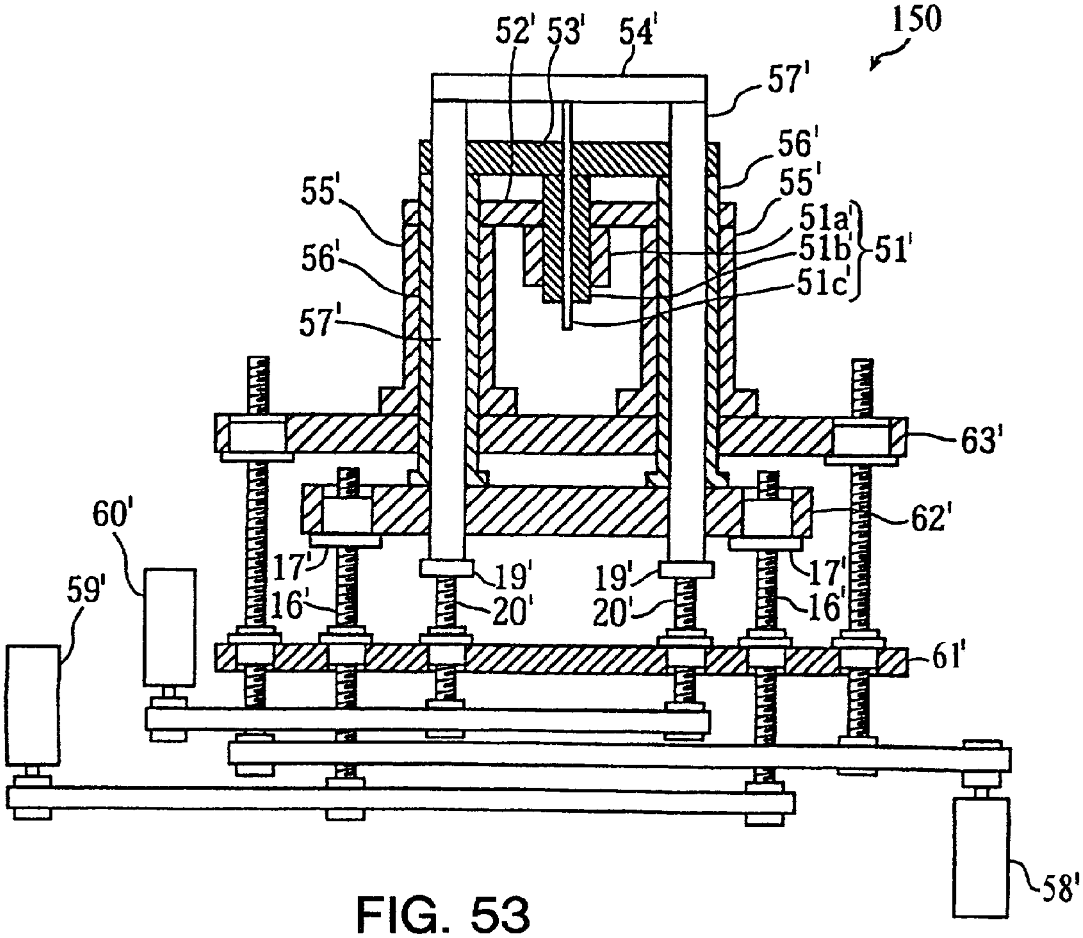
FIG. 53 is a schematic configuration diagram describing a powder molding apparatus according to another embodiment of the present invention.

FIG. 53 is a diagram for describing the powder molding apparatus according to another embodiment of the present invention. The reference numerals in these figures which are the same as those in FIG. 52 denote the same or equivalent components, and description of the same reference numerals will be omitted.

The powder molding apparatus 150 according to the present embodiment has the upper punch unit 51' divided into the three components of first through third punches 51'*a* through 51'*c*, of a structure wherein a cylindrical second punch 51'*b* is inserted within a cylindrical first punch 51'*a* located on the outside, and a cylindrical third punch 51'*c* is inserted within the second punch 51'*b*. Also, the first through third punches 51'*a* through 51'*c* are connected to first through third driving shafts 55', 56', and 57', via first through third mold supporting plates 52', 53', and 54', with the driving shafts 55' through 57' being independently driven by first through third servo motors 58', 59', and 60'. Note that reference numeral 61' denotes a fixed base, 62' denotes a first movable base with the second driving shaft 56' connected and fixed thereto, and 63' denotes a second movable base with the first driving shaft 55' connected and fixed thereto.

The first through third driving shafts 55' through 57' are of a configuration wherein a cylindrical second driving shaft 56' is concentrically inserted within a cylindrical first driving shaft 55' so as to be relatively movable in the same way, and a third driving shaft 57' is concentrically inserted within the second driving shaft 56' so as to be relatively movable.

According to the present embodiment, the first, second, and third driving shafts 55', 56', and 57 are inserted and configured as a tri-axial concentric structure that is relatively movable, so the displacement space of the driving shafts can be further reduced, thus reducing the size of the overall apparatus.

Figure 54:
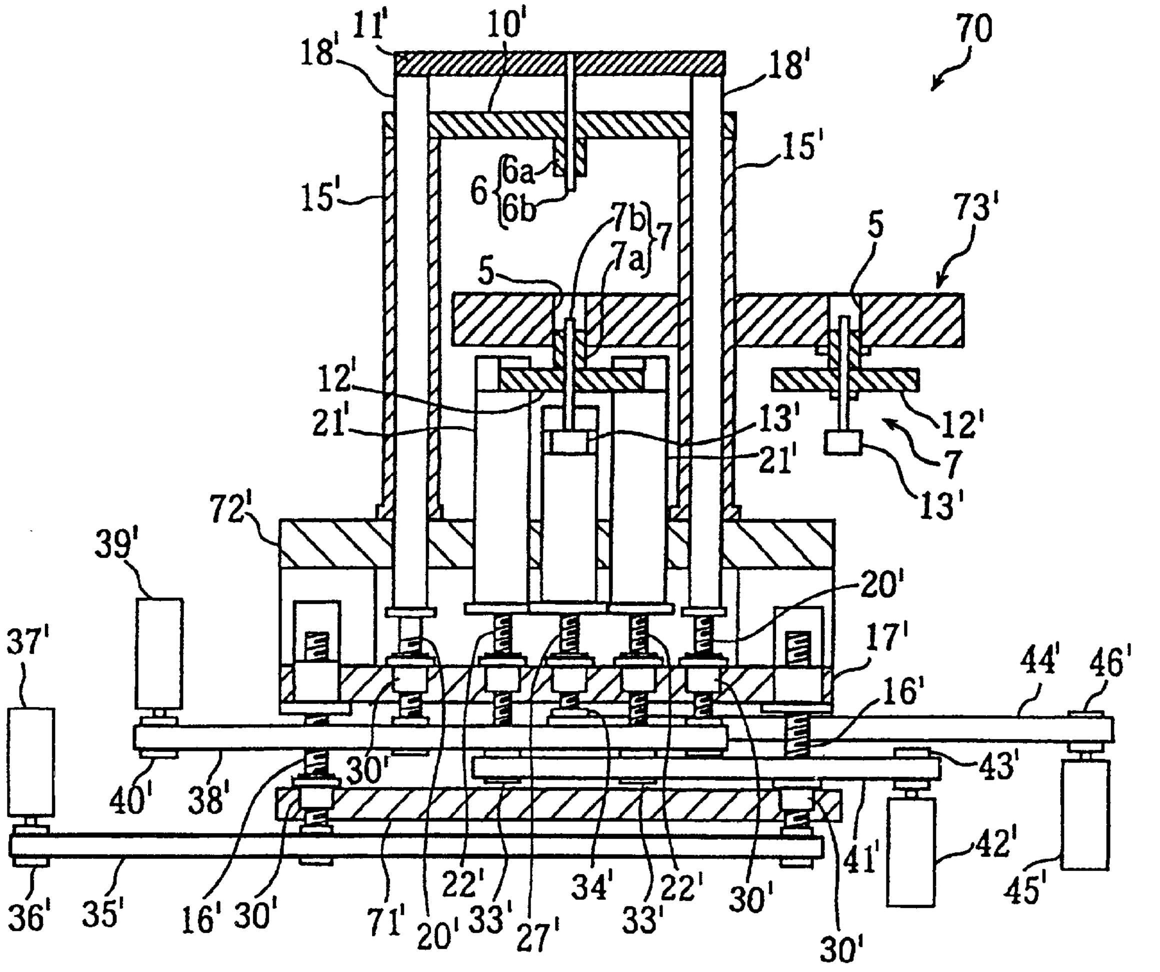
FIG. 54 is a schematic configuration diagram describing a powder molding apparatus according to another embodiment of the present invention.
Figure 55:
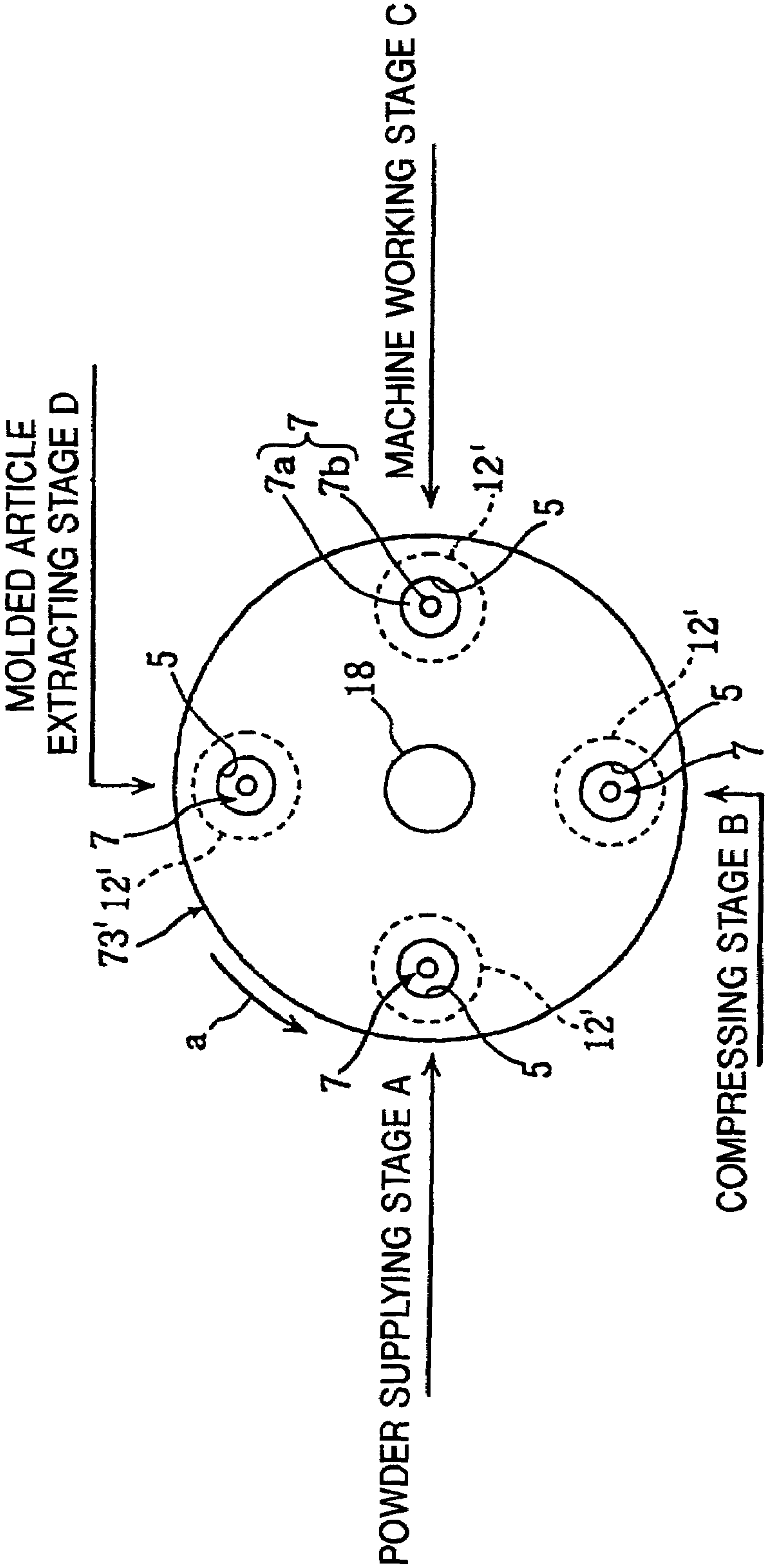
FIG. 55 is a plan view illustrating the action of the transporting table of the powder molding apparatus.

FIGS. 54 and 55 are diagrams for describing the powder molding apparatus according to another embodiment of the present invention. The reference numerals in these figures which are the same as those in FIG. 52 denote the same or equivalent components.

The powder molding apparatus 70 according to the present embodiment is configured with the upper second driving shafts 18' inserted concentrically within the upper first driving shafts 15', so as to be relatively movable, so the upper first and second driving shafts 15' and 18' are independently driven by the upper first and second servo motors 37' and 39'. The basic configuration is generally the same as that shown in FIG. 52.

Also, upper first ball screws 16' are supported on a fixed base 71' by bearings 30', and upper second ball screws 20' and lower first and second ball screws 22' and 27' are supported on a movable base 72' by bearings 30'. The upper first driving shafts 15' are moved vertically by upper first ball screws 16' with the movable base 72', and the upper second driving shafts 18' are moved vertically, relatively to the movable base 72', by the upper second ball screws 20'.

A transporting table 73' is provided independently above the movable base 72'. The transporting table 73' is disc-shaped, and four dice 5 are disposed and fixed at 90° intervals on the perimeter thereof. Each of the dice 5 on the lower face of the transporting table 73' have disposed thereto lower punch units 7 and lower first and second mold supporting plates 12' and 13'.

As shown in FIG. 55, the transporting table 73' is connected inked to an external rotational driving mechanism (not shown), and is configured so as to continuously be rotationally driven by the rotational driving mechanism in the order of the powder supplying stage A, compression molding stage B, machine working stage c, and molded article extracting stage D (the direction indicated by the arrow "a" in FIG. 55).

Disposed at the stages A through D is a clamping mechanism (not shown) for positioning and clamping the lower punch unit 7 and lower first and second molding supporting plates 12' and 13' at the predetermined positions at the stages A through D, and disengaging the clamping when transporting. Also disposed to the transporting table 73' is a holding mechanism (not shown) which holds and prevents falling of the lower first and second molding supporting plates 12' and 13' during transportation, and disengages the holding of the lower punch unit 7 at predetermined positions at the stages A through D so as to permit vertical movement.

The operation of the powder molding apparatus 70 will now be described.

Upon a die 5 positioned at the powder supplying stage A being filled with the ceramic powder material, the transporting table 73' rotates 90° in the direction indicated by the arrow "a". Thus, the die 5 filled with the ceramic powder material and the lower punch unit 7 are transported to the powder compressing stage B, and here compression molding is performed by the upper and lower punch units 6 and 7. At this time, the next die 5 transported to the powder supplying stage A is filled with the ceramic powder material.

Once the compressing molding is completed, the transporting table 73 rotates 90°, the molded article which has been formed by the compression molding is transported to the machine working stage C, and subjected to machine working such as grinding, hole-opening, and so forth, as necessary. At this time, compression molding is performed on the next ceramic powder at the powder compressing stage B, and the next die 5 transported to the powder supplying stage A is filled with the ceramic powder material.

Once the predetermined machine working is completed at the machine working stage C, the transporting table 73' rotates 90°, the molded article that has been worked is transported to the molded article extracting stage D, where the molded article is extracted. Thus, the transporting table 73' rotates sequentially such that molded articles are continuously manufactured.

According to the present embodiment, the upper second driving shafts 18' are inserted concentrically within the upper first driving shafts 15' so as to be relatively movable, so disposing space can be reduced and the overall apparatus can be reduced in size, yielding advantages the same as those of the embodiment shown in FIG. 52.

What is claimed is:

1. A powder molding apparatus, comprising:

a mold comprising a die having a powder molding space, and upper and lower punch units;

a mold transporting mechanism for transporting said mold between at least a powder supplying stage, a compressing molding stage, and a molded article extracting stage;

a compression driving mechanism for performing compression molding by driving said upper and lower punch units independently in said compressing molding stage; and linking means for detachably linking at least one of said upper and lower punch units to said compression driving mechanism, while moving in a direction orthogonal to the compression driving direction of said upper and lower punch units.

2. A powder molding apparatus according to claim 1, said linking means comprising:

a clamp main unit positioned and fixed on said compression driving mechanism;

a sliding claw movably supported on said clamp main unit in said orthogonal direction; and a sliding driving mechanism for driving said sliding claw between a linking position for linking said punch unit to said compression driving mechanism and a non-linking position wherein said linkage is disengaged.

3. A powder molding apparatus according to claim 2, wherein said sliding claw comprises a tapered portion for tapered fitting with said punch unit.

4. A powder molding apparatus according to claim 2, wherein said sliding driving mechanism is configured so as to linearly drive said sliding claw.

5. A powder molding apparatus according to claim 2, wherein said sliding driving mechanism is configured so as to rotationally drive said sliding claw.

6. A powder molding apparatus according to claim 1, wherein said die is installed on a die set, said upper and lower punch units comprise at least first and second punches, and said independent driving is performed by driving said first and second punches by a driving shaft, said powder molding apparatus further comprising:

linking means for linking said first and second punches to said die so as to relatively move in the compression direction but so as not to fall; and fixing means for collectively mounting and fixing said die to said die set along with said first and second punches.

7. A powder molding apparatus according to claim 6, said linking means comprising grooves formed on each of said first and second punch holders for said first and second punches, extending in the compression direction; and engaging pins fixed up said die and said first punch holder;

wherein said linking means are configured such that the engaging pin of said die is engaged with the groove on said first punch holder, and the engaging pin of said first punch holder is engaged with the groove on said second punch holder.

8. A powder molding apparatus according to claim 6, wherein said fixing means are introduced between said die and die set, and are configured of a fixing bush for causing taper fitting of said die and die set.

9. A powder molding apparatus according to claim 6, wherein said fixing means are configured of an actuator which presses and fixes said die to said die set with a pressing member introduced therebetween.

10. A powder molding apparatus according to claim 6, wherein said fixing means are introduced between said die and die set, and are configured of a fluid pressure fixing member which presses and fixes said die to said die set by pressurizing a pressure fluid filled therein.

11. A powder molding apparatus according to claim 6, further comprising fastening means for detachably collectively fastening said first and second punches to said driving shaft.

12. A powder molding apparatus according to claim 11, said fastening means comprising:

hook-shaped claw members erected on pressure rams of each of said driving shafts; and engaging pins fixed on each punch holder of said first and second punches;

wherein said fastening means are configured so as to fasten said punch holders by engaging said engaging pins with said claw members.

13. A powder molding apparatus according to claim 12, wherein actuators are connected to each of said punch holders, configured such that said punch holders are collectively fastened to said pressure rams by said actuators.

14. A powder molding apparatus according to claim 6, wherein said die set is configured so as to transport said mold between a powder supplying stage, a compressing molding stage, and a molded article extracting stage.

15. A powder molding apparatus according to claim 1 for forming a powder molding space with a die, and an upper punch unit and lower punch unit, said upper and lower punch units disposed so as to face one another across said die, wherein compression molding is performed by driving each of said upper and lower punch units independently with driving shafts, and wherein upon one of said driving shafts is placed the other of said driving shafts, configured such that said other of said driving shafts moves synchronously with the movement of said one of said driving shafts.

16. A powder molding apparatus according to claim 15, wherein said die is fixed to said upper and lower punch units and said upper and lower punch units comprise first and second punches respectively, and wherein said other of said driving shafts is placed upon a driving base moved and driven by said one of said driving shafts, configured such that moving said driving base causes said upper first and second punches and said lower first and second punches to move synchronously.

17. A powder molding apparatus according to claim 15, wherein said die is disposed on a transporting table, and wherein said transporting table is configured so as to move between a powder supplying stage, a powder compressing stage, and a molded article extracting stage, in a direction orthogonal to the moving direction of said upper and lower punch units.

18. A powder molding apparatus according to claim 1, said powder molding apparatus having a powder molding space formed with a die, and upper and lower punches disposed so as to face one another across said die, wherein driving shafts are connected to each of said upper and lower punches, and compression molding is performed by driving each of said upper and lower punches independently with said driving shafts by driving sources, and wherein upon said driving shafts are supported by a single base, with each of said driving sources being centrally disposed on said base.

19. A powder molding apparatus according to claim 18, wherein said base is disposed below said die, and said die is disposed and fixed on a frame portion formed as an extension of said base.

20. A powder molding apparatus according to claim 18, wherein said base is disposed below said die, said die is disposed and fixed on a transporting table provided separately from said base, wherein said transporting table is configured so as to move between a powder supplying stage, a powder compressing stage, and a molded article extracting stage.

21. A powder molding apparatus according to claim 18, wherein said upper end portion of said one driving shaft is linked to a upper mold supporting plate attached to said upper punch, so that said upper mold supporting plate is lowered with said one driving shaft while raising a lower mold supporting plate with said other driving shaft, by said driving sources, thereby effecting compression molding.

22. A powder molding apparatus according to claim 18, wherein said driving shafts are ball screws axially supported by said base, and said driving sources are servo motors linked to said ball screws by timing belts.

23. A powder molding apparatus according to claim 1, forming a powder molding space with a die, and an upper punch unit and lower punch unit, said upper and lower punch units disposed so as to face one another across said die, wherein compression molding is performed by driving each of said upper and lower punch units independently with driving shafts, and wherein at least one of said upper and lower punch units is configured so as to allow insertion of at least first and second punches in a relatively movable manner, with first and second driving shafts linked to said first and second punches, and said first and second driving shafts inserted in a hollow outer cylinder with the inner cylinder relatively movable in the axial direction.

24. A powder molding apparatus according to claim 23, wherein said inner cylinder protrudes out from the openings at both ends of said hollow outer cylinder, with said first punch being linked to one end of said hollow outer cylinder by a first mold supporting plate and the other end thereof linked to a first driving source, and said second punch being linked to one end of said inner cylinder by a second mold supporting plate and the other end thereof linked to a second driving source, and wherein said hollow outer cylinder and inner cylinder are independently driven by said first and second driving sources.

25. A powder molding apparatus according to claim 23, wherein respective ball screws are linked to said hollow outer cylinder and said inner cylinder, and wherein servo motors serving as driving sources are linked to said ball screws by timing belts.

26. A powder molding apparatus according to claim 23, wherein said hollow outer cylinder is supported by a movable base, said inner cylinder is supported by a fixed base, and said die is disposed and fixed on a frame portion integrally extended from said fixed base.

27. A powder molding apparatus according to claim 23, wherein said hollow outer cylinder and said inner cylinder are supported by a common movable base, said die is disposed and fixed on a transporting table provided separately from said movable base, and said transporting table is configured so as to move between a powder supplying stage, a powder compressing stage, and a molded article extracting stage.

28. A powder molding apparatus according to claim 1, forming a powder molding space for supplying powder material to said die, said powder molding apparatus further comprising:

a powder storing unit to which a powder supplying tube is connected;

a powder injecting hole formed at a portion of the bottom wall of said powder storing unit facing said powder molding space; and a scraping blade for sliding along said die to scrape away excess powder material outside said powder molding space, and also to close off said powder injecting hole.

29. A powder molding apparatus according to claim 28, wherein the blade tip of said scraping blade is at an acute angle as to the surface of said die upon which scraping blade slides.

30. A powder molding apparatus according to claim 28, wherein said scraping blade is formed of a ceramic.

31. A powder molding apparatus according to claim 28, wherein a powder supplying opening of said powder supplying tube is positioned so as to be offset outwards from the center of said powder injecting hole, and also passes through the ceiling of said powder storing unit and is inserted to the inside thereof.

32. A powder molding apparatus according to claim 28, wherein a tapered portion is formed at an edge of said powder injecting hole so as to fit with the blade tip of said scraping blade when closing off said powder injecting hole.

33. A powder molding apparatus according to claim 28, wherein said scraping blade is provided independently from said powder storing unit, passes through a slit formed in said powder storing unit and extends into said powder storing unit, and is driven to perform scraping action by an actuator disposed outside said powder storing unit.

* * * * *